United States Patent
Lee et al.

(10) Patent No.: US 11,428,850 B2
(45) Date of Patent: Aug. 30, 2022

(54) CAMERA MODULE

(71) Applicant: LG INNOTEK CO., LTD., Seoul (KR)

(72) Inventors: Sang Hun Lee, Seoul (KR); Seung Ryong Park, Seoul (KR); Ji Young Jung, Seoul (KR); Yong Bok Choi, Seoul (KR); Tae Min Ha, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 426 days.

(21) Appl. No.: 16/330,632

(22) PCT Filed: Sep. 5, 2017

(86) PCT No.: PCT/KR2017/009668
§ 371 (c)(1),
(2) Date: Mar. 5, 2019

(87) PCT Pub. No.: WO2018/044131
PCT Pub. Date: Mar. 8, 2018

(65) Prior Publication Data
US 2021/0173126 A1    Jun. 10, 2021

(30) Foreign Application Priority Data

Sep. 5, 2016  (KR) ................ 10-2016-0114132
Jan. 24, 2017 (KR) ................ 10-2017-0011338
(Continued)

(51) Int. Cl.
*G02B 3/14* (2006.01)
*G02B 9/62* (2006.01)
(Continued)

(52) U.S. Cl.
CPC ............... *G02B 3/14* (2013.01); *G02B 9/62* (2013.01); *G02B 13/0045* (2013.01);
(Continued)

(58) Field of Classification Search
CPC ........ G02B 3/14; G02B 9/62; G02B 13/0045; G02B 26/005; G02B 27/646;
(Continued)

(56) References Cited

U.S. PATENT DOCUMENTS 8,908,295 B1    12/2014  Tsai et al.
2004/0228003 A1  11/2004  Takeyama et al.
(Continued)

FOREIGN PATENT DOCUMENTS

CN     1837938 A    9/2006
CN     1877387 A    12/2006
(Continued)

OTHER PUBLICATIONS

Machine translation of KR 20090096953 (Year: 2009).*
(Continued)

*Primary Examiner* — Darryl J Collins
*Assistant Examiner* — Matthew Y Lee
(74) *Attorney, Agent, or Firm* — Saliwanchik, Lloyd & Eisenschenk

(57) ABSTRACT

An embodiment provides a camera module comprising: a holder; a first lens part disposed at an upper part of the holder; a second lens part disposed at an lower part of the holder; a liquid lens coupled to the holder and disposed between the first lens part and the second lens part; a substrate electrically connected to the liquid lens; and an image sensor disposed in the optical axis direction of the liquid lens and mounted on the substrate, wherein a distance from a rear surface of the first lens part to a front surface of the second lens part on an optical axis is 1.8 to 2.1 times the thickness of the liquid lens.

10 Claims, 37 Drawing Sheets

(30) Foreign Application Priority Data

| Jan. 26, 2017 | (KR) | 10-2017-0012690 |
|---|---|---|
| Feb. 9, 2017 | (KR) | 10-2017-0017894 |
| Feb. 16, 2017 | (KR) | 10-2017-0021001 |
| Feb. 28, 2017 | (KR) | 10-2017-0026203 |

(51) Int. Cl.
*G02B 13/00* (2006.01)
*G02B 26/00* (2006.01)
*G02B 27/64* (2006.01)
*H04M 1/02* (2006.01)
*H04N 5/225* (2006.01)

(52) U.S. Cl.
CPC ......... *G02B 26/005* (2013.01); *G02B 27/646* (2013.01); *H04M 1/0264* (2013.01); *H04M 1/0274* (2013.01); *H04M 1/0277* (2013.01); *H04N 5/2253* (2013.01); *H04N 5/2254* (2013.01); *H04N 5/2257* (2013.01); *G02B 2207/115* (2013.01)

(58) Field of Classification Search
CPC ......... G02B 2207/115; H04M 1/0264; H04M 1/0274; H04M 1/0277; H04N 5/2253; H04N 5/2254; H04N 5/2257
See application file for complete search history.

(56) References Cited

U.S. PATENT DOCUMENTS

| 2006/0125926 A1 | 6/2006 | Nishino |
| 2008/0267603 A1* | 10/2008 | Jung ............... G02B 7/021 396/111 |
| 2011/0013297 A1 | 1/2011 | Barnes et al. |
| 2011/0176221 A1 | 7/2011 | Tanaka et al. |
| 2012/0120513 A1* | 5/2012 | Kotanagi ............... G03B 3/10 359/824 |
| 2015/0002728 A1 | 1/2015 | Tsai et al. |
| 2016/0011401 A1 | 1/2016 | Chen et al. |

FOREIGN PATENT DOCUMENTS

| CN | 101932956 A | 12/2010 | |
| CN | 105637403 A | 6/2016 | |
| JP | 2002-6200 A | 1/2002 | |
| JP | 2004-341032 A | 12/2004 | |
| JP | 2006-126740 A | 5/2006 | |
| JP | 2014-115431 A | 6/2014 | |
| JP | 2015-225102 A | 12/2015 | |
| KR | 10-2005-0033308 A | 4/2005 | |
| KR | 10-2006-0020980 A | 3/2006 | |
| KR | 10-2006-0126144 A | 12/2006 | |
| KR | 10-0797723 B1 | 1/2008 | |
| KR | 10-2008-0014274 A | 2/2008 | |
| KR | 10-0843473 B1 | 6/2008 | |
| KR | 10-2009-0096953 A | 9/2009 | |
| KR | 20090096953 * | 9/2009 | .............. G02B 7/09 |
| KR | 10-2011-0112598 A | 10/2011 | |
| KR | 10-2012-0050996 A | 5/2012 | |
| KR | 10-2013-0014948 A | 2/2013 | |
| KR | 10-2014-0007183 A | 1/2014 | |
| WO | WO 2007058451 * | 5/2007 | .......... G02B 26/005 |
| WO | 2011/148502 A1 | 12/2011 | |
| WO | WO-2015/024136 A1 | 2/2015 | |

OTHER PUBLICATIONS

Office Action dated Sep. 30, 2020 in Chinese Application No. 201780068223.3.
Office Action dated Sep. 28, 2021 in Japanese Application No. 2019-512792.
International Search Report in International Application No. PCT/KR2017/009668.
Supplementary European Search Report dated Nov. 11, 2019 in European Application No. 17847056.3.
Supplementary Partial European Search Report dated Jul. 26, 2019 in European Application No. 17847056.3.
Office Action dated Mar. 3, 2022 in European Application No. 17 847 056.3.
Saurei L. et al., "Design of an autofocus lens for VGA 1/4 CCD and CMOS sensors," Proceedings of SPIE, IEEE, Jan. 1, 2004, 5249 (1): 288-296.
Wu S. et al., "3.4. Basic Theory of Electrowetting," Introduction to Adaptive Lenses, Apr. 24, 2012, pp. 1-2.

* cited by examiner

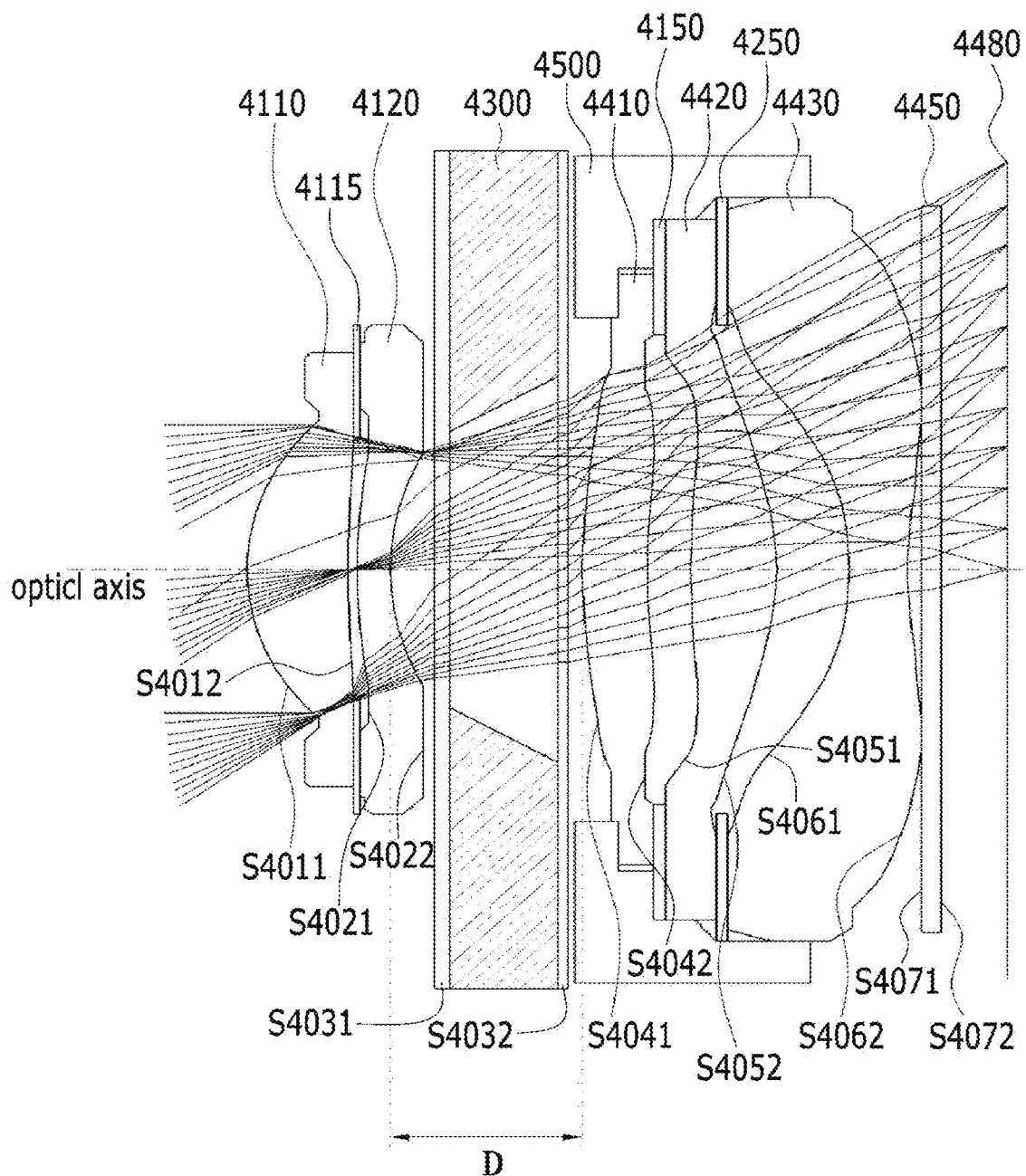

CAMERA MODULE

CROSS-REFERENCE TO RELATED APPLICATIONS

This application is the U.S. national stage application of International Patent Application No. PCT/KR2017/009668, filed Sep. 5, 2017; which claims the benefit under 35 U.S.C. § 119 of Korean Application Nos. 10-2016-0114132, filed Sep. 5, 2016; 10-2017-0011338, filed Jan. 24, 2017; 10-2017-0012690, filed Jan. 26, 2017; 10-2017-0017894, filed Feb. 9, 2017; 10-2017-0021001, filed Feb. 16, 2017; and 10-2017-0026203, filed Feb. 28, 2017; the disclosures of each of which are incorporated herein by reference in their entirety.

TECHNICAL FIELD

Embodiments relate to a camera module and an optical device including the same, and more particularly to a camera module including a liquid lens and an optical device including the same.

BACKGROUND ART

People who use portable devices demand optical devices that have high resolution, are small, and have various photography functions, such as an auto-focusing (AF) function and a handshake compensation or optical image stabilization (OIS) function. Such photography functions may be realized by directly moving a plurality of lenses that are combined. In the case in which the number of lenses is increased, however, the size of the optical devices may be increased.

The auto-focusing and handshake compensation functions are performed by tilting or moving a lens module including a plurality of lenses, which are fixed to a lens holder in the state in which the optical axes of the lens are aligned, along the optical axis or in the direction perpendicular to the optical axis. A separate lens moving apparatus is used in order to move the lens module. However, the lens moving apparatus has high power consumption, driving members, such as a magnet and a coil, are required to move the lens module, and space for moving the lens module must be available in an amount corresponding to the range within which the lens module is to be moved. As a result, the thickness of a camera module and an optical device is increased.

Therefore, research has been conducted on a liquid lens configured such that the curvature of the interface between two kinds of liquids is electrically adjusted to perform the auto-focusing and handshake compensation functions.

DISCLOSURE

Technical Problem

Embodiments provide a camera module capable of performing AF or OIS using a liquid lens and an optical device including the same.

Technical Solution

In one embodiment, a camera module includes a holder, a first lens unit disposed above the holder, a second lens unit disposed under the holder, a liquid lens coupled to the holder, the liquid lens being disposed between the first lens unit and the second lens unit, a board connected to the liquid lens, and an image sensor disposed in an optical-axis direction of the liquid lens, the image sensor being mounted on the board, wherein the distance between the rear surface of the first lens unit and the front surface of the second lens unit on an optical axis is 1.8 or 2.1 times the thickness of the liquid lens.

The liquid lens may include a conductive liquid and a nonconductive liquid, a cavity may include a first opening formed toward the first lens unit and a second opening formed toward the second lens unit, and the size of the first opening may be smaller than the size of the second opening.

$O_2/O_1$ may be greater than 1.1 and less than 1.6, where $O_1$ may be the size of the first opening unit and $O_2$ may be the size of the second opening.

The first lens unit may include a first lens and a second lens sequentially arranged from an object side to an upper side thereof, the first lens may have a positive refractive power, and the second lens may have a negative refractive power.

The first lens unit may include a first lens and a second lens sequentially arranged from an object side to an upper side thereof, and $0.75<f1/F<1.1$, where f1 may be the effective focal length of the first lens and F may be the effective focal length of an optical system.

The first lens unit may include a first lens and a second lens sequentially arranged from an object side to a upper side thereof, and $0.7<TTL/F<0.9$, where TTL may be a distance between a first surface of the first lens, which faces an object, and an image.

The second lens unit may include a fourth lens, a fifth lens, and a sixth lens sequentially arranged from an object side to an upper side thereof, and a first surface of the fourth lens, which faces the object, may be convex toward the object.

The second lens unit may include a fourth lens, a fifth lens, and a sixth lens sequentially arranged from an object side to an upper side thereof, the fifth lens may have a positive refractive power, and the sixth lens may have a negative refractive power.

The second lens unit may include a fourth lens, a fifth lens, and a sixth lens sequentially arranged from an object side to an upper side thereof, and $N4d<1.6$, where N4d may be the refractive index of the fourth lens at the d-line.

The second lens unit may include a fourth lens, a fifth lens, and a sixth lens sequentially arranged from an object side to an upper side thereof, and $20<v4d<30$, where v4d may be the Abbe number of the fourth lens at the d-line.

Advantageous Effects

In the lens assembly including the liquid lens according to the embodiment, the distance between the front surface of the first lens and the rear surface of the sixth lens may be fixed, and the focal length and the diopter of the liquid lens in the lens assembly may be variable, whereby AF or OIS may be possible without moving the lenses in the lens assembly.

DESCRIPTION OF DRAWINGS

FIG. 31 is a view showing the arrangement of a lens assembly in the camera module of FIG. 29.

BEST MODE

Figure 1:
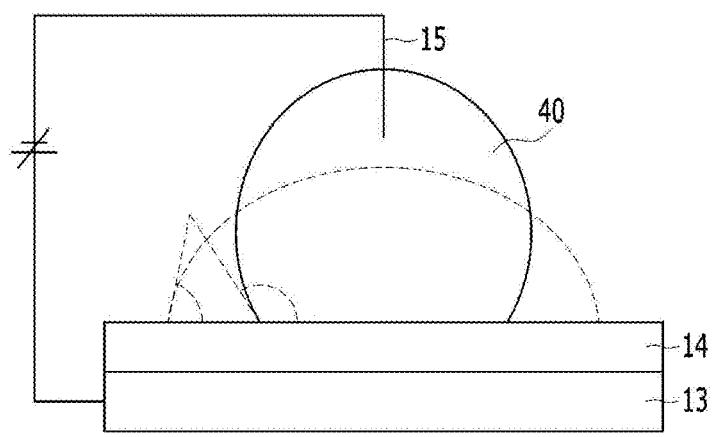
FIG. 1 is a conceptual view showing an electrowetting phenomenon.

Reference will now be made in detail to preferred embodiments, examples of which are illustrated in the accompanying drawings. However, the embodiments may be modified into various other forms. The embodiments are not restrictive but are illustrative. The embodiments are provided to more completely explain the disclosure to a person having ordinary skill in the art.

In the following description of the embodiments, it will be understood that, when each element is referred to as being "on" or "under" another element, it can be "directly" on or under another element, or can be "indirectly" disposed in relation thereto such that an intervening element is present therebetween. In addition, when an element is referred to as being "on" or "under," "under the element" as well as "on the element" can be included based on the element.

In addition, relational terms, such as "first," "second," "upper portion," and "lower portion," are used only to distinguish between one subject or element and another subject or element, without necessarily requiring or involving any physical or logical relationship or sequence between such subjects or elements.

The term "optical-axis direction" used herein is defined as the optical-axis direction of a lens module of a camera module. Meanwhile, the "optical-axis direction" may also be referred to as an upward-downward direction or a z-axis direction.

The term "auto focus" used herein is defined as a function of changing the curvature of the interface of a liquid lens to focus a subject. Herein, the term "auto focus" may be used interchangeably with "AF."

The term "handshake compensation" used herein is defined as a function of changing the curvature of the interface of the liquid lens to offset the vibration (the movement) of an image sensor due to external force. Herein, the term "handshake compensation" may be used interchangeably with "optical image stabilization (OIS)."

Hereinafter, an optical device according to this embodiment will be described.

The optical device may be a cellular phone, a mobile phone, a smartphone, a portable smart device, a digital camera, a laptop computer, a digital broadcasting terminal, a personal digital assistant (PDA), a portable multimedia player (PMP), or a navigator. However, the disclosure is not limited thereto. Any device that takes video or still images may be used.

The optical device may include a main body (not shown), a display unit (not shown), and a camera module 1000.

The main body may define the external appearance of the optical device. In an example, the main body may be formed in the shape of a rectangular cube. However, the disclosure is not limited thereto. In a modification, at least a portion of the main body may be round. The main body may receive the camera module 1000. The display unit may be disposed at one surface of the main body.

The camera module 1000 may be disposed at the main body. The camera module 1000 may be disposed at one surface of the main body. At least a portion of the camera module 1000 may be received in the main body. The camera module 1000 may take images of a subject.

The display unit may be disposed at the main body. The display unit may be disposed at one surface of the main body. That is, the display unit may be disposed at the same surface as the camera module 1000. Alternatively, the display unit may be disposed at a surface different from the one surface of the main body. The display unit may be disposed at the surface that is opposite to the surface at which the camera module 1000 is disposed. The display unit may output the images taken by the camera module 1000.

Hereinafter, the structure of a camera module 1000 according to this embodiment will be described with reference to the drawings.

Figure 2:
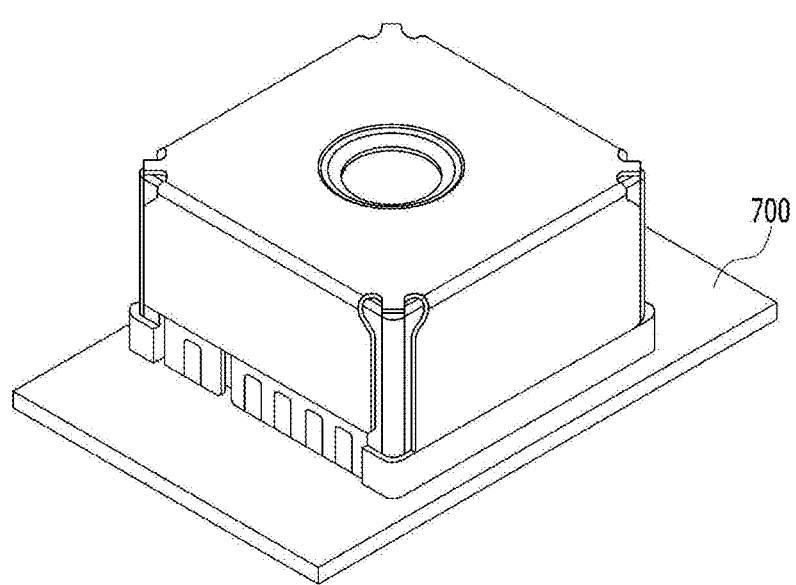
FIG. 2 is a perspective view showing a camera module according to a first embodiment.
Figure 3:
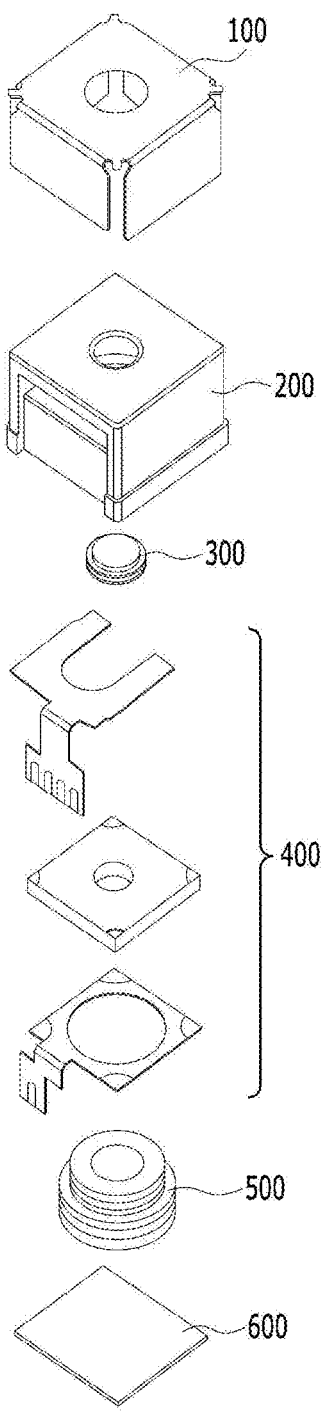
FIG. 3 is an exploded perspective view showing the camera module according to the first embodiment.
Figure 4:
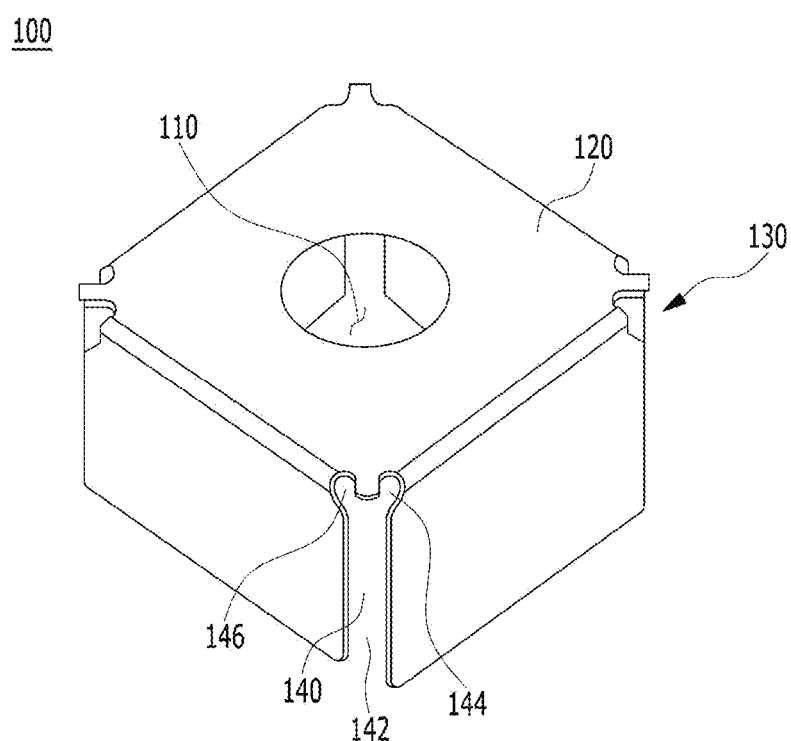
FIG. 4 is a perspective view showing a shield can according to a first embodiment.
Figure 5:
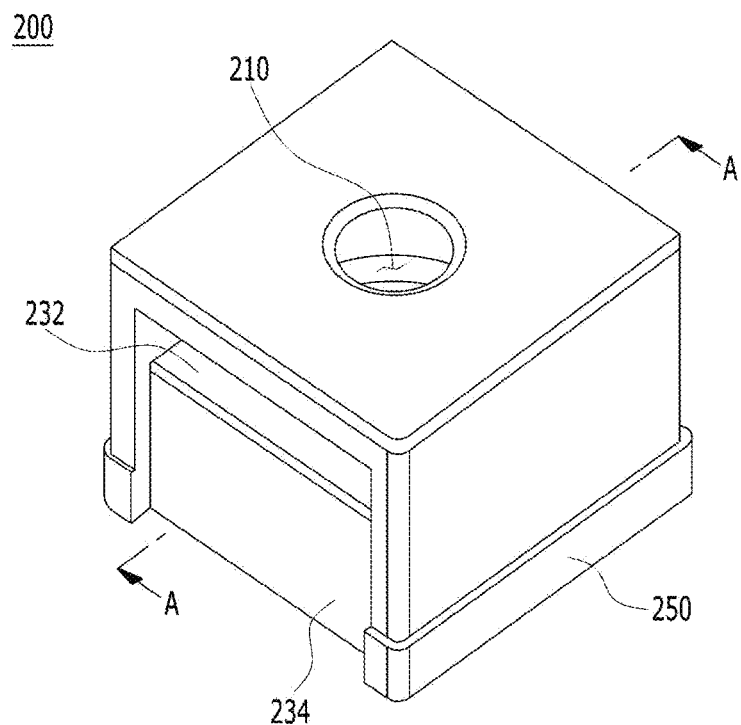
FIG. 5 is a perspective view showing a lens holder according to a first embodiment.
Figure 6:
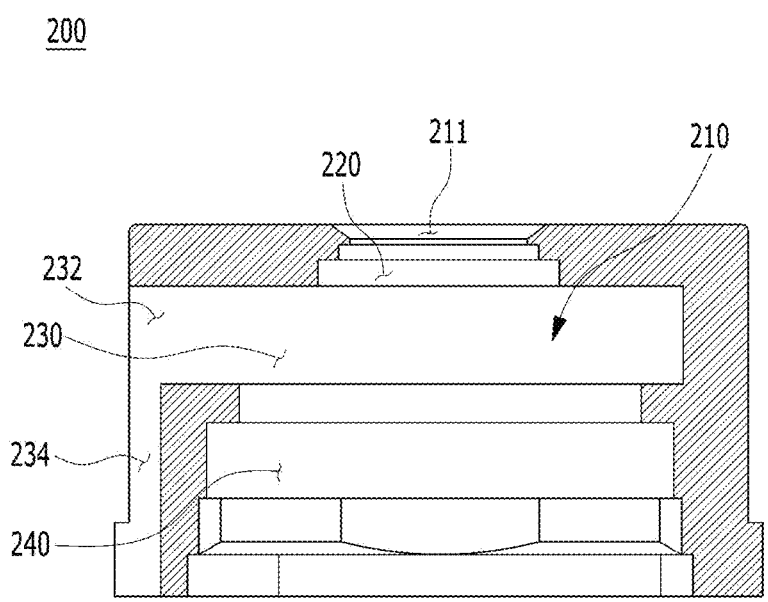
FIG. 6 is a sectional view showing the lens holder according to the first embodiment.
Figure 7:
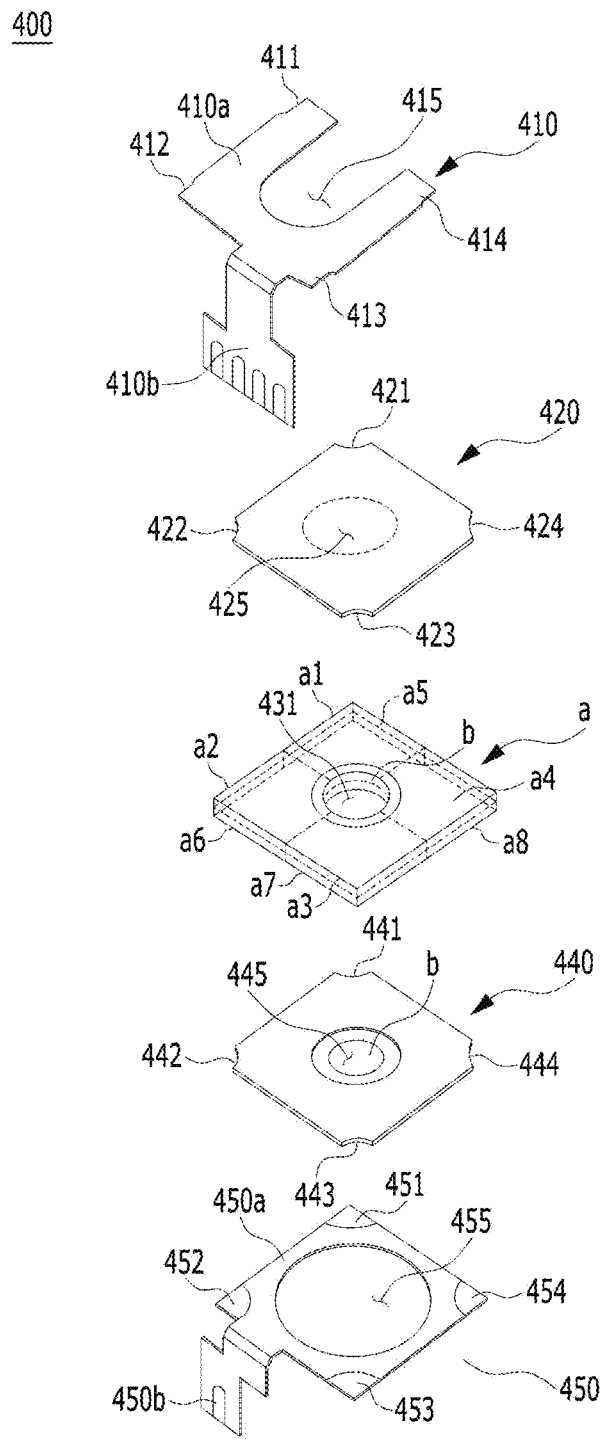
FIG. 7 is an exploded perspective view showing a liquid lens according to a first embodiment.
Figure 8:
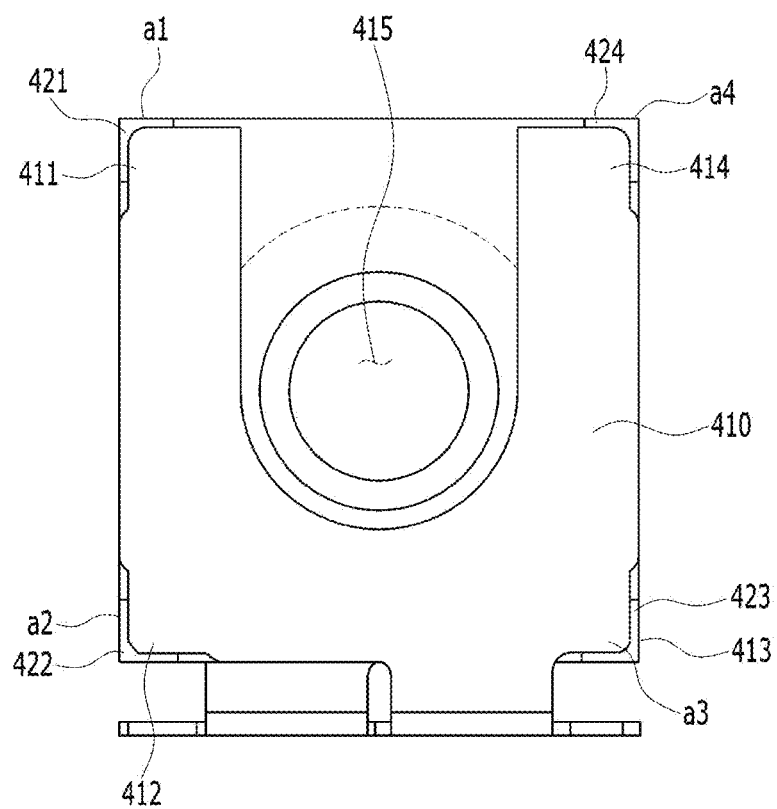
FIG. 8 is a plan view showing the liquid lens according to the first embodiment.
Figure 9A:
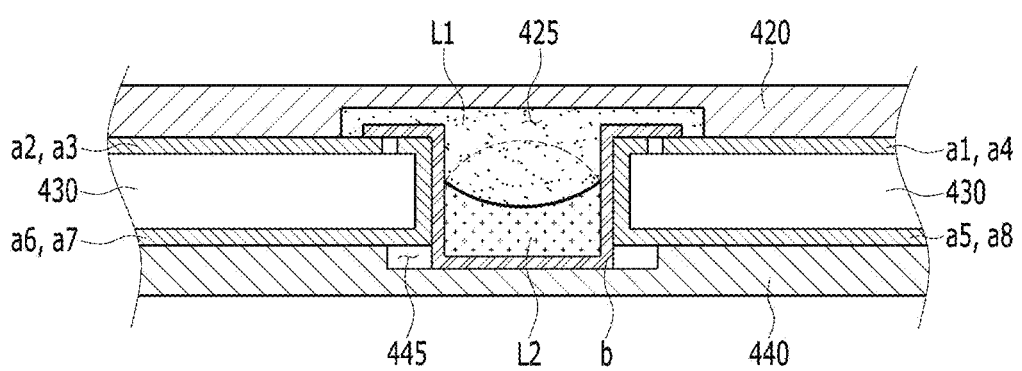
FIGS. 9a to 9l are conceptual sectional views showing various shapes in which a conductive liquid and a nonconductive liquid are received in a cavity in the first embodiment.
Figure 9B:
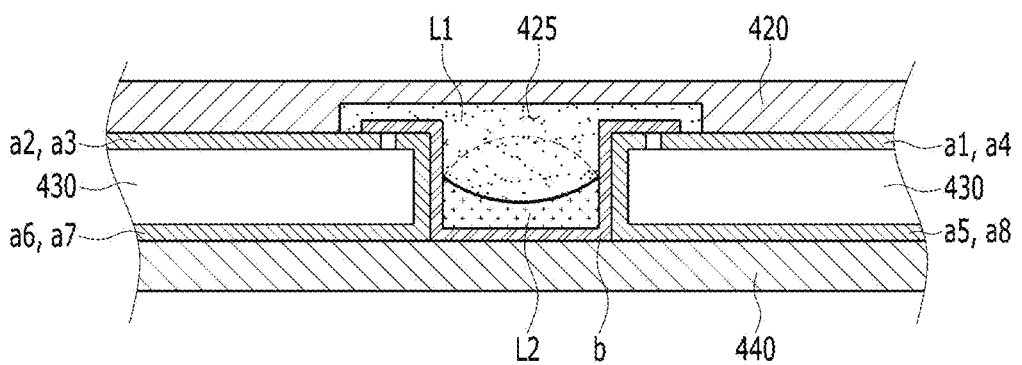
Figure 9C:
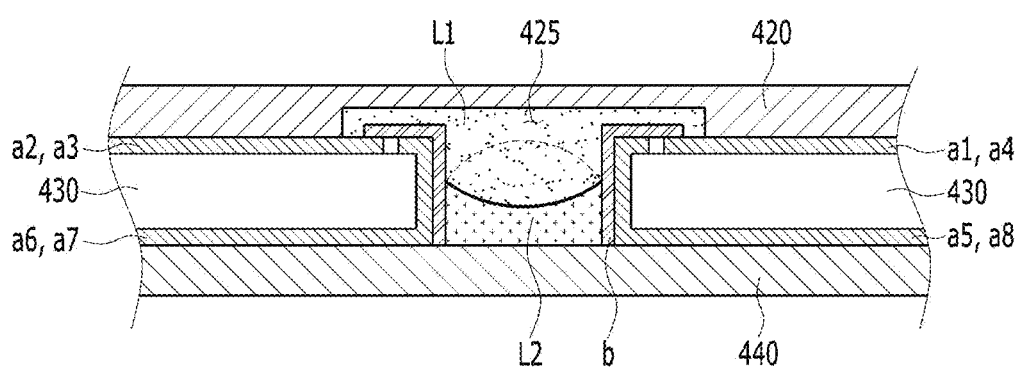
Figure 9D:
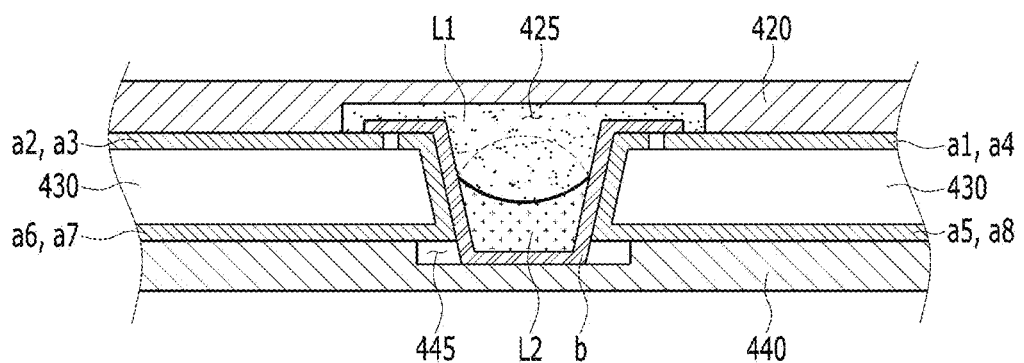
Figure 9E:
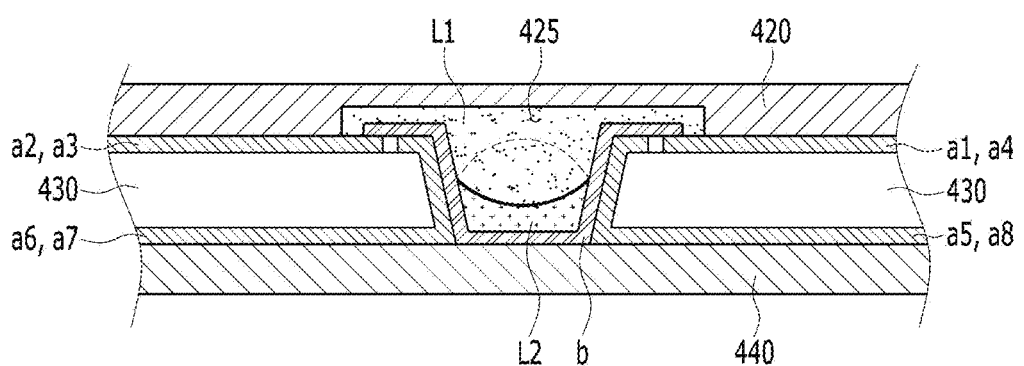
Figure 9F:
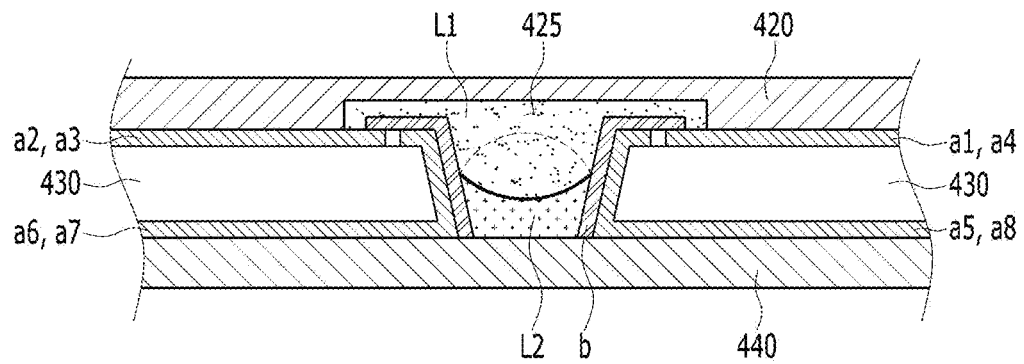
Figure 9G:
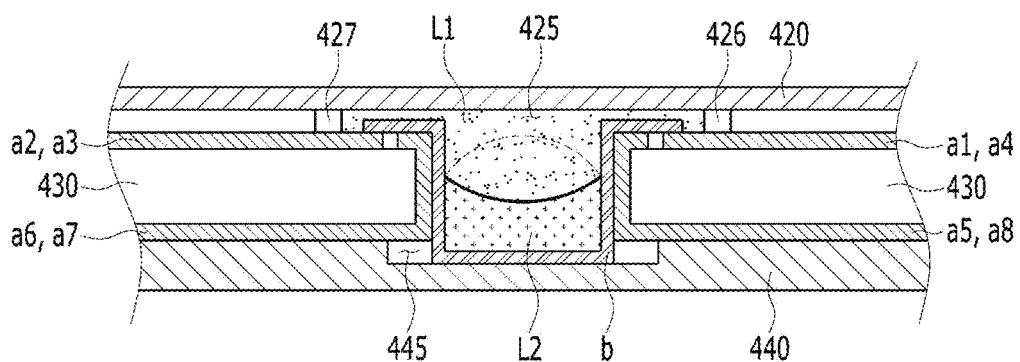
Figure 9H:
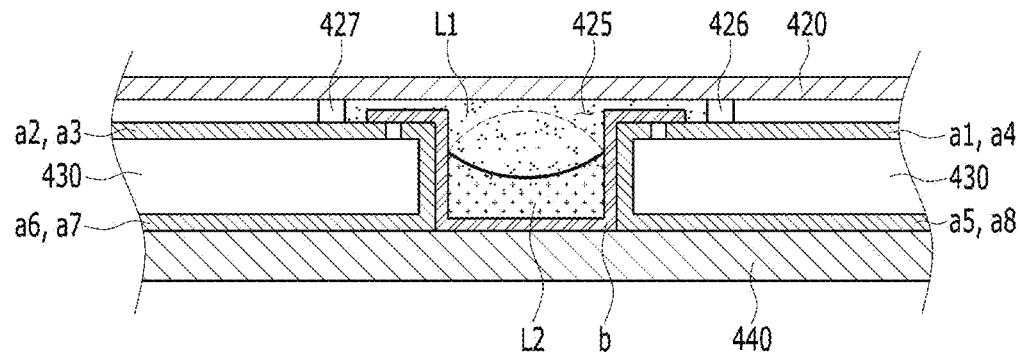
Figure 9I:
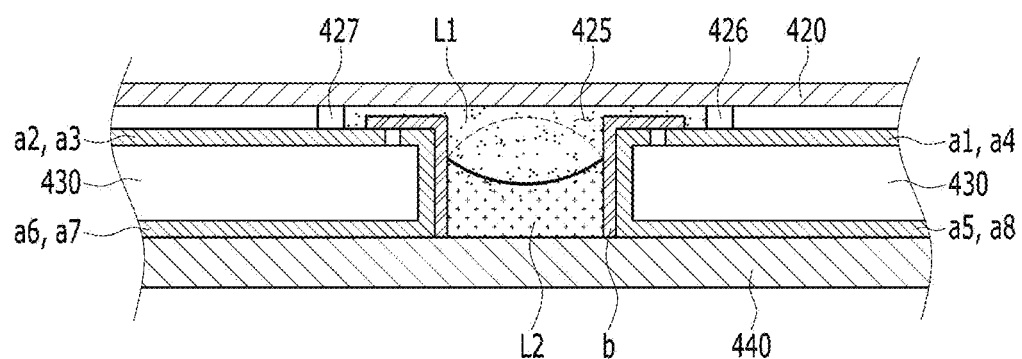
Figure 9J:
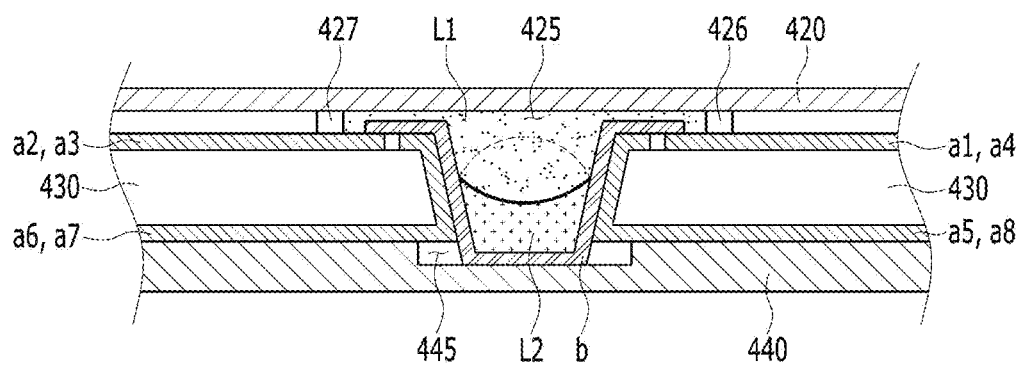
Figure 9K:
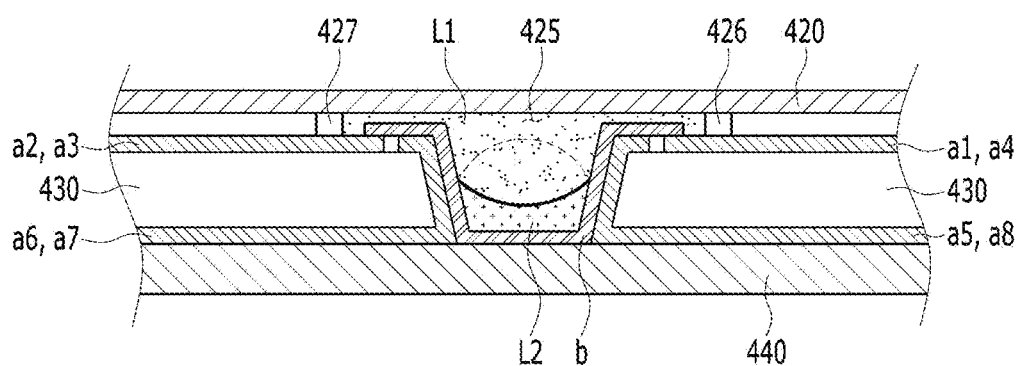
Figure 9L:
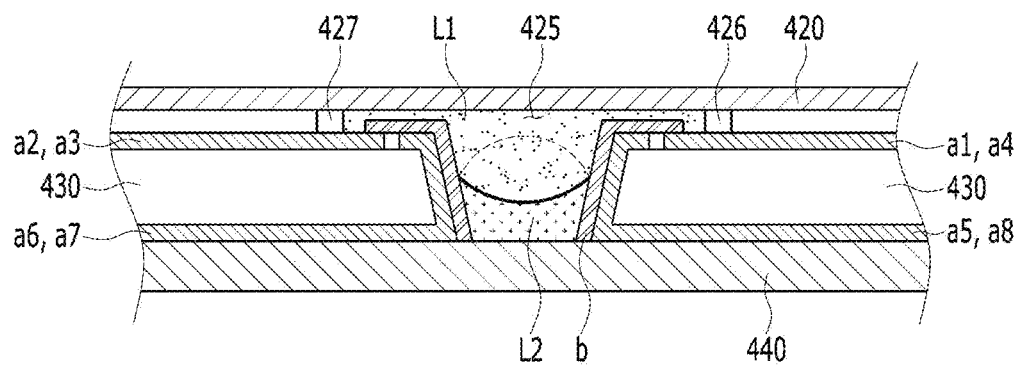
Figure 10:
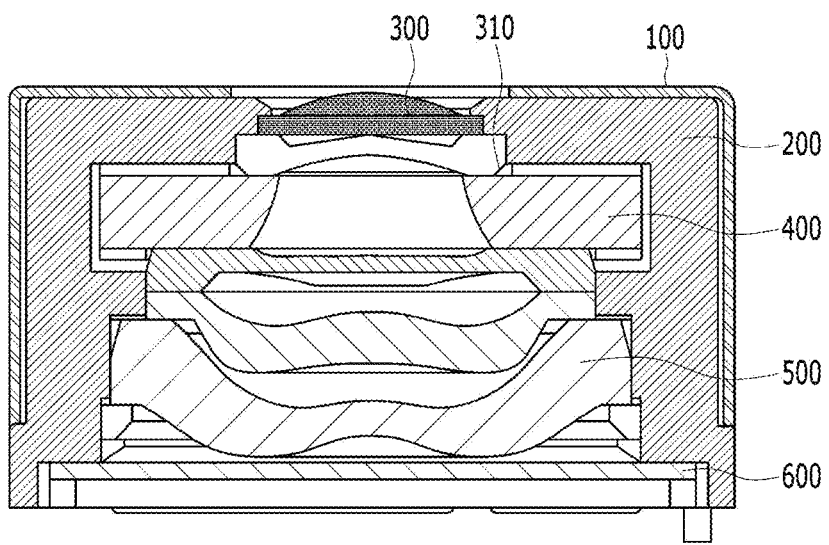
FIG. 10 is a sectional view showing the camera module according to the first embodiment.

FIG. 2 is a perspective view showing a camera module according to a first embodiment, FIG. 3 is an exploded perspective view showing the camera module according to the first embodiment, FIG. 4 is a perspective view showing a shield can according to a first embodiment, FIG. 5 is a perspective view showing a lens holder according to a first embodiment, FIG. 6 is a sectional view showing the lens holder according to the first embodiment, FIG. 7 is an exploded perspective view showing a liquid lens according to a first embodiment, FIG. 8 is a plan view showing the liquid lens according to the first embodiment, FIGS. 9a to 9l are conceptual sectional views showing that a conductive liquid and a nonconductive liquid are received in a cavity in the first embodiment, and FIG. 10 is a sectional view showing the camera module according to the first embodiment.

The camera module 1000 according to the first embodiment may be a camera module for AF. In this case, the camera module 1000 may be referred to as an "AF camera module." Alternatively, the camera module 1000 may be configured as a camera module for OIS.

The camera module 1000 may include a cover member 100, a lens module, an infrared filter 600, a main board 700, an image sensor (not shown), and a controller (not shown). However, one or more selected from among the cover member 100, the infrared filter 600, the main board 700, and the image sensor (not shown) may be omitted from the camera module 1000, or may be changed. The main board 700 may be a printed circuit board on which the image sensor is mounted.

The cover member 100 may define the external appearance of the camera module 1000. The cover member 100 may be formed in the shape of a hexahedron having an open lower portion. However, the disclosure is not limited thereto. The cover member 100 may be a nonmagnetic body. Alternatively, the cover member 100 may be made of a metal sheet. In this case, the cover member 100 may block electromagnetic interference (EMI). Because of this characteristic of the cover member 100, the cover member 100 may be referred to as an "EMI shield can." The cover member 100 may inhibit electromagnetic waves generated outside the camera module 1000 from being introduced into the inside of the cover member 100. In addition, the cover member 100 may inhibit electromagnetic waves generated inside the cover member 100 from being discharged to the outside of the cover member 100. However, the material for the cover member 100 is not limited to the metal sheet.

The cover member 100 may include an upper plate 120 and a plurality of side plates 130. The cover member 100 may include an upper plate 120 and a plurality of side plates 130 extending downwards from the outside of the upper plate 120. The cover member 100 may be located at the outer surface of the lens holder 200. The cover member 100 may abut the outer surface of the lens holder 200. The lower ends of the side plates 130 of the cover member 100 may be mounted to the lens holder 200. The lower ends of the side plates 130 of the cover member 100 may be mounted to a stair portion 250 formed at the lower portion of the lens holder 200.

The upper plate 120 may be formed in the shape of a plate. The side plates 130 may extend downwards from respective sides of the upper plate 120. In this case, the side plates 130 may be integrally formed with the upper plate 120. The upper plate 120 may be provided in the center thereof with a first transmission window 110. The first transmission window 110 may be a circular hole formed in the center of the upper plate 120, and the optical axis of the lens module, a description of which will follow, may extend through the center of the first transmission window 110. Consequently, the light reflected by a subject may be radiated to the lens module through the first transmission window 110.

Several side plates 130 may be provided. The side plates 130 may extend downwards from four sides of the upper plate 120. Consequently, the number of side plates 130 may be four. In addition, the side plates 130 may be spaced apart from each other. The lower ends of the side plates 130 may be mounted to the stair portion 250 formed at the lower portion of the lens holder 200.

Slits 140 may be spaces between the respective side plates 130. That is, the slits 140 may be located between adjacent ones 130 of the side plates 130. The slits 140 may be located along four vertical sides of the cover member 100.

Each slit 140 may include first, second, and third gaps 142, 144, and 146. The first gap 142 may be formed along each vertical side of the cover member 100. In addition, the upper end of the first gap 142 may be divided into two parts at each upper corner of the cover member 100 in order to form the second and third gaps 144 and 146. The upper ends of the second and third gaps 144 and 146 may be round. As a result, the cover member 100 may be formed from a single flat sheet in a developed state, and the side plates 130 may be bent downwards to form the cover member 100. In this case, the side plates 130 may be easily bent, since the upper ends of the second and third gaps 144 and 146 are round. Furthermore, stress is inhibited from being concentrated at both ends of the bent portions of the side plates 130, thereby inhibited cracks from forming.

The lens module may include a lens holder 200, a first lens unit 300, a liquid lens 400, and a second lens unit 500. The main board 700 may be located at the lower side of the lens module. The lens module may be supported by the main board 700. The lower end of the lens module may be mounted to the main board 700. The lower end of the lens module may be mounted to the outside of the upper surface of the main board 700. Light that has been transmitted through the lens module may be radiated to the image sensor, which is mounted on the inside of the upper surface of the main board 700. In this modification (not shown), the lens module may include a base plate. In this case, the lower end of the lens module may be mounted to the base plate so as to be supported by the base plate. In addition, the main board may be located under the base plate. Furthermore, the base plate may be mounted to the outside of the upper surface of the main board.

The lens holder 200 may be a block-shaped plastic molded item and may be referred to as a "housing." The lens holder 200 may be manufactured by core molding. The lens holder 200 may be provided in the center thereof with a core 210 formed in the optical-axis direction. The lens holder 200 may be provided with a core 210 formed through the center of the lens holder 200 in the optical-axis direction.

The core 210 may be located in the lens holder 200 and may have the shape of a hole. The core 210 may be located in the center of the lens holder 200 in the optical-axis direction. The core 210 may be formed in the center of the lens holder 200 in the optical-axis direction. The core 210 may be formed through the lens holder 200 in the upward-downward direction. Consequently, the upper side and the lower side of the lens holder 200 may be open through the core 210. The first lens unit 300, the liquid lens 400, and the second lens unit 500 may be received in the core 210. The core 210 may include a second transmission window 211, a first lens receiving hole 220, a second lens receiving hole 230, an insertion hole 232, and a third lens receiving hole 240. The core 210 may be configured such that the second transmission window 211, the first lens receiving hole 220, the second lens receiving hole 230, and the third lens receiving hole 240 are sequentially located in that order from top to bottom. The first lens unit 300, the liquid lens 400, and the second lens unit 500 may be sequentially received in the core 210 in that order from top to bottom. In this case, the optical axes of the first lens unit 300, the liquid lens 400, and the second lens unit 500 may be aligned with each other.

The second transmission window 211 may be located at the uppermost side of the core 210. The second transmission window 211 may be circular. The first transmission window 110 may be located above the second transmission window 211 so as to be spaced apart from the second transmission window 211. The first lens receiving hole 220 may be located at the lower side of the second transmission window 211. The second transmission window 211 and the first lens receiving hole 220 may communicate with each other in the upward-downward direction. The second transmission window 211 may be integrally formed with the first lens receiving hole 220. That is, the second transmission window 211 may be a portion of the first lens receiving hole 220. In this case, the uppermost lens of the first lens unit 300. may protrude through the second transmission window 211.

The first lens receiving hole 220 may be located in the center of the core 210. The second transmission window 211 may be located at the upper side of the first lens receiving hole 220. The second lens receiving hole 230 may be located at the lower side of the first lens receiving hole 220. The second transmission window 211, the first lens receiving hole 220, and the second lens receiving hole 230 may communicate with each other in the upward-downward direction. The second transmission window 211, the first lens receiving hole 220, and the second lens receiving hole 230 may be aligned with each other in the optical-axis direction. The first lens unit 300 may be received in the first lens receiving hole 220.

The second lens receiving hole 230 may be located in the center of the core 210. The first lens receiving hole 220 may be located at the upper side of the second lens receiving hole 230. The third lens receiving hole 240 may be located at the lower side of the second lens receiving hole 230. The first lens receiving hole 220, the second lens receiving hole 230, and the third lens receiving hole 240 may communicate with each other in the upward-downward direction. The first lens receiving hole 220, the second lens receiving hole 230, and the third lens receiving hole 240 may be aligned with each other in the optical-axis direction. The liquid lens 400 may be received in the second lens receiving hole 230. As a result, the optical axes of the first lens unit 300 and the liquid lens 400 may be aligned with each other.

The insertion hole 232 may be located in the lens holder 200 so as to be inclined with respect to the optical-axis direction. The insertion hole 232 may be located in the lens holder 200 so as to be perpendicular to the optical-axis direction. The insertion hole 232 may be formed through one side of the lens holder 200 so as to be inclined with respect to the optical-axis direction. The insertion hole 232 may be formed through one side of the lens holder 200 so as to be perpendicular to the optical-axis direction. That is, a portion of one side of the lens holder 200 may be open through the insertion hole 232. The insertion hole 232 may communicate with the core 210. The insertion hole 232 may communicate with the second lens receiving hole 230. As a result, the liquid lens 400 may be laterally inserted into the lens holder 200 through the insertion hole 232 so as to be received in the second lens receiving hole 230. A board receiving recess 234 extending downwards so as to communicate with the insertion hole 232 may be formed in one side of the lens holder 200 through which the insertion hole 232 is formed. An upper connection board 410b and a lower connection board 450b, a description of which will follow, may be received in the board receiving recess 234. The board receiving recess 234 may extend to the lower end of the lens holder 200. Since the upper connection board 410b and the lower connection board 450b are located along the board receiving recess 234, the upper connection board 410b and the lower connection board 450b may be connected to the main board 700 located under the lens holder 200.

The third lens receiving hole 240 may be located at the lowermost side of the core 210. The second lens receiving hole 230 may be located at the upper side of the third lens receiving hole 240. The second lens receiving hole 230 and the third lens receiving hole 240 may communicate with each other in the upward-downward direction. The second lens receiving hole 230 and the third lens receiving hole 240 may be aligned with each other in the optical-axis direction. The second lens unit 500 may be received in the third lens receiving hole 240. As a result, the optical axes of the liquid lens 400 and the second lens unit 500 may be aligned with each other.

Generally, the size of the liquid lens 400 is greater than the size of each of the other lenses. When the liquid lens 400 is inserted through the lower opening in the core 210, therefore, an upper core for receiving the first lens unit 300 and the liquid lens 400 and a lower core for receiving the second lens unit 500 are needed. Since the cores are formed through separate core molding processes, the optical axes of the upper core and the lower core may not be aligned with each other. In the first embodiment, however, the liquid lens 400 is inserted laterally through the insertion hole 232. As a result, all of the first lens unit 300, the liquid lens 400, and the second lens unit 500 may be received in a single core 210. That is, all lenses are received in a single core 210 formed through a single core molding process, whereby optical-axis twisting does not occur.

The first lens unit 300 may include one or more lenses. The first lens unit 300 may include two lenses. The lenses of the first lens unit 300 may be located in the state of being stacked. The first lens unit 300 may be received in the first lens receiving hole 220. The lenses of the first lens unit 300 may be configured such that the upper portion of each lens abuts the stair of the first lens receiving hole 220 or an O-ring and such that the lower portion of each lens is supported and fixed by the lower lens or an O-ring. The lower portion of the lowermost lens of the first lens unit 300 may abut the upper surface of an upper plate 420 of the liquid lens 400, a description of which will follow. The lower portion of the lowermost lens of the first lens unit 300 may be supported and fixed by the upper surface of the upper plate 420 of the liquid lens 400, a description of which will follow.

An inclined portion 310 may be located along the outer circumference of the lower surface of the lowermost lens of the first lens unit 300. In this case, the inclined portion 310 may be formed so as to be inclined downwards toward the inside of the first lens unit 300. In the case in which the outer circumference of the lower surface of the lowermost lens is angled, there may be friction with the upper plate 420 when the liquid lens 400 is inserted. In order to inhibit this, the inclined portion 310 is required.

The liquid lens 400 is a lens that controls the curvature of the interface between a conductive liquid and a nonconductive liquid so as to perform AF and OIS functions. When the conductive liquid and the nonconductive liquid are received, and voltage is applied to a cavity coated with an electrode and an insulator, which are stacked, an electrowetting phenomenon, in which the contact angle between the conductive liquid and the inner surface of the cavity coated with the insulator is changed depending on the magnitude of the applied voltage, occurs. The electrowetting phenomenon will be described in more detail with reference to FIG. 1. When a conductive liquid drop 40 is dropped onto the upper surface of an insulation film 14, which is electrically insulated, the conductive liquid drop has a spherical shape, as indicated by the solid line in FIG. 1. When voltage is applied to a second electrode 15 between a first electrode 13 under the insulation film 14 and the conductive liquid drop 40, an electrowetting phenomenon, in which the contact angle between the conductive liquid drop 40 and the upper surface of the insulation film 14 is changed, occurs, as indicated by the dotted line in FIG. 1. Furthermore, when the position to which voltage is applied is changed, the position at which the electrowetting phenomenon occurs is changed. In the liquid lens 400, the curvature of the interface between the conductive liquid and the nonconductive liquid is changed due to the electrowetting phenomenon, and the AF and OIS functions may be performed by controlling the curvature of the interface.

In the following description, the liquid lens 400 according to the first embodiment is configured such that an upper electrode unit includes first to fourth electrodes a1, a2, a3, and a4 and such that an inner wall electrode unit includes fifth to eighth electrodes a5, a6, a7, and a8.

The liquid lens 400 may be located in the lens holder 200. The liquid lens 400 may be received in the core 210. The liquid lens 400 may be received in the second lens receiving hole 230 through the insertion hole 232. The liquid lens 400 may be configured such that the upper portion of the liquid lens abuts the lower surface of the lowermost lens of the first lens unit 300 and the upper surface of the second lens receiving hole 230 and such that the lower portion of the liquid lens is supported and fixed by the upper surface of the uppermost lens of the second lens unit 500 and the lower surface of the second lens receiving hole 230. The liquid lens 400 may be inserted through one side of the lens holder 200 so as to be received in the core 210. The liquid lens 400 may be received in the second lens receiving hole 230 through the insertion hole 232. The liquid lens 400 may be connected to the main board 700. The curvature of the interface of the liquid lens 400 may be controlled.

The liquid lens 400 may be configured such that boards and plates are stacked. The liquid lens 400 may include an upper board 410, an upper plate 420, a core plate 430, a lower plate 440, and a lower board 450.

The upper board 410 may be located at the uppermost side of the liquid lens 400. The upper plate 420 may be located under the upper board 410. The upper surface of the upper board 410 may abut the upper inner wall of the second lens receiving hole 230. The upper board 410 may be connected to the core plate 430. The upper board 410 may be connected to the main board 700. The upper board 410 may supply power to an electrode unit a of the core plate 430, a description of which will follow, under the control of the main board 700. The upper board 410 may change the direction, intensity, and wavelength of the current that is supplied to the electrode unit a and the position to which the current is supplied.

The upper board 410 may include an upper circuit board 410*a* and an upper connection board 410*b*.

The upper circuit board 410*a* may be a printed circuit board (PCB). The upper circuit board 410*a* may be formed in the shape of a plate. The upper circuit board 410*a* may be formed in the shape of a quadrangular plate.

The upper circuit board 410*a* may be provided at a portion thereof corresponding to (opposite to) a cavity 431, a description of which will follow, or a portion thereof radially extending from the portion thereof corresponding to (opposite to) the cavity 431 with an upper guide hole 415 extending to one side. The one side may be the entry side in the direction in which the liquid lens 400 is inserted through the insertion hole 232. When the liquid lens 400 is inserted, therefore, the friction between the lower surface of the lowermost lens of the first lens unit 300 and the upper circuit board 410*a* may be minimized. The lower surface of the lowermost lens of the first lens unit 300 may be supported by the upper guide hole 415 in the state of abutting the upper plate 420. As a result, the lens of the first lens unit 300, which has already been inserted, may be fixed at a predetermined position without moving. Furthermore, the upper circuit board 410*a* may be inhibited from being worn or being separated from the upper plate 420 or the core plate 430 due to friction caused when the liquid lens 400 is inserted.

The upper circuit board 410*a* may be provided with a first upper corner 411, a second upper corner 412, a third upper corner 413, and a fourth upper corner 414, which are arranged in the clockwise direction. The first to fourth upper corners 411, 412, 413, and 414 of the upper circuit board 410*a* may be located further inwards than the corners of the core plate 430. That is, the corners of the upper board 410 may be located inwards from the corners of the core plate 430. When the liquid lens 400 is inserted, therefore, the friction between the first to fourth upper corners 411, 412, 413, and 414 and the upper inner wall and the sidewall of the second lens receiving hole 230 may be minimized. As a result, the first to fourth upper corners 411, 412, 413, and 414 may be inhibited from being separated from the core plate 430, whereby the upper circuit board 410*a* may be inhibited from being separated from the core plate 430.

The first to fourth upper corners 411, 412, 413, and 414 may be connected to the core plate 430. The first to fourth upper corners 411, 412, 413, and 414 may be connected to the electrode unit a of the core plate 430 corresponding thereto (opposite thereto). The first upper corner 411 may be connected to the first electrode a1. The second upper corner 412 may be connected to the second electrode a2. The third upper corner 413 may be connected to the third electrode a3. The fourth upper corner 414 may be connected to the fourth electrode a4. The first to fourth upper corners 411, 412, 413, and 414 may be connected to the first to fourth electrodes a1, a2, a3, and a4 via four upper conductive portions (not shown). In this case, the upper conductive portions (not shown) may extend through first to fourth upper channels 421, 422, 423, and 424 corresponding to (opposite to) the first to fourth upper corners 411, 412, 413, and 414, a description of which will follow. In addition, each of the upper conductive portions may be conductive epoxy. As a result, the first to fourth upper corners 411, 412, 413, and 414 may be adhered to the first to fourth electrodes a1, a2, a3, and a4 via the conductive epoxy. In addition, each of the upper conductive portions may be an electrode pad.

The upper connection board 410b may be a flexible printed circuit board (FPCB). The upper connection board 410b may be connected to the upper circuit board 410a. The upper connection board 410b may be connected to the main board 700. As a result, the main board 700 may supply power to the first to fourth electrodes a1, a2, a3, and a4 via the upper connection board 410b and the upper circuit board 410a.

The upper connection board 410b may extend downwards from the other side of the upper circuit board 410a. The other side may be a side located at the end in the direction in which the liquid lens 400 is inserted through the insertion hole 232. The junction between the upper connection board 410b and the upper circuit board 410a may be round. The upper connection board 410b may be received in the board receiving recess 234 and may extend downwards. In this case, the upper connection board 410b may be protected from the outside, since the cover member 100 is located outside the upper connection board.

The upper plate 420 may be located under the upper board 410. The upper plate 420 may abut the upper board 410. The upper plate 420 may be located above the core plate 430. The upper plate 420 may abut the core plate 430. The upper surface of the upper plate 420 may abut the lower surface of the lowermost lens of the first lens unit 300, which extends through a first guide hole 415. As a result, the lowermost lens of the first lens unit 300 may be supported by the upper plate 420.

The upper plate 420 may be made of a transparent material. The upper plate 420 may be insulative. The upper plate 420 may be made of a glass material. The upper plate 420 may have thereon an antireflection coating. The upper plate 420 may cover the upper portion of the cavity 431, a description of which will follow. Consequently, the upper plate 420 may be referred to as a cover glass. An upper recess 425 may be located in the center of the lower surface of the upper plate 420. As will be described below, in the first embodiment, a conductive liquid L1 is located in the upper portion of the cavity 431 and a nonconductive liquid L2 is located in the lower portion of the cavity 431, whereby the upper recess 425 may be filled with the conductive liquid L1 received in the cavity 431. The upper recess 425 may correspond to (may be opposite to) an insulation portion b coated in a ring shape on the upper surface of the core plate 430, a description of which will follow. The area of the upper recess 425 may be greater than the area of the insulation portion b coated in the ring shape on the upper surface of the core plate 430. As a result, the conductive liquid in the upper recess 425 may abut the first to fourth electrodes a1, a2, a3, and a4.

The upper plate 420 may be provided at the angular points, the outer circumference, or the corners thereof with a first upper channel 421, a second upper channel 422, a third upper channel 423, and a fourth upper channel 424, which are arranged in the clockwise direction. The corners of the upper plate 420 may be cut inwards to form the first upper channel 421, the second upper channel 422, the third upper channel 423, and the fourth upper channel 424 in the clockwise direction. The first to fourth upper channels 421, 422, 423, and 424 may be located between the first to fourth upper corners 411, 412, 413, and 414 and the first to fourth electrodes a1, a2, a3, and a4. The first to fourth upper corners 411, 412, 413, and 414 may be connected to the first to fourth electrodes a1, a2, a3, and a4 via the first to fourth upper channels 421, 422, 423, and 424. The first to fourth upper corners 411, 412, 413, and 414 may be connected to the first to fourth electrodes a1, a2, a3, and a4 via the upper conductive portions (not shown) extending through the first to fourth upper channels 421, 422, 423, and 424. In this case, each of the upper conductive portions may be conductive epoxy. In addition, each of the upper conductive portions may be an electrode pad.

The core plate 430 may be located under the upper plate 420. The core plate 430 may abut the upper plate 420. The core plate 430 may be located above the lower plate 440. The core plate 430 may abut the lower plate 440. The core plate 430 may be provided in the center thereof with a cavity 431. A first liquid L1 and a second liquid L2 may be received in the cavity 431. The core plate 430 may be provided with a cavity 431 formed through the center of the core plate 430. An electrode unit a may be coated on the surface of the core plate 430 and on the inner surface of the cavity 431. An upper electrode unit may be disposed at the upper portion of the core plate 430. The upper electrode unit may include first to fourth electrodes a1, a2, a3, and a4, which are separated from each other. An inner wall electrode unit, which extends to the upper portion of the core plate 430 and the lower portion of the core plate 430, may be disposed on the inner wall of the cavity 431. The inner wall electrode unit may include fifth to eighth electrodes a5, a6, a7, and a8, which are separated from each other. The upper electrode unit and the inner wall electrode unit may be interrupted at the upper portion (the upper surface) of the core plate 430. The electrode unit a on the inner wall of the cavity 431 may be coated with an insulation layer b. In addition, the electrode unit a on the upper surface of the core plate 430 around the cavity 431 may be coated with an insulation layer b. The core plate 430 may be connected to the upper board 410. The core plate 430 may be connected to the lower board 450.

The cavity 431 may be located in the core plate 430. The cavity 431 may be located in the center of the core plate 430. The cavity 431 may be formed through the core plate 430. The cavity 431 may be configured such that the width of the cavity decreases from top to bottom. The cavity 431 may be configured such that the horizontal sectional area of the cavity decreases from top to bottom. The first liquid L1 and the second liquid L2 may be received in the cavity 431. The electrode unit a may be coated on the inner wall of the cavity 431. The inner wall electrodes a5, a6, a7, and a8 may be coated on the inner wall of the cavity 431.

The electrode unit a may be made of a conductive metal. The electrode unit a may include an upper electrode unit and an inner wall electrode unit. The upper electrode unit may include first to fourth electrodes a1, a2, a3, and a4. The inner wall electrode unit may include fifth to eighth electrodes a5, a6, a7, and a8. The electrode unit a may be coated on the surface of the core plate 430. The electrode unit a may be connected to the upper board 410. The electrode unit a may be connected to the upper board 410 via upper conductive portions (not shown). In this case, each of the upper conductive portions may be conductive epoxy. In addition, each of the upper conductive portions may be an electrode pad. The electrode unit a may be connected to the lower board 450. The electrode unit a may be connected to the lower board 450 via lower conductive portions (not shown). In this case, each of the lower conductive portions may be conductive epoxy or an electrode pad.

The first to fourth electrodes a1, a2, a3, and a4 (the upper electrode unit) may be disposed on the upper portion (the upper surface) of the core plate 430. Furthermore, the first to fourth electrodes a1, a2, a3, and a4 may abut the first liquid L1 to apply voltage to the first liquid L1. The first to fourth electrodes a1, a2, a3, and a4 may divide the upper portion (the upper surface) of the core plate 430 into four sectors in the clockwise direction.

The fifth to eighth electrodes a5, a6, a7, and a8 (the inner wall electrode unit) may be disposed on the inner wall of the cavity 431 and on the lower surface and the upper surface of the core plate 430. The fifth to eighth electrodes a5, a6, a7, and a8 may divide the inner wall of the cavity 431 and the lower surface and the upper surface of the core plate 430 into four sectors in the clockwise direction. The insulation layer b may be interposed between the fifth to eighth electrodes a5, a6, a7, and a8 (the inner wall electrode unit) and the first and second liquids L1 and L2. That is, the fifth to eighth electrodes a5, a6, a7, and a8 (the inner wall electrode unit) do not abut the first and second liquids L1 and L2.

The first to fourth electrodes a1, a2, a3, and a4 (the upper electrode unit) and the fifth to eighth electrodes a5, a6, a7, and a8 (the inner wall electrode unit) may not be connected to each other on the upper portion (the upper surface) of the core plate 430. That is, the first to fourth electrodes a1, a2, a3, and a4 (the upper electrode unit) and the fifth to eighth electrodes a5, a6, a7, and a8 (the inner wall electrode unit) may be interrupted on the upper portion of the core plate 430.

The corners of the first to fourth electrodes a1, a2, a3, and a4 may correspond to (may be opposite to) the first to fourth upper corners 411, 412, 413, and 414 of the upper board 410, respectively. The first to fourth upper corners 411, 412, 413, and 414 of the upper board 410 may be connected to corners of the first to fourth electrodes a1, a2, a3, and a4 corresponding thereto (opposite thereto) via the four upper conductive portions. In this case, the first electrode a1 and the first upper corner 411 may be connected to each other via the upper conductive portion extending (passing) through the first upper channel 421. In addition, the second electrode a2 and the second upper corner 412 may be connected to each other via the upper conductive portion extending (passing) through the second upper channel 422. In addition, the third electrode a3 and the third upper corner 413 may be connected to each other via the upper conductive portion extending (passing) through the third upper channel 423. In addition, the fourth electrode a4 and the fourth upper corner 414 may be connected to each other via the upper conductive portion extending (passing) through the fourth upper channel 424. In this case, each of the upper conductive portions may be conductive epoxy or an electrode pad. As a result, power may be supplied to the first to fourth electrodes a1, a2, a3, and a4 via the upper board 410. Furthermore, power may be supplied only to some of the first to fourth electrodes a1, a2, a3, and a4. In addition, the intensity and polarity of the power supplied to the first to fourth electrodes a1, a2, a3, and a4 may be controlled.

The corners of the fifth to eighth electrodes a5, a6, a7, and a8 may correspond to (may be opposite to) first to fourth lower corners 451, 452, 453, and 454 of the lower board 450, respectively. The first to fourth lower corners 451, 452, 453, and 454 of the lower board 450 may be connected to the corners of the fifth to eighth electrodes a5, a6, a7, and a8 corresponding thereto (opposite thereto) via four lower conductive portions (not shown). In this case, the fifth electrode a5 and the first lower corner 451 may be connected to each other via a lower conductive portion extending (passing) through a first lower channel 441. In addition, the sixth electrode a6 and the second lower corner 452 may be connected to each other via a lower conductive portion extending (passing) through a second lower channel 442. In addition, the seventh electrode a7 and the third lower corner 453 may be connected to each other via a lower conductive portion extending (passing) through a third lower channel 443. In addition, the eighth electrode a8 and the fourth lower corner 454 may be connected to each other via a lower conductive portion extending (passing) through a fourth lower channel 444. In this case, each of the lower conductive portions may be conductive epoxy or an electrode pad. As a result, power may be supplied to the fifth to eighth electrodes a5, a6, a7, and a8 via the lower board 450. Furthermore, power may be supplied only to some of the fifth to eighth electrodes a5, a6, a7, and a8. In addition, the intensity and polarity of the power supplied to the fifth to eighth electrodes a5, a6, a7, and a8 may be controlled.

The insulation layer b may be made of an insulative polymer. The insulation layer b may be a parylene coating layer. The insulation layer b may be made of an insulative (nonconductive) oxide. The insulation layer b may be coated on the electrode unit a. The insulation layer b may be coated on the electrode unit a by stacking. The insulation layer b may be coated on the electrode unit a along the inner wall of the cavity 431. The insulation layer b may be coated on the lower plate 440 opposite to the cavity 431. In this case, the insulation layer b may abut the upper surface of the lower plate 440. In addition, the insulation layer b may abut a lower recess 445 of the lower plate 440, a description of which will follow. The insulation layer b may be coated on the electrode unit a along the circumference of the cavity 431 on the upper surface of the core plate 430. The insulation layer b disposed on the inner wall of the cavity 431, the insulation layer b disposed on the lower plate 440, and the insulation layer b disposed along the circumference of the cavity 431 on the upper surface of the core plate 430 may be integrally formed. As a result, the insulation layer b may abut the first liquid L1 and the second liquid L2, and may receive the first liquid L1 and the second liquid L2. The thickness of the insulation layer b may be 200 nm or more. Particularly, if the thickness of the insulation layer b disposed on the lower plate 440 is less than 200 nm, the insulation layer b may be worn during the use thereof, which is undesirable. The light transmittance of the insulation layer b may be 85% or more. In particular, for light having a wavelength of 430 nm to 680 nm, the transmittance of the insulation layer b may be 85% or more. If the transmittance of the insulation layer is less than 85%, the amount of light that is radiated to the image sensor is not sufficient, whereby the resolution of output images or video is reduced.

The lower plate 440 may be located above the lower board 450. The lower plate 440 may abut the lower board 450. The lower plate 440 may be located under the core plate 430. The lower plate 440 may abut the core plate 430. The lower surface of the lower plate 440 may abut the upper surface of the uppermost lens of the second lens unit 500, which extends through a second guide hole 455. As a result, the uppermost lens of the second lens unit 500 may be fixed by the lower plate 440.

The lower plate 440 may be made of a transparent material. The lower plate 440 may be insulative. The lower plate 440 may be made of a glass material. The lower plate 440 may have thereon an antireflection coating. The lower plate 440 may cover the upper portion of the cavity 431, a description of which will follow. Consequently, the lower plate 440 may be referred to as a cover glass. An insulation layer b may be formed on the lower plate 440. The portion of the upper surface of the lower plate 440 opposite to the cavity 431 may be coated with the insulation layer b. A lower recess 445 may be located in the center of the lower surface of the lower plate 440. The lower recess 445 in the lower plate 440 may be coated with the insulation layer b. As a result, the second liquid L2 in the lower recess 445 does not abut the fifth to eighth electrodes a5, a6, a7, and a8.

The lower plate 440 may be provided at the corners thereof with a first lower channel 441, a second lower channel 442, a third lower channel 443, and a fourth lower channel 444, which are arranged in the clockwise direction. The corners of the lower plate 440 may be cut inwards to form the first lower channel 441, the second lower channel 442, the third lower channel 443, and the fourth lower channel 444 in the clockwise direction. The first to fourth lower recesses 441, 442, 443, and 444 may be located between the first to fourth lower corners 451, 452, 453, and 454 and the fifth to eighth electrodes a5, a6, a7, and a8. The first to fourth lower corners 451, 452, 453, and 454 may be connected to the fifth to eighth electrodes a5, a6, a7, and a8 via the first to fourth lower recesses 441, 442, 443, and 444. The first to fourth lower corners 451, 452, 453, and 454 may be connected to the fifth to eighth electrodes a5, a6, a7, and a8 via lower conductive portions (not shown) extending through the first to fourth lower recesses 441, 442, 443, and 444. In this case, each of the lower conductive portions may be conductive epoxy.

The lower board 450 may be located at the lowermost side of the liquid lens 400. The lower plate 440 may be located above the lower board 450. The lower surface of the lower board 450 may abut the lower inner wall of the second lens receiving hole 230. The lower board 450 may be connected to the core plate 430. The lower board 450 may be connected to the main board 700. The lower board 450 may supply power to the fifth to eighth electrodes a5, a6, a7, and a8 of the core plate 430, a description of which will follow, under the control of the main board 700. The lower board 450 may change the direction, intensity, and wavelength of the current that is supplied to the fifth to eighth electrodes a5, a6, a7, and a8 and the position to which the current is supplied.

The lower board 450 may include a lower circuit board 450*a* and a lower connection board 450*b*.

The lower circuit board 450*a* may be a printed circuit board (PCB). The lower circuit board 450*a* may be formed in the shape of a plate. The lower circuit board 450*a* may be formed in the shape of a quadrangular plate.

The lower circuit board 450*a* may be provided at the portion thereof corresponding to (opposite to) the cavity 431, a description of which will follow, or the portion thereof radially extending from the portion thereof corresponding to (opposite to) the cavity 431 with a lower guide hole 445. Consequently, the upper surface of the uppermost lens of the second lens unit 500 may be fixed by the lower guide hole 445 in the state of abutting the lower plate 440. That is, the uppermost lens of the second lens unit 500 may not be fixed in the state of abutting the lower circuit board 450*a*, which is important from the aspect of electrical control and which may be worn or separated due to friction, but may be fixed in the state of abutting the lower plate 440, which is relatively stable.

The lower circuit board 450*a* may be provided with a first lower corner 451, a second lower corner 452, a third lower corner 453, and a fourth lower corner 454, which are arranged in the clockwise direction. The first to fourth lower corners 451, 452, 453, and 454 of the lower circuit board 450*a* may be located further inwards than the corners of the core plate 430. That is, the corners of the lower board 450 may be located inwards from the corners of the core plate 430. When the liquid lens 400 is inserted, therefore, the friction between the first to fourth lower corners 451, 452, 453, and 454 and the lower inner wall and the sidewall of the third lens receiving hole 240 may be minimized. As a result, the first to fourth lower corners 451, 452, 453, and 454 may be inhibited from being separated from the core plate 430, whereby the lower circuit board 450*a* may be inhibited from being separated from the core plate 430.

The first to fourth lower corners 451, 452, 453, and 454 may be connected to the core plate 430. The first to fourth lower corners 451, 452, 453, and 454 may be connected to the electrode unit a of the core plate 430 corresponding thereto (opposite thereto). The first lower corner 451 may be connected to the fifth electrode a5. The second lower corner 452 may be connected to the sixth electrode a6. The third lower corner 453 may be connected to the seventh electrode a7. The fourth lower corner 454 may be connected to the eighth electrode a8. The first to fourth lower corners 451, 452, 453, and 454 may be connected to the fifth to eighth electrodes a5, a6, a7, and a8 via four lower conductive portions (not shown). In this case, the lower conductive portions (not shown) may extend through the first to fourth lower channels 441, 442, 443, and 444 corresponding to (opposite to) the first to fourth lower corners 451, 452, 453, and 454, a description of which will follow. In addition, each of the lower conductive portions may be conductive epoxy. As a result, the first to fourth lower corners 451, 452, 453, and 454 may be adhered to the fifth to eighth electrodes a5, a6, a7, and a8 via the conductive epoxy. In addition, the first to fourth lower corners 451, 452, 453, and 454 may be adhered to the fifth to eighth electrodes a5, a6, a7, and a8 via electrode pads.

The lower connection board 450*b* may be a flexible printed circuit board (FPCB). The lower connection board 450*b* may be connected to the lower circuit board 450*a*. The lower connection board 450*b* may be connected to the main board 700. As a result, the main board 700 may supply power to the fifth to eighth electrodes a5, a6, a7, and a8 via the lower connection board 450*b* and the lower circuit board 450*a*.

The lower connection board 450*b* may extend downwards from the other side of the lower circuit board 450*a*. The other side may be a side located at the end in the direction in which the liquid lens 400 is inserted through the insertion hole 232. The junction between the lower connection board 450*b* and the lower circuit board 450*a* may be round. The lower connection board 450*b* may be received in the board receiving recess 234 and may extend downwards. In this case, the lower connection board may be protected from the outside, since the cover member 100 is located outside the lower connection board.

Hereinafter, various examples of the liquid lens 400 according to the first embodiment will be described with reference to FIGS. 9*a* to 9*l*. In the following description, light reflected by a subject is transmitted through the liquid lens 400 from top to bottom. In addition, an upper board 410 and a lower board 450 having the same technical concept as in the above description will be omitted from various examples of the liquid lens 400, and a description thereof will also be omitted.

In the liquid lens 400 of FIG. 9*a*, the upper recess 425 may be formed in the upper plate 420, and the lower recess 445 may be formed in the lower plate 440. The electrode unit a is disposed on the inner wall of the cavity 431 and on the upper surface and the lower surface of the core plate 430. The upper electrode unit a1, a2, a3, and a4 may be disposed on the upper surface of the core plate 430, and may be interrupted at the circumference of the cavity 431 on the upper surface of the core plate 430. The inner wall electrode unit a5, a6, a7, and a8 may be disposed on the upper surface of the core plate 430 at the circumference of the cavity 431, the inner wall of the cavity 431, and the lower surface of the core plate 430, and may be interrupted at the circumference of the cavity 431 on the upper surface of the core plate 430. That is, the upper electrode unit a1, a2, a3, and a4 and the inner wall electrode unit a5, a6, a7, and a8 may be interrupted on the upper surface of the core plate 430, and thus may not be connected to each other. The insulation layer b may be disposed on the electrode unit a along the circumference of the cavity 431 in the core plate 430. In this case, the insulation layer b may extend through the gap between the upper electrode unit a1, a2, a3, and a4 and the inner wall electrode unit a5, a6, a7, and a8. In addition, the insulation layer b may be disposed on the upper surface of the lower recess 445. As a result, the lower surface of the insulation layer b may be disposed in the lower recess 445. The insulation layer b may extend from the lower surface thereof along the inner wall of the cavity 431 so as to be disposed on the inner wall electrode unit a5, a6, a7, and a8. The insulation layer b may extend through the inner wall electrode unit a5, a6, a7, and a8 from the inner wall of the cavity 431 along the upper surface of the core plate 430 so as to be located on the upper electrode unit a1, a2, a3, and a4. The second liquid L2 may be disposed in the lower portion of the cavity 431 so as to be received in the lower portion of the insulation layer b. The first liquid L1 may be disposed in the upper portion of the cavity 431 so as to be received in the upper portion of the insulation layer b and the upper recess 425. In this case, the second liquid L2 may abut the upper electrode unit a1, a2, a3, and a4.

The first liquid L1 may be a conductive liquid, and the second liquid L2 may be a nonconductive liquid. The first liquid L1 may include water, and the second liquid L2 may include oil.

The first liquid L1 may be located above the second liquid L2. The first liquid L1 and the second liquid L2 may have different indices of refraction, and may contact each other to form an interface therebetween. When voltage is applied to the electrode unit a, the interface may move along the inner wall of the cavity 431.

In the initial state, in which no voltage is applied to the electrode unit a, the liquid lens 400 may have a negative (−) diopter. When voltage is applied to the electrode unit a, the liquid lens 400 may have a positive (+) diopter. That is, in the initial state, the interface may be convex downwards. In this case, the liquid lens 400 may serve as a concave lens. As voltage is applied to the electrode unit a, the interface may gradually become convex upwards, whereby the liquid lens 400 may serve as a convex lens. In addition, the radius of curvature of the interface that is convex downwards in the initial state may be greater than the radius of curvature of the interface that is convex upwards in the state in which the maximum voltage is applied to the electrode unit a.

The liquid lens of FIG. 9b is analogous to the liquid lens of FIG. 9a. Compared to the liquid lens of FIG. 9a, however, the lower recess 445 is omitted. As a result, the insulation layer b may be directly disposed on the upper surface of the lower plate 440 opposite to the cavity 431.

The liquid lens of FIG. 9c is analogous to the liquid lens of FIG. 9a. Compared to the liquid lens 400 of FIG. 9a, however, the lower recess 445 is omitted. Furthermore, no insulation layer b may be disposed on the lower plate 440.

The liquid lens of FIG. 9d is analogous to the liquid lens of FIG. 9a. However, the cavity 431 may be inclined. In this case, the width of the cavity 431 may gradually decrease downwards. That is, the horizontal sectional area of the cavity 431 may gradually decrease downwards. Furthermore, the liquid lens of FIG. 9e is configured such that the cavity 431 in the liquid lens of FIG. 9b is inclined, and the liquid lens of FIG. 9f is configured such that the cavity 431 in the liquid lens of FIG. 9c is inclined.

The liquid lens of FIG. 9g is analogous to the liquid lens of FIG. 9a. However, no upper recess 425 may be formed in the liquid lens of FIG. 9g. Instead, the upper plate 420 and the core plate 430 may be coupled to each other using a first adhesive member 427 and a second adhesive member 426. That is, the upper plate 420 and the core plate 430 may be spaced apart from each other by the first adhesive member 427 and the second adhesive member 426. The gap between the upper plate and the core plate may be filled with the first liquid L1, which may abut the upper electrodes a1, a2, a3, and a4. In this case, each of the first adhesive member 427 and the second adhesive member 426 may be a nonconductive material. The liquid lens of FIG. 9h is configured such that the first and second adhesive members 427 and 426 are disposed in place of the upper recess 425 in the liquid lens of FIG. 9b. The liquid lens of FIG. 9i is configured such that the first and second adhesive members 427 and 426 are disposed in place of the upper recess 425 in the liquid lens of FIG. 9c. The liquid lens of FIG. 9j is configured such that the first and second adhesive members 427 and 426 are disposed in place of the upper recess 425 in the liquid lens 400 of FIG. 9d. The liquid lens of FIG. 9k is configured such that the first and second adhesive members 427 and 426 are disposed in place of the upper recess 425 in the liquid lens of FIG. 9e. The liquid lens of FIG. 9l is configured such that the first and second adhesive members 427 and 426 are disposed in place of the upper recess 425 in the liquid lens of FIG. 9f.

The liquid lens 400 according to the first embodiment may be disposed in the lens module in the inverted state (see FIG. 10). In this case, the liquid lens 400 may have a positive (+) diopter in the initial state, in which no voltage is applied to the electrode unit a, and the liquid lens 400 may have a negative (−) diopter when voltage is applied to the electrode unit a. That is, in the initial state, the interface may be convex upwards. In this case, the liquid lens 400 may serve as a convex lens. As voltage is applied to the electrode unit a, the interface may gradually become convex downwards, whereby the liquid lens 400 may serve as a concave lens. In addition, the radius of curvature of the interface that is convex upwards in the initial state may be greater than the radius of curvature of the interface that is convex downwards in the state in which the maximum voltage is applied to the electrode unit a.

The second lens unit 500 may include one or more lenses. The second lens unit 500 may include three lenses. The lenses of the second lens unit 500 may be located in the state of being stacked. The second lens unit 500 may be received in the third lens receiving hole 240. The lenses of the second lens unit 500 may be configured such that the upper portion of each lens abuts the stair of the third lens receiving hole 240 or an O-ring and such that the lower portion of each lens is supported and fixed by the lower lens or an O-ring. The upper portion of the uppermost lens of the second lens unit

500 may be fixed in the state of abutting the lower surface of the lower plate 440 of the liquid lens 400.

The infrared filter 600 may inhibit infrared light from being incident on the image sensor. The infrared filter 600 may be located between the lens module and the main board 700. The infrared filter 600 may be located between the lens module and the image sensor. The infrared filter 600 may be made of a film material or a glass material. The infrared filter 600 may be formed by coating a plate-shaped optical filter, such as a cover glass for protecting an image plane, with an infrared cutoff material. The infrared filter 600 may be an infrared cutoff filter or an infrared absorption filter.

The main board 700 may be a printed circuit board (PCB). The main board 700 may support the lens holder 200. The image sensor may be mounted on the main board 700. In an example, the image sensor may be located at the inside of the upper surface of the main board 700, and the lens holder 200 may be located at the outside of the upper surface of the main board 700. In this structure, light that has passed through the lens module may be radiated to the image sensor mounted on the main board 700. The main board 700 may supply power to the liquid lens 400. The main board 700 may supply power to the first to fourth electrodes a1, a2, a3, and a4 via the upper board 410. The main board 700 may supply power to the fifth to eighth electrodes a5, a6, a7, and a8 via the lower board 450. Meanwhile, the controller may be located at the main board 700. Consequently, the direction, intensity, and wavelength of current that is supplied to the first to eighth electrodes a1, a2, a3, a4, a5, a6, a7, and a8 and the position to which the current is supplied may be controlled.

The image sensor may be mounted on the main board 700. The image sensor may be located such that the optical axis of the image sensor is aligned with the optical axis of the lens module. As a result, the image sensor may acquire light that has passed through the lens module. The image sensor may output radiated light as an image. The image sensor may be a charge-coupled device (CCD), metal oxide semiconductor (MOS), CPD, or CID. However, the kind of image sensor is not limited thereto.

The controller may be mounted on the main board 700. The controller may control the direction, intensity, and wavelength of current that is supplied to the first to eighth electrodes a1, a2, a3, a4, a5, a6, a7, and a8. The controller may control the liquid lens 400 to perform at least one of the AF function or the OIS function of the camera module 1000. That is, the controller may control the liquid lens 400 to change the curvature of the interface of the liquid lens 400.

Hereinafter, the AF and OIS functions of the camera module 1000 according to the first embodiment will be described. The functions of the camera module 1000 according to the first embodiment may be performed by changing the curvature of the interface between the first liquid L1 and the second liquid L2 received in the cavity 431.

The specific gravities of the first liquid L1 and the second liquid L2 may be similar or almost equal to each other. In a system in which the first liquid L1 and the second liquid L2 exist, therefore, gravity may be ignored. That is, the system in which the first liquid L1 and the second liquid L2 exist is little affected by gravity but is greatly affected by surface tension.

The interface between the first liquid L1 and the second liquid L2 may be changed. More specifically, the curvature of the interface between the first liquid L1 and the second liquid L2 may be controlled to perform the AF and OIS functions.

An example of the AF function will be described. When voltage is applied such that the first to fourth electrodes a1, a2, a3, and a4 (the upper electrode unit) and the fifth to eighth electrodes a5, a6, a7, and a8 (the inner wall electrode unit) have opposite polarities, the conductive liquid L1, located in the upper portion of the cavity 2431, abuts the first to fourth electrodes a1, a2, a3, and a4 and is separated from the fifth to eighth electrodes a5, a6, a7, and a8 by the insulation layer b and the nonconductive liquid L2, whereby an electrowetting phenomenon occurs. Consequently, the curvature of the interface is changed depending on the magnitude of voltage, whereby the AF function is performed. The magnitude of voltage may be controlled by the controller, as previously described.

An example of the OIS function will be described. When voltage is applied such that some of the first to fourth electrodes a1, a2, a3, and a4 (the upper electrode unit) and the fifth to eighth electrodes a5, a6, a7, and a8 (the inner wall electrode unit) have opposite polarities, the curvature of the interface may be changed so as to be biased to one of the first to fourth electrodes a1, a2, a3, and a4. Consequently, the magnitude of voltage and some of the first to fourth electrodes a1, a2, a3, and a4 to which voltage is to be applied may be selected to perform the OIS function. The magnitude of voltage and the electrodes to which voltage is to be applied may be controlled by the controller, as previously described.

Hereinafter, Abbe numbers of the first liquid L1 and the second liquid L2 of the liquid lens 400 according to this embodiment will be described.

A refractive index is a ratio of the speed of light in a vacuum to the speed of light when passing through a specific medium. A refractive index $n_d$ is designated at a wavelength of 587.6 nm (Helium D-line). Dispersion indicates variation of the refractive index depending on the wavelength. The dispersion is designated by an Abbe number $v_d$, defined as $(n_d-1)/(n_f-n_c)$, and is in inverse proportion to the Abbe number. Here, $n_f$ is a refractive index at 486.1 nm (Hydrogen F-line), and ne is a refractive index at 656.3 nm (Hydrogen C-line). A lens having a bad Abbe number causes chromatic aberration, whereby the resolution of the lens is reduced. In general, a good Abbe number ranges from 40 to 50, and a bad Abbe number is less than 30.

Meanwhile, the liquid lens 400 includes a first lens L1, which is conductive, and a second lens L2, which is nonconductive, unlike a general lens. As previously described, the first liquid L1, which constitutes the liquid lens 400, may be water, and the second liquid L2 may be oil or silicone. The refractive index $n_d$ of the second liquid L2 may be greater than the refractive index $n_d$ of the first liquid L1. Alternatively, the refractive index $n_d$ of the first liquid L1 may be greater than the refractive index $n_d$ of the second liquid L2.

The refractive index $n_d$ of the second liquid L2 may be 0.1 or more greater than the refractive index $n_d$ of the first liquid L1. If the difference between the refractive index $n_d$ of the second liquid L2 and the refractive index $n_d$ of the first liquid L1 is less than 0.1, the ability to perform focus adjustment based on a change in the curvature of the interface between the first liquid L1 and the second liquid L2 is reduced, which is undesirable.

In addition, since the liquid lens 400 has two media, through which light is transmitted, the Abbe number of the first liquid L1 and the Abbe number of the second liquid L2 are different from each other, whereby the position of light radiated to the image sensor is changed for respective wavelengths. Consequently, it is necessary to realize appropriate resolution through simulation for changing the absolute value of the difference between the Abbe number of the first liquid L1 and the Abbe number of the second liquid L2.

Figure 11A:
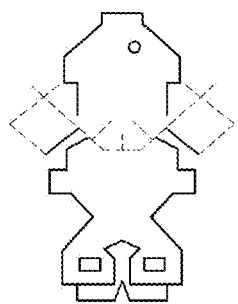
FIGS. 11a to 11c are views showing spot images based on Abbe numbers of first and second liquids.
Figure 11B:
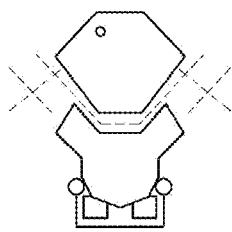
Figure 11C:
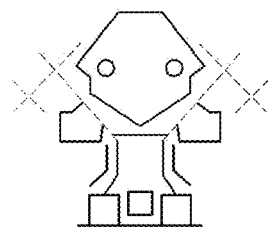

FIGS. 11a to 11c are views showing spot images of light having red (R), green (G), and blue (B) wavelengths that has passed through the liquid lens 400. Simulation for changing the absolute value of the difference between the Abbe number of the first liquid L1 and the Abbe number of the second liquid L2 was performed. The spot images were analyzed to evaluate a modulation transfer function (MTF). An MTF is an index for evaluating the performance of a lens, and whether the lens has a high spatial frequency and whether the lens has a high contrast transfer ability are principally measured. In general, when the MTF value of a lens is 40 or higher, the lens is deemed to have a predetermined spatial frequency resolution and contrast transfer ability. That is, when the MTF value of a lens is 40 or higher, the lens may exhibit appropriate resolution.

FIG. 11a shows a spot image in the case in which the Abbe number $v_d$ of the first liquid L1 is 58.5 and the Abbe number $v_d$ of the second liquid L2 is 33.8. As the result of analysis, the MTF value is 27.

FIG. 11b shows a spot image in the case in which the Abbe number $v_d$ of the first liquid L1 is 58.5 and the Abbe number $v_d$ of the second liquid L2 is 44. As the result of analysis, the MTF value is 40, whereby it is possible to guarantee proper resolution.

FIG. 11c shows a spot image in the case in which the Abbe number $v_d$ of the first liquid L1 is 58.5 and the Abbe number $v_d$ of the second liquid L2 is 55. As the result of analysis, the MTF value is 48, whereby it is possible to guarantee resolution exceeding appropriate resolution.

As the result of simulation, proper resolution may be guaranteed when the absolute value of the difference between the Abbe number $v_d$ of the first liquid L1 and the Abbe number $v_d$ of the second liquid L2 is less than 15.

Figure 12:
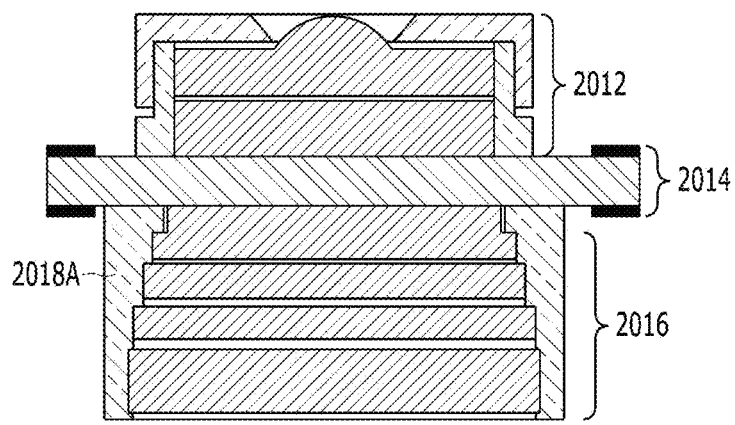
FIG. 12 is a view illustrating a second embodiment of a lens assembly including a liquid lens and a solid lens.

FIG. 12 is a view illustrating a second embodiment of a lens assembly including a liquid lens and a solid lens.

As shown, the lens assembly may include a liquid lens module 2014 and a solid lens. The lens assembly may further include a holder 2018A for receiving the liquid lens module 2014 and the solid lens. The lens assembly may include a liquid lens module 2014, a first lens unit 2012 disposed above the liquid lens module 2014, a second lens unit 2016 disposed under the liquid lens module 2014, and a holder 2018A for receiving the liquid lens module 2014, the first lens unit 2012, and the second lens unit 2016, the holder 2018A being open at the upper and lower portions thereof. Here, each of the first lens unit 2012 and the second lens unit 2016 may include at least one lens. The second lens unit 2016 may be opposite to the first lens unit 2012 in the state in which the liquid lens module 2014 is disposed therebetween. At least one of the first lens unit 2012 or the second lens unit 2016 may be omitted.

In some embodiments, the liquid lens module 2014 may be disposed under the first lens unit 2012, which includes a plurality of lenses, or between the first lens unit 2012 and the second lens unit 2016, or may be disposed about or under the lenses (i.e. at the uppermost side or at the lowermost side).

When assembling the lens assembly, the lenses included in the first lens unit 2012 and the second lens unit 2016 may be coupled to the holder 2018A, and then the liquid lens module 2014 may be coupled to the holder 2018A.

Figure 13:
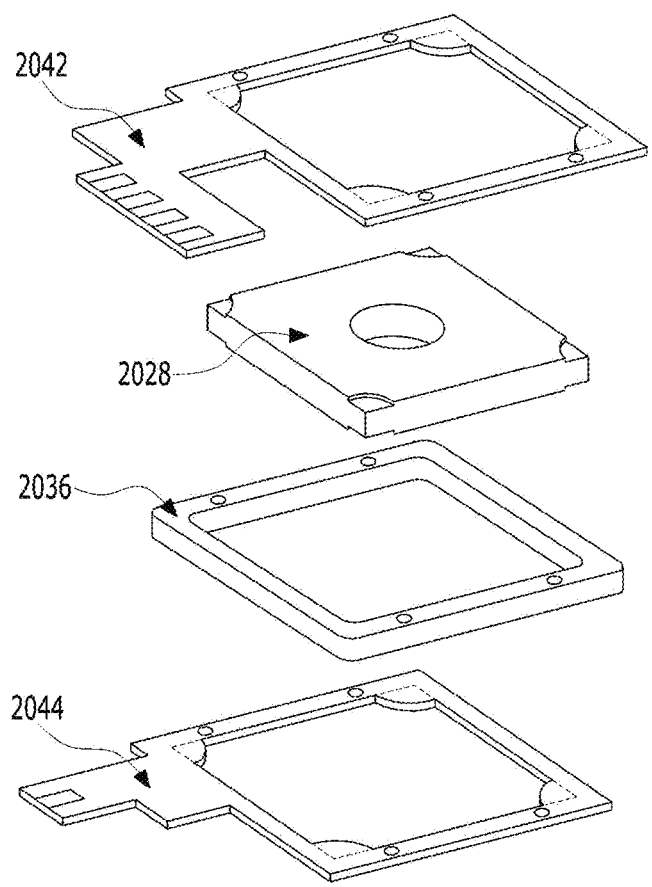
FIG. 13 is a view illustrating a liquid lens module of FIG. 12.

FIG. 13 is a view illustrating the liquid lens module 2014 of FIG. 12.

As shown, the liquid lens module 2014 may include a liquid lens 2028 and at least one board. The liquid lens module 2014 may include a liquid lens 2028 having an interface formed by two different kinds of liquid, a spacer 2036 disposed so as to surround the liquid lens, and at least one board 2042 and 2044 for applying voltage to the liquid lens. The thickness of the corners of the liquid lens 2028 may be smaller than the thickness of the central portion of the liquid lens.

The liquid lens 2028 may include two different kinds of liquid, such as a conductive liquid and a nonconductive liquid, and the curvature or the shape of the interface between the two liquids may be adjusted by varying drive voltage supplied to the liquid lens 2028. The drive voltage supplied to the liquid lens 2028 may be transmitted via the first board 2042 and/or the second board 2044. The first board 2042 may transmit a plurality of (for example, 4 or 8) distinguishable drive voltages, and the second board 2044 may transmit at least one voltage. The second board 2044 may transmit a reference voltage. The voltages supplied through the first board 2042 and the second board 2044 may be applied to a plurality of electrodes exposed at the corners of the liquid lens 2028.

Figure 14:
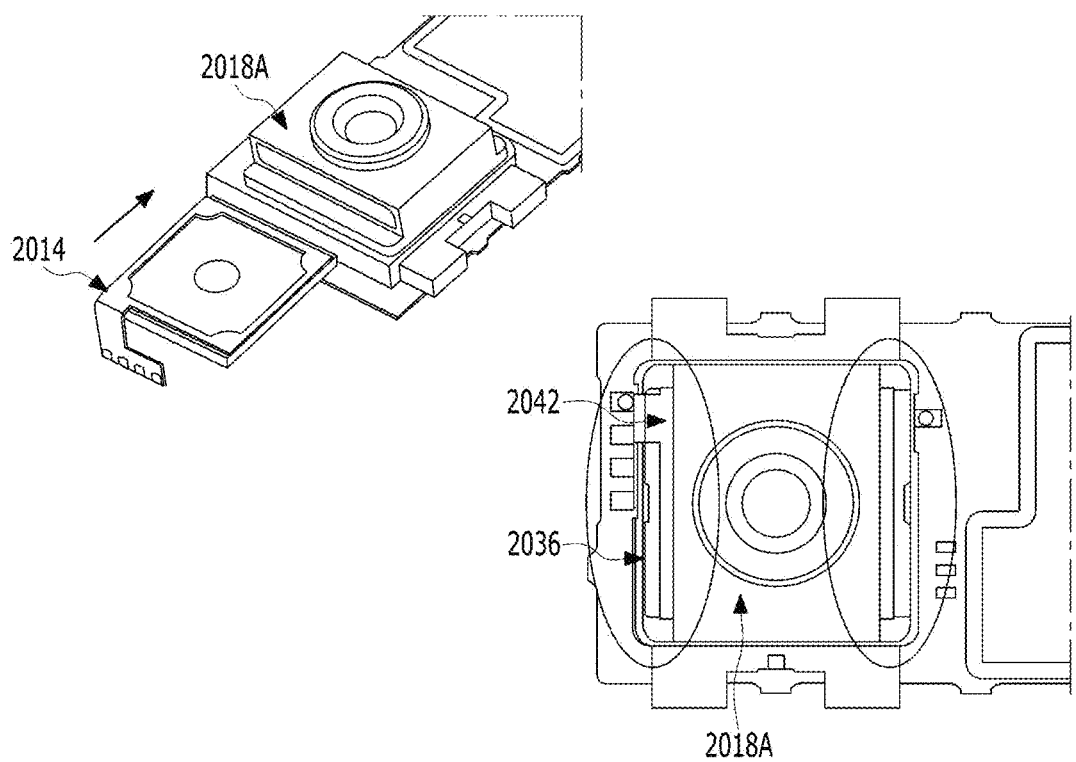
FIG. 14 is a view illustrating a first example of a holder for receiving the liquid lens and the solid lens in FIG. 12.

FIG. 14 is a view illustrating a first example of the holder for receiving the liquid lens and the solid lens in FIG. 12.

As shown, the liquid lens module 2014 may be inserted into an opening region formed in the side surface of the holder 2018A in the direction indicated by an arrow, and the central axis of the liquid lens module may be aligned with the central axes of the lenses received in the holder 2018A.

Referring to regions indicated by circles in FIG. 14, when viewed from above, the first board 2042 and the spacer 2036, which are included in the liquid lens module 2014, may protrude from opposite side surfaces of the holder 2018A after the liquid lens module 2014 may be coupled to the holder 2018A.

When the liquid lens module 2014 is inserted into the holder 2018A, it is necessary to align the central axis of the liquid lens module 2014 with the central axis of at least one of the first lens unit 2012 or the second lens unit 2016 included in the holder 2018A. In particular, it is necessary to align the optical axes of the lenses in order to improve the optical performance of the lens assembly. However, it may be very difficult to align the liquid lens module 2014 with the other lens received in the holder 2018A on the basis of the first board 2042 and the space 2036 exposed from the opposite sides of the holder 2018A. In particular, since the lens region of the liquid lens module 2014 or the liquid lens 2028 (see FIG. 13) having the interface is not exposed, mechanical alignment is difficult.

Figure 15:
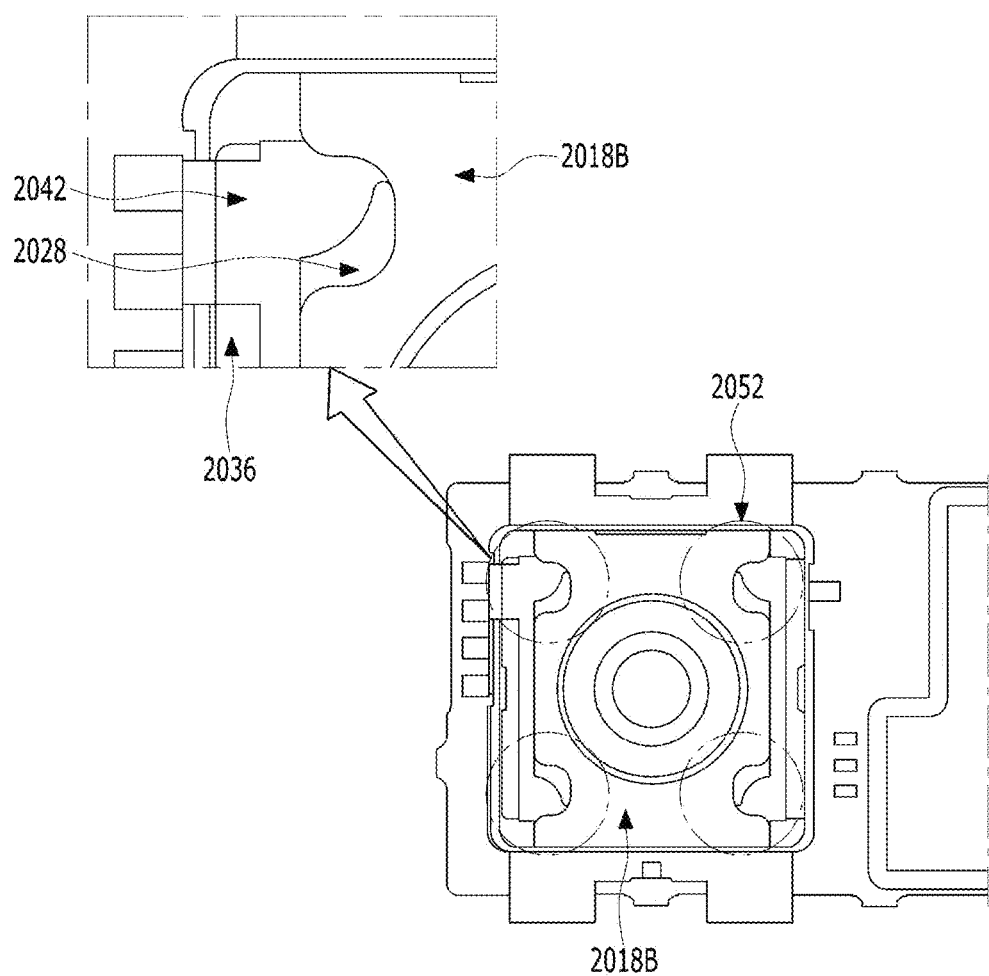
FIG. 15 is a view illustrating a second example of the holder for receiving the liquid lens and the solid lens in FIG. 12.

FIG. 15 is a view illustrating a second example of the holder for receiving the liquid lens and the solid lens in FIG. 12.

As shown, a plurality of (for example, 4) openings 2052 may be formed in the upper portion of a holder 2018B for receiving the liquid lens.

The liquid lens 2028, the spacer 2036, and the first board 2042 of the liquid lens module 2014 (see FIG. 13) may be exposed through the openings 2052. In particular, a portion of the liquid lens 2028 or a portion of the first board 2042 may be exposed through the openings 2052, and it is possible to check or adjust the position of the liquid lens module 2014 through the exposed portion of the liquid lens module. The liquid lens 2028 may have the planer shape of a polygon, and joints between the liquid lens 2028 and the first board 2042 may be located at the corners of the polygon. In some embodiments, the number of openings 2052 may be equal to the number of corners of the liquid lens 2028. In addition, the number of openings 2052 may be equal to the number of joints between the liquid lens 2028 and the first board 2042.

The four corners of the liquid lens 2028 may be exposed through a plurality of (for example, 4) openings 2052, whereby it is possible to accurately recognize the position and/or posture (tilting, twisting, etc.) of the liquid lens 2028 and to adjust the arrangement of the liquid lens module 2014 in the holder 2018B. It is possible to recognize the position of the liquid lens 2028 of the liquid lens module 2014 exposed through the openings 2052, whereby it is possible to align the optical axis of the liquid lens module 2014 with the optical axes of the lenses received in the holder 2018B through mechanical alignment.

Figure 16:
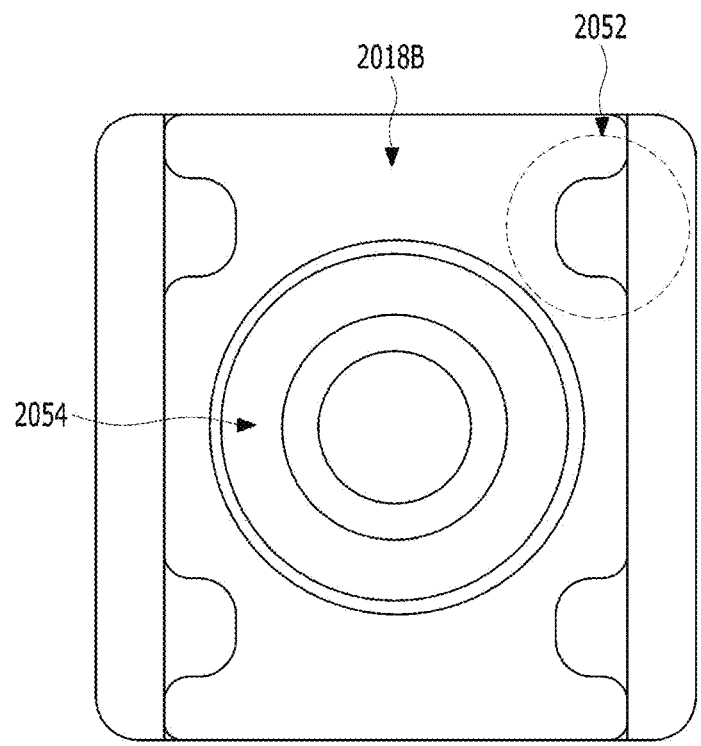
FIG. 16 is a view illustrating the structure of a holder of FIG. 12.

FIG. 16 is a view illustrating the structure of the holder of FIG. 12.

As shown, the holder 2018B may include a plurality of openings 2052 and a solid lens receiving portion 2054 for receiving the solid lens, rather than the liquid lens. The openings 2052 may be located symmetrically with respect to the solid lens receiving portion 2054.

Figure 17:
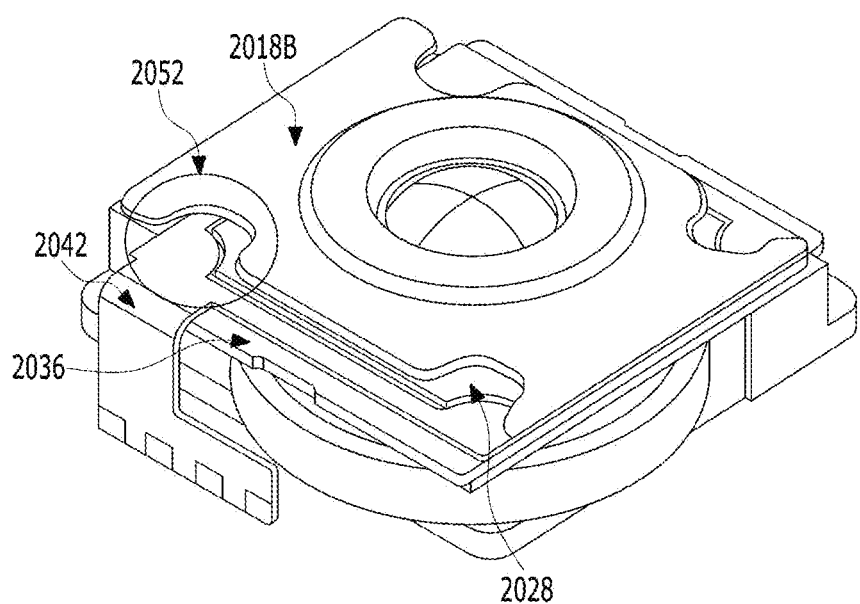
FIG. 17 is a view illustrating coupling between the holder and the liquid lens module in FIG. 12.

FIG. 17 is a view illustrating coupling between the holder 2018B and the liquid lens module in FIG. 12.

As shown, the liquid lens module may be inserted into the holder 2018B. The liquid lens 2028 and the first board 2042 of the liquid lens module may be exposed through the openings 2052 formed in the holder 2018B. In particular, the upper surfaces of the liquid lens 2028 and the first board 2042 or the joints between the liquid lens 2028 and the first board 2042 may be exposed.

More specifically, the sum of the thicknesses of the corners of the liquid lens 2028 and the first board 2042 exposed through the openings 2052 may be smaller than the thickness of the central portion of the liquid lens 2028. Since portions of the liquid lens 2028 and the first board 2042 are exposed through the openings 2052, it is possible to more accurately determine the position of the liquid lens 2028.

FIGS. 18a to 18d are views illustrating examples of the openings disposed at the holder in FIG. 12.

At least two openings, through which the joints between the liquid lens 2028 and the board are exposed, may be disposed in the upper portion of each of holders 2018C, 2018D, 2018E, 2018F. At this time, the two openings may be opposite to each other in the state in which the center of the lens region of the liquid lens module is located therebetween.

Figure 18A:
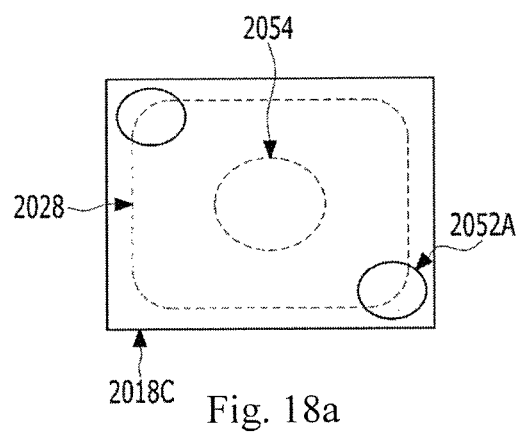
FIGS. 18a to 18d are views illustrating examples of openings disposed at the holder in FIG. 12.

Referring to FIG. 18a, openings 2052A may be disposed at the upper portion of the holder 2018C in the diagonal direction, and may be circular.

Figure 18B:
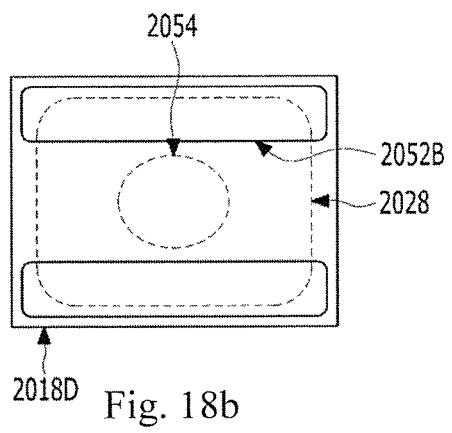

Referring to FIG. 18b, openings 2052B may be disposed at the upper and lower sides of the upper portion of the holder 2018D, and may be bar-shaped or quadrangular.

Figure 18C:
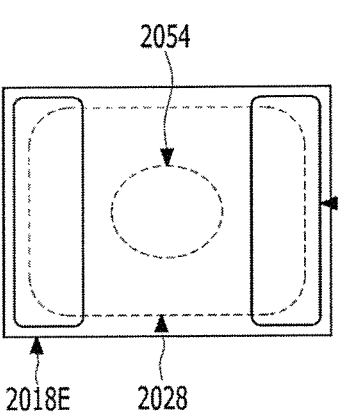

Referring to FIG. 18c, openings 2052C may be disposed at the left and right sides of the upper portion of the holder 2018E, and may be bar-shaped or quadrangular.

Figure 18D:
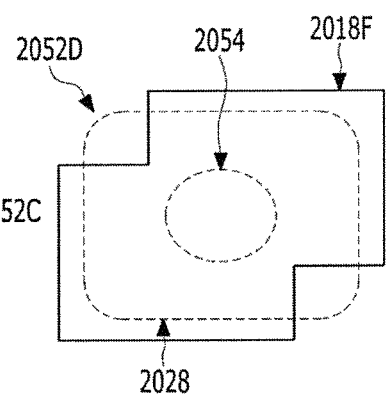

Referring to FIG. 18d, openings 2052D may be disposed at the upper portion of the holder 2018F in the diagonal direction, and may be open.

Referring to FIGS. 18a to 18d, the openings disposed at the upper portion of each of the holders may be formed so as to have at least one of a circular shape, a semispherical shape, or a polygonal shape.

Each of the openings may be formed so as to have the shape of a hole that is open in the upper surface of the holder in the direction parallel to the optical axis, or may be formed so as to have the shape of a recess formed in the upper surface of the holder as the result of escaping from the side surface of the holder.

Figure 19:
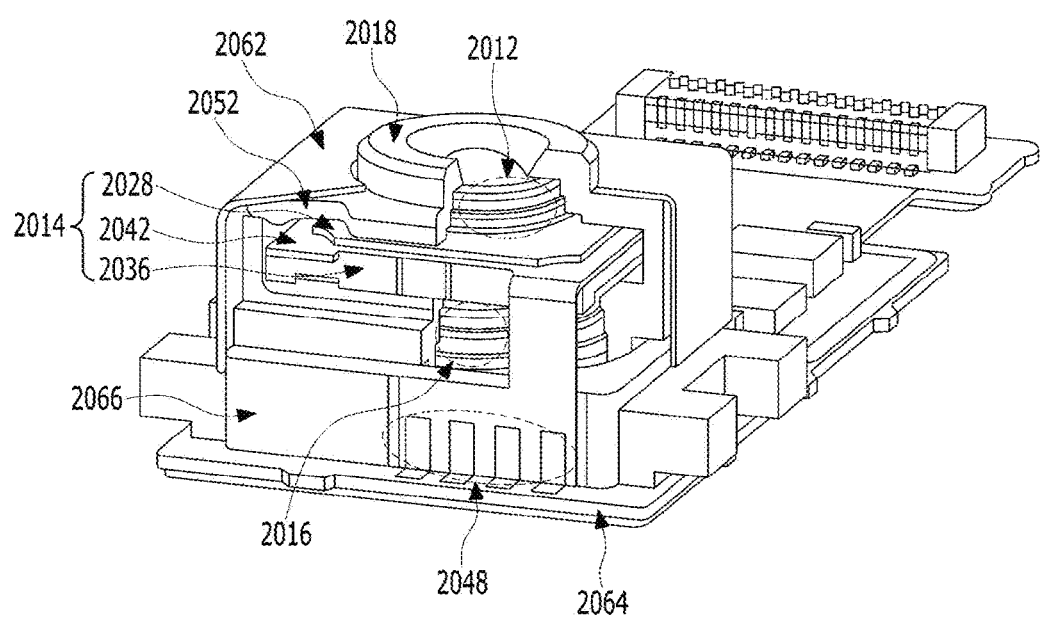
FIG. 19 is a view illustrating a second embodiment of the camera module.

FIG. 19 is a view illustrating a second embodiment of the camera module.

As shown, the camera module may include a holder 2018 having an open upper portion and an open lower portion, a liquid lens module 2014 received in the holder 2018, a first lens unit 2012 disposed above the liquid lens module 2014, a second lens unit 2016 disposed under the liquid lens module 2014, and a sensor board 2064 disposed under the second lens unit 2016, the sensor board 2064 having an image sensor mounted thereon.

The liquid lens module 2014 may include a liquid lens 2028 having an interface formed by two different kinds of liquid, a spacer 2036 disposed so as to surround the liquid lens 2028, and at least one board 2042 for applying drive voltage to the liquid lens 2028. The board 2042 may apply a plurality of distinguishable drive voltages, and the drive voltages may be transmitted through a plurality of terminals 2048.

Meanwhile, the holder 2018 of the camera module may include a plurality of openings 2052. After the liquid lens module 2014 is inserted into the holder 2018, it is possible to adjust the position and arrangement of the liquid lens module 2014 using the liquid lens 2028 exposed through the openings 2052. As a result, it is possible to mechanically align the liquid lens module 2014 with the first lens unit 2012 and the second lens unit 2016.

In this embodiment, the liquid lens may be included in the camera module. The camera module may include a lens assembly including a liquid lens mounted in the holder and at least one solid lens disposed in front of or at the rear of the liquid lens, an image sensor for converting an optical signal received through the lens assembly into an electrical signal, and a control circuit for applying drive voltage to the liquid lens.

The lens alignment method according to the embodiment shown described above may be implemented as a program that can be executed by a computer and stored in a computer-readable recording medium. Examples of the computer-readable recording medium include ROM, RAM, CD-ROM, magnetic tape, a floppy disk, and an optical data storage device.

The computer-readable recording medium may be distributed to a computer system connected over a network, and computer-readable code may be stored and executed thereon in a distributed manner. Functional programs, code, and code segments for implementing the method described above may be easily inferred by programmers in the art to which at least one embodiment pertains.

Although only a few embodiments have been described above, various other embodiments may be provided. The above embodiments may be combined in various manners unless they are incompatible, and new embodiments may be realized therethrough.

For example, it is possible to realize an optical device (optical instrument) including the camera module including the liquid lens described above. Here, the optical device may include a device capable of processing or analyzing an optical device. Examples of the optical device may include a camera/video device, a telescope, a microscope, an interferometer, a photometer, a polarimeter, a spectrometer, a reflectometer, an autocollimator, and a lensmeter. The embodiments may be applied to an optical device that may include a liquid lens. In addition, the optical device may be realized as a portable device, such as a smartphone, a laptop computer, or a tablet PC. The optical device may include a camera module, a display unit for outputting images, and a main body housing, in which the camera module and the display unit are mounted. The optical device may further include a communication module mounted in the main body housing for communicating with other devices and a memory unit for storing data.

Figure 20:
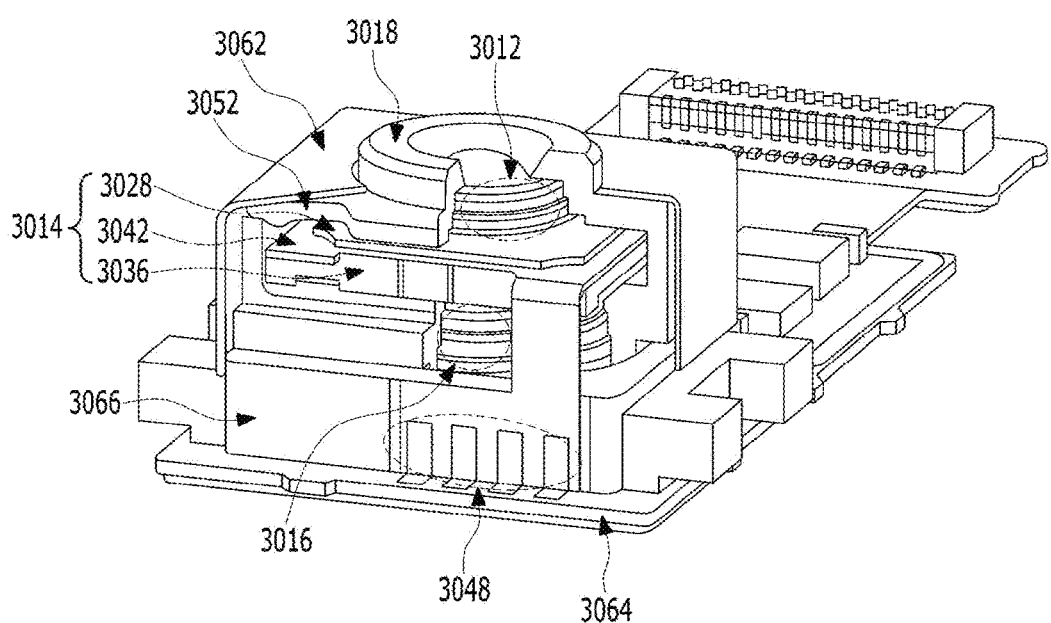
FIG. 20 is a view showing a third embodiment of the camera module.

FIG. 20 is a view showing a third embodiment of the camera module. The camera module of FIG. 20 is similar to the second embodiment of the camera module shown in FIG. 19.

Figure 21:
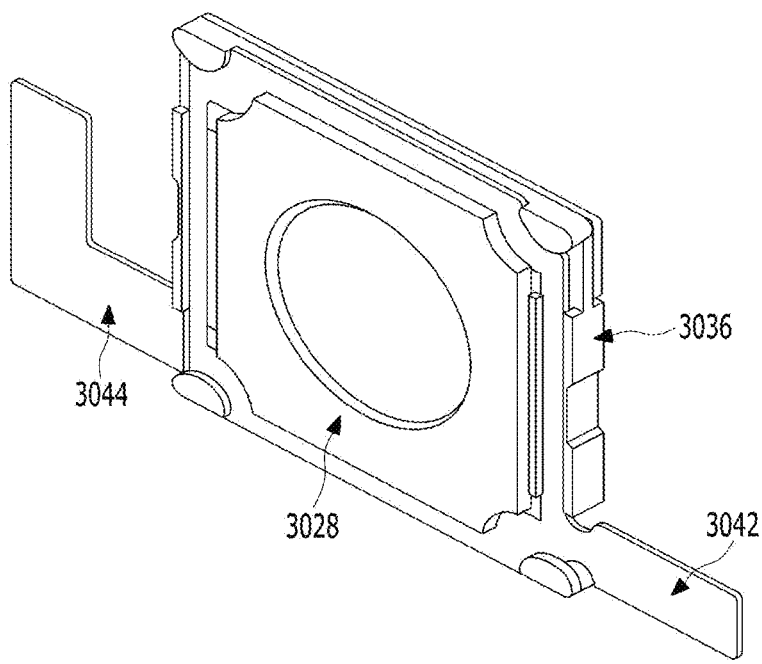
FIG. 21 is a view illustrating a liquid lens module of FIG. 20.

FIG. 21 is a view illustrating a liquid lens module 3014 of FIG. 20.

As shown, the liquid lens module 3014 may include a liquid lens 3028 having an interface formed by two different kinds of liquid, a spacer 3036 disposed so as to surround the liquid lens 3028, and a second board 3042 and a first board 3044 for applying drive voltage to the liquid lens 3028.

Here, the second board 3042 may transmit common voltage through a plurality of electrodes exposed at one side of the liquid lens 3028, and the first board 3044 may transmit individual voltages through a plurality of electrodes exposed at the opposite side of the liquid lens. In some embodiments, the positions of the liquid lens 3028 to which the individual voltages and the common voltage are applied may be changed.

In addition, a portion of the boards 3042 and 3044 may face the spacer 3036 in the upward-downward direction. Furthermore, a portion of the boards 3042 and 3044 may face a portion of the liquid lens 3028 in the upward-downward direction.

Figure 22:
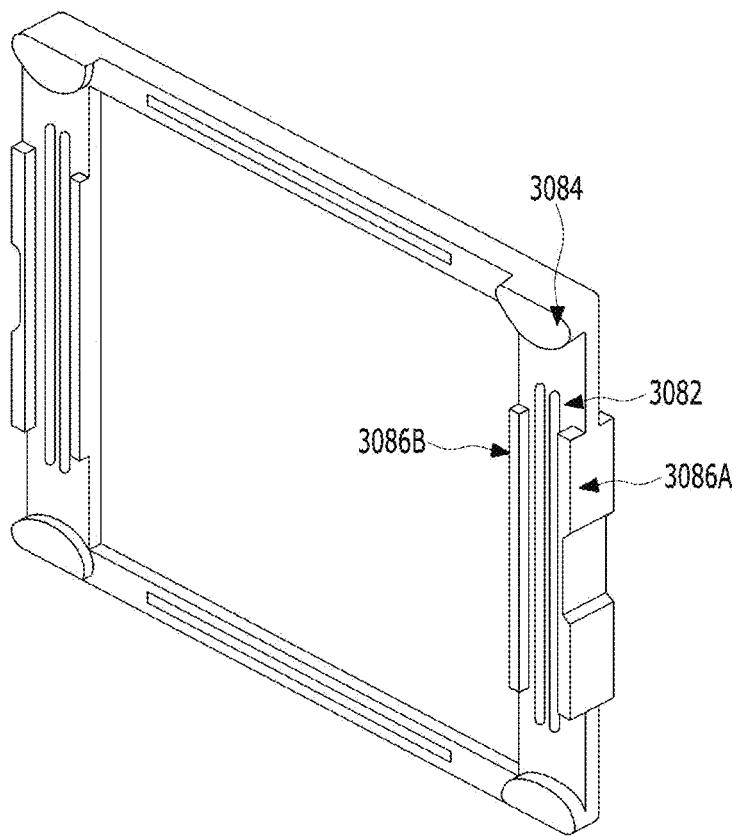
FIG. 22 is a view illustrating a spacer of FIG. 20.

FIG. 22 is a view illustrating the spacer 3036 of FIG. 20.

As shown, the spacer 3036 may be provided at the region thereof to which at least one board 3044 and 3042 is joined with at least one groove 3082. Here, the groove 3082 may be disposed at the upper portion or the lower portion of the spacer 3036. A plurality of grooves 3082 may be arranged side by side. In some embodiments, the groove 3082 may be formed at one side of the spacer 3036 so as to have a bent pattern, an intersecting pattern, a polygonal shape, or a straight or parallel type shape or pattern, or may be formed at one side of the spacer 3036 so as to have a single continuous pattern, a single intermittent pattern, or a plurality of intermittent patterns. The number of grooves 3082 disposed at each side of the spacer 3036 may be changed depending on the area of the upper portion or the lower portion of each side of the spacer 3036. In the embodiment shown in FIG. 22, one groove 3082 may be disposed at the side of the spacer having a small area, and two grooves 3082 may be disposed at the side of the spacer having a large area. Consequently, more grooves 3082 may be disposed at the side of the spacer having a large area than at the side of the spacer having a small area. The side of the spacer that corresponds to the direction in which the board extends may be wider than the side of the spacer that does not correspond to the direction in which the board extends such that the image sensor and the board are connected to each other. More grooves 3082 may be disposed at the wide side of the spacer than at the narrow side of the spacer. A process of bending or folding the board is required in order to connect the image sensor and the board to each other. At this time, force may be applied to an adhesive portion that is adjacent to the extension of the board, whereby the adhesive portion may become unfastened. In order to inhibit this, the side of the spacer that corresponds to a board connection portion is formed to be wide such that an additional groove 3082 is disposed therein, thereby improving joint rigidity.

In addition, guide walls 3086A and 3086B may be disposed at least one of the inside or the outside of the spacer 3036. At this time, the height of each of the guide walls may be larger than the thickness of each of the boards 3044 and 3042. An escape portion may be provided at the outer surface of each of the guide walls. For example, the escape portion may be formed at each of a first side and a second side, which is not adjacent to the first side but is opposite to the first side. A large space is advantageous in injecting a material into a mold for manufacturing the spacer 3036. Consequently, the escape portion may be formed in order to inject a material to the outer surface of the guide wall, having a relatively large thickness, through a needle. The escape portion may be formed at the guide wall in consideration of a phenomenon in which some of a material overflows after the injection of the material.

Each of the liquid lens 3028 and the spacer 3036, which surrounds the liquid lens 3028, may have a polygonal planar structure. The groove 3082 may be disposed at the region of the polygonal plane corresponding to the side. In addition, the guide walls 3086A and 3086B may be disposed only at a pair of opposite sides.

In addition, the spacer 3036 may include at least one protrusion 3084 disposed at the region of the polygonal plane corresponding to the corners. At this time, the protrusion 3084 may be changed depending on the shape of the boards 3044 and 3042.

Meanwhile, the groove 3082 may be disposed at the front surface or the rear surface of the spacer 3036, or may be disposed at both the front surface and the rear surface of the spacer 3036.

Figure 23:
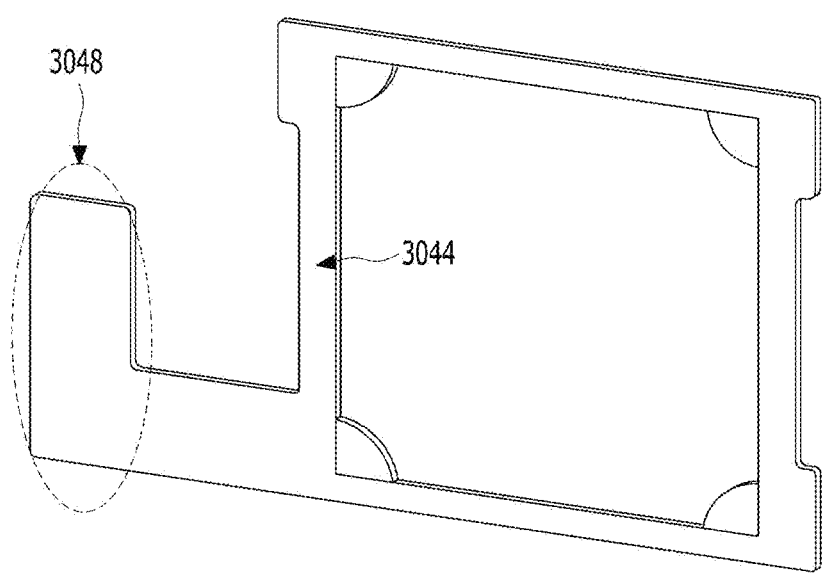
FIG. 23 is a view illustrating a first board of FIG. 20.

FIG. 23 is a view illustrating the first board 3044 of FIG. 21.

As shown, the first board 3044 may include a plurality of terminals 3048 formed at one end of a board having a large width so as to transmit a plurality of individual drive voltages and a conductive pattern disposed at one side of the liquid lens 3028 for transmitting individual drive voltages to the electrodes exposed at the corners of the liquid lens 3028.

Figure 24:
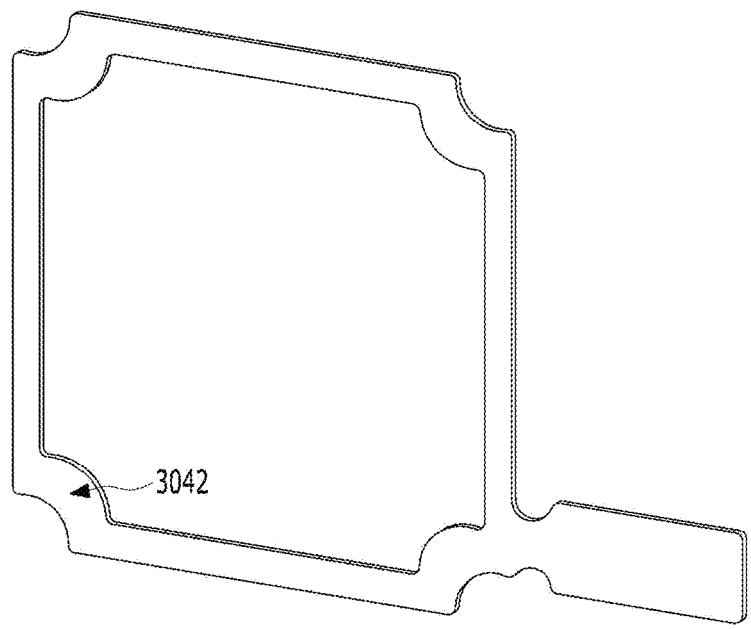
FIG. 24 is a view illustrating an example of a second board of FIG. 20.

FIG. 24 is a view illustrating an example of the second board 3042 of FIG. 20.

The second board 3042 may include a terminal for applying a single common voltage (for example, a reference voltage). Since the second board 3042 transmits a single common voltage, the region of the second board 3042 at which the terminal is disposed may be narrower than in the case of the first board 3044. In addition, the second board may have a shape or structure that corresponds to the electrodes exposed at the corners of the liquid lens 3028 such that the second board is connected to the electrodes and that corresponds to the protrusions 3084 disposed at the spacer 3036. In addition, the second board 3042 may be a flexible printed circuit board (FPCB) or a metal plate.

Figure 25:
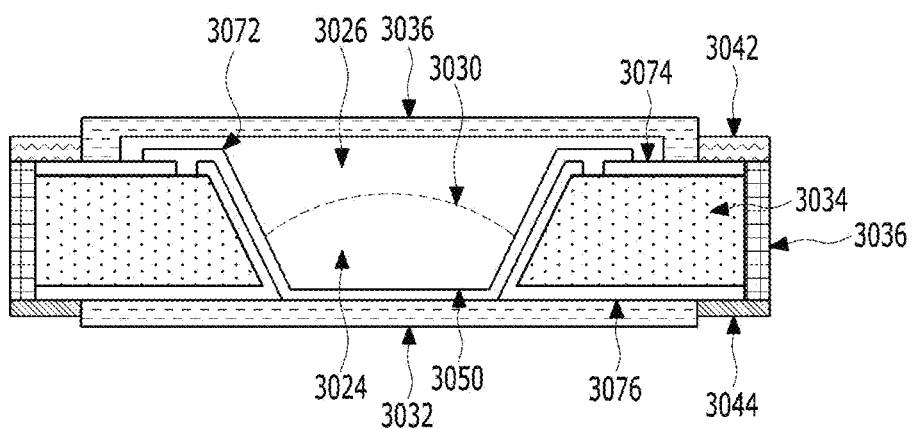
FIG. 25 is a view illustrating a liquid lens of FIG. 20.

FIG. 25 is a view illustrating the liquid lens 3028 of FIG. 20.

As shown, the liquid lens module 3014 (see FIG. 20) may include a liquid lens 3028 having an interface formed by two different kinds of liquid, a spacer 3036 disposed so as to surround the liquid lens 3028, and at least one board 3042 and 3044 for applying voltage to the liquid lens 3028. The thickness of the corners of the liquid lens 3028 may be smaller than the thickness of the central portion of the liquid lens 3028.

The liquid lens 3028 includes two different kinds of liquid, such as a conductive liquid and a nonconductive liquid. The curvature or shape of the interface between the two liquids may be adjusted by varying the drive voltage supplied to the liquid lens 3028. The drive voltage supplied to the liquid lens 3028 may be transmitted through the first board 3044 and the second board 3042. The first board 3044 may transmit four individual distinguishable drive voltages, and the second board 3042 may transmit a single common voltage. The voltages supplied through the second board 3042 and the first board 3044 may be applied to a plurality of electrodes 3074 and 3076 exposed at the corners of the liquid lens 3028. The first board 3044 and the second board 3042 may be coupled to the electrodes 3074 and 3076 exposed at the corners of the liquid lens via a conductive adhesive. The conductive adhesive may include conductive epoxy.

In addition, the liquid lens 3028 may include a third plate 3032 including a transparent material, a second plate 3036 including a transparent material, and a first plate 3034 located between the third plate 3032 and the second plate 3036, the first plate 3034 including an opening region having a predetermined inclined surface.

In addition, the liquid lens 3028 may include a cavity 3050 defined by the third plate 3032, the second plate 3036, and the opening region of the first plate 3034. Here, the cavity 3050 may be filled with two liquids 3026 and 3024 having different properties (for example, a conductive liquid and a nonconductive liquid), and an interface 3030 may be formed between the two liquids 3026 and 3024 having different properties.

In addition, at least one of the two liquids 3026 and 3024 included in the liquid lens 3028 may be conductive, and the liquid lens 3028 may further include two electrodes 3074 and 3076 disposed above and under the first plate 3034 and an insulation layer 3072 disposed at the inclined surface, which may contact the conductive liquid. Here, the insulation layer 3072 may cover one of the two electrodes 3074 and 3076, and may expose a portion of the other electrode such that electrical energy can be applied to the conductive liquid (for example, 3026).

The two boards 3044 and 3042 may be connected to the two electrodes 3074 and 3076 included in the liquid lens 3028 in order to transmit drive voltages to the electrodes. The curvature, the inclination, etc. of the interface 3030 formed in the liquid lens 3028 may be changed in response to the drive voltages, whereby the focal length of the liquid lens 3028 may be adjusted.

Figure 26:
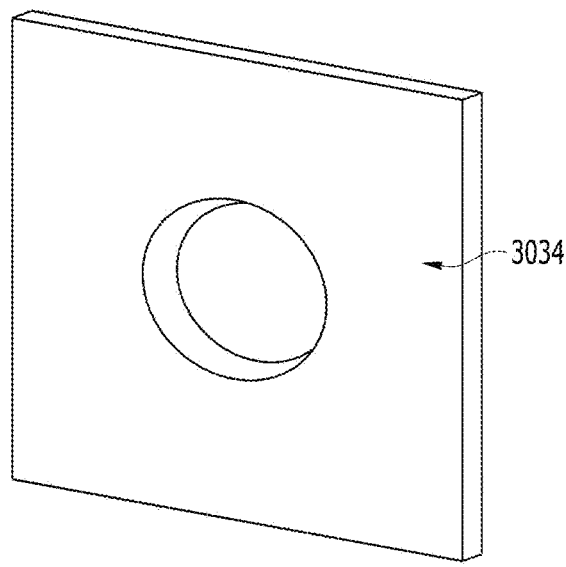
FIG. 26 is a view illustrating a first plate of FIG. 20.

FIG. 26 is a view illustrating the first plate 3034 of FIG. 25.

As shown, the first plate 3034 is provided in the central portion thereof with an opening region including an inclined surface.

Here, the first plate 3034 may include glass. In some embodiments, the first plate 3034 may include silicone.

In addition, the first plate 3034 has a quadrangular planar structure. In some embodiments, the first plate 3034 may have a polygonal planar structure.

Figure 27:
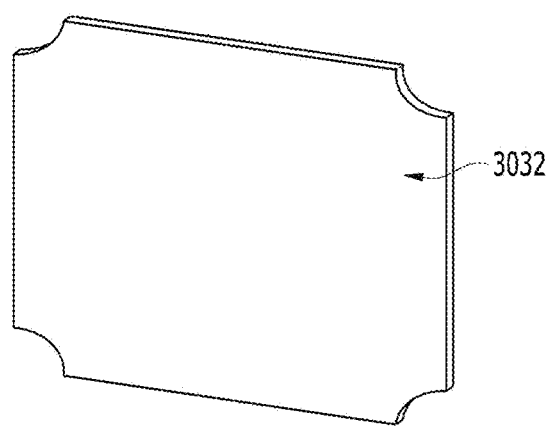
FIG. 27 is a view illustrating a third plate of FIG. 20.

FIG. 27 is a view illustrating the third plate 3032 of FIG. 25.

As shown, the third plate 3032 may include a transparent glass layer. The corners of the third plate 3032 are etched so as to be round in order to expose at least one electrode disposed at the first plate 3034, which is joined to the third plate 3032.

Meanwhile, in some embodiments, the third plate 3032 may include transparent plastic.

In addition, the third plate 3032 may have a planar area corresponding to the first plate 3034 of FIG. 26.

Referring to FIGS. 25 to 27, the liquid lens 3028 may include a first plate 3034 having therein a cavity 3050 for receiving a conductive liquid 3026 and a nonconductive liquid 3024, a first electrode 3074 disposed above the first plate 3034, a second electrode 3076 disposed under the first plate 3034, a second plate 3036 disposed above the first electrode 3074, and a third plate 3032 disposed under the second electrode 3076.

Here, the first electrode 3074 may include at least one electrode sector, and the second electrode 3076 may include two or more electrode sectors. For example, a common voltage may be applied to the first electrode 3074 through a single electrode sector, and four or eight individual drive voltages may be applied to the second electrode 3076 through a plurality of electrode sectors.

Meanwhile, the second electrode 3076 may extend from the lower portion to the upper portion of the first plate 3034. In addition, the liquid lens 3028 may further include an insulation layer 3072 disposed above the second electrode 3076.

Figure 28:
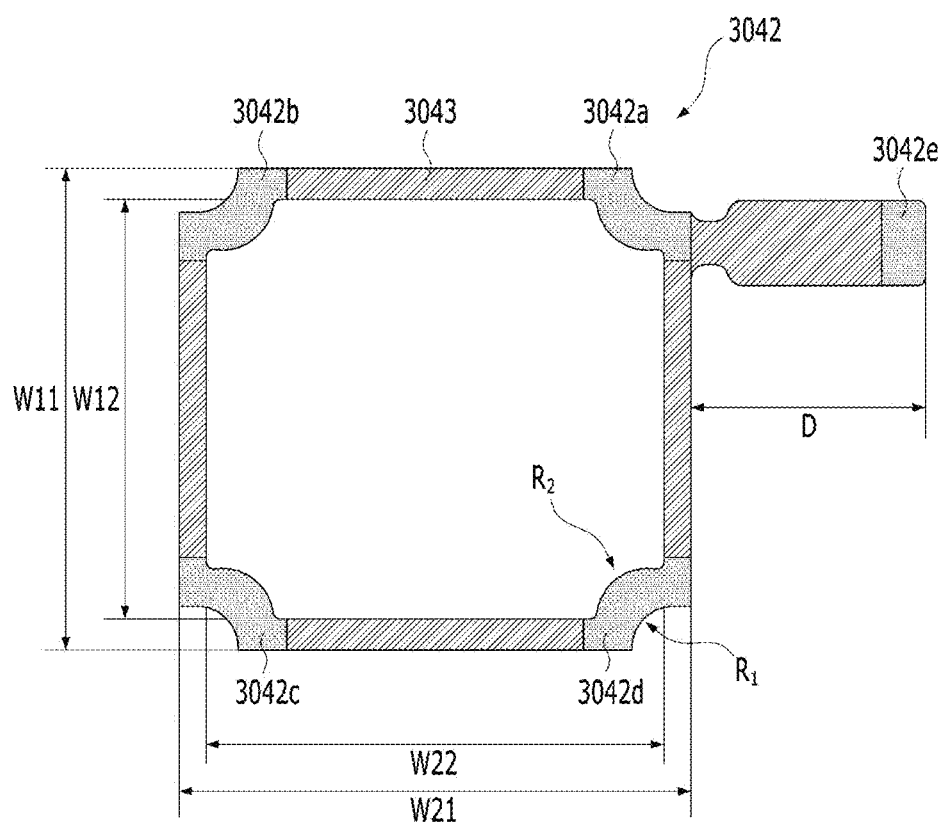
FIG. 28 is a view illustrating another example of the second board of FIG. 20.

FIG. 28 is a view illustrating another example of the second board of FIG. 20.

As shown, the second board 3042 may include a terminal for applying a single common voltage (for example, a reference voltage). Since the second board 3042 transmits a single common voltage, the region of the second board 3042 at which the terminal is disposed may be narrower than in the case of the first board 3044. In addition, the second board may have a shape or structure that corresponds to the electrodes exposed at the corners of the liquid lens 3028 such that the second board is connected to the electrodes and that corresponds to the protrusions 3084 disposed at the spacer 3036. In addition, the second board 3042 may be a flexible printed circuit board (FPCB) or a metal plate. In the case in which the second board 3042 is a metal plate, the second board may include phosphor bronze.

The second board 3042 may include a first region disposed so as to face the liquid lens and a second region extending from one side of the first region. Although the second region is shown as being in the same plane as the first region, the second region may be inclined with respect to the first region in the state of being bent when the liquid lens module is connected to a sensor board. The first region may be disposed so as to face the upper surface or the lower surface of the liquid lens, and the second region may be disposed so as to face the side surface of the liquid lens.

The first region may include 1-1 regions 3042a to 3042d disposed at the corners of the second board so as to contact the second electrodes 3074 of the liquid lens and 1-2 regions corresponding to sides that interconnect the corners. The insulation layer 3043 may be formed at the 1-2 regions by coating. The 1-1 regions 3042a to 3042d may be referred to as conductive regions, and the 1-2 regions may be referred to as dielectric regions. At least some of the conductive regions may face the second electrodes and may be connected to the second electrodes, and the dielectric regions may not face the second electrodes.

The insulation layer 3043 disposed at the second board may protect the liquid lens from a noise signal (voltage) that may be introduced from the outside through the cover 3062, such as the shield can. The 1-2 regions may be separated from the second electrode of the liquid lens due to the insulation layer 3043. The insulation layer 3043 disposed at the second board 3042 may be referred to as a first insulation layer 3043 so as to be distinguished from a second insulation layer 3072 in the liquid lens, a description of which will follow.

The second region may include a 2-1 region 3042e disposed at the end of the second board and a 2-2 region for interconnecting the first region and the 2-1 region. The insulation layer 3043 of the 1-2 region may be disposed at the 2-2 region.

A narrow region of the second board 3042 is provided between the first region and the second region such that the second region can be easily bent when being connected to the sensor board, which is disposed under the second board.

The first region of the second board 3042 has a quadrangular planar structure, and includes two horizontal sides and two vertical sides. The first region of the second board 3042 may have a closed curved surface structure including a central opening region and a quadrangular perimeter.

The lengths W21 and W22 of the two horizontal sides, i.e. the two sides of the second board 3042 that do not face the guide walls 3086A and 3086B, may be larger than the lengths W11 and W12 of the two vertical sides, i.e. the two sides of the second board 3042 that face the guide walls 3086A and 3086B.

Here, the lengths W1 and W21 may be lengths of the outside portions of the sides, and the lengths W12 and W22 may be lengths of the inside portions of the sides. The lengths W11 to W22 are lengths when assuming that the first region of the second board 3042 has a quadrangular edge structure including no round corners.

For example, the lengths W11 and W21 may be 7.10 mm and 6.20 mm, and the lengths W12 and W22 may be 7.50 mm and 6.70 mm. These lengths may have a tolerance of less than 0.02 mm.

The first region of the second board 3042 may have round regions formed at the corners of the quadrangular planar structure. The round regions may overlap the 1-1 regions, and the first insulation layer 3043 may not be disposed at the round regions. The outside of each of the round regions may have a first radius of curvature R1, and the inside of each of the round regions may have a second radius of curvature R2, which is greater than the first radius of curvature R1. For example, the first radius of curvature R1 may be 0.60 mm, and the second radius of curvature R2 may be 0.75 mm. Each of the first and second radii of curvature R1 and R2 may have a tolerance of 0.02 mm.

The conductive region and the dielectric region may be disposed at a first surface of the metal plate or the second board 3042, and the entirety of a second surface of the metal plate or the second board, which is opposite to the first surface, may be dielectric.

Figure 29:
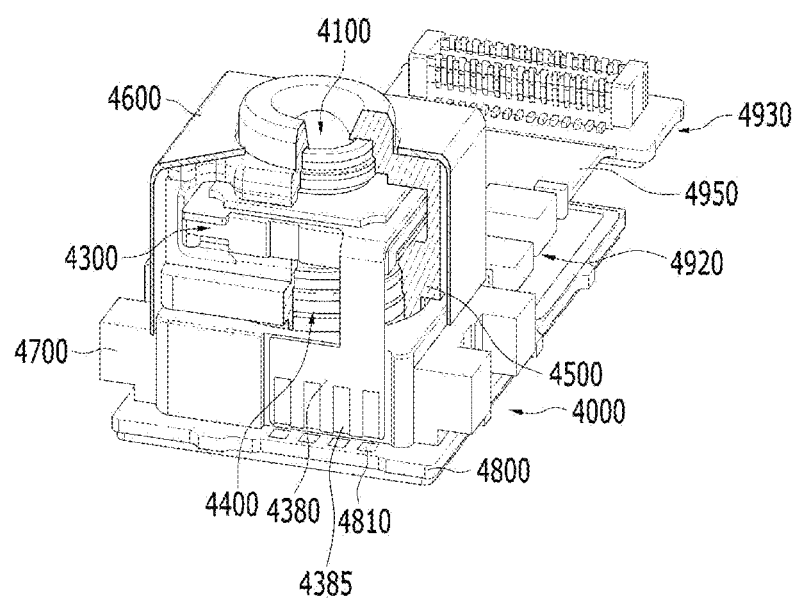
FIG. 29 is a view showing a fourth embodiment of the camera module.

FIG. 29 is a view showing a fourth embodiment of the camera module.

The camera module according to this embodiment may include a lens assembly 4000 and a control circuit 4920.

The lens assembly 4000 may include a solid lens and a liquid lens. The solid lens may be disposed above or under the liquid lens. The lens assembly 4000 may further include a holder, in which the solid lens and the liquid lens may be disposed. For example, the lens assembly 4000 may be configured such that a first lens unit 4100, a liquid lens 4300, and a second lens unit 4400 are sequentially disposed in the holder 4500 in that order from top to bottom. A terminal 4385 of a connection board 4380 for applying a drive voltage to the liquid lens 4300 may be connected to a terminal 4820 of a circuit board 4800. The holder 4500 may be disposed on a base 4700, and a cover 4500 may be disposed so as to surround the side surface of the holder 4500. At least one of the base 4700 or the cover 4600 may be omitted.

The structure of the lens assembly 4000 that is shown is merely an example, and the structure of the lens assembly 4000 may be changed depending on the specifications required by the camera module. For example, at least one of the first lens unit 4100 and the second lens unit 4400 may be omitted.

The control circuit 4920 may supply the drive voltage to the liquid lens. The camera module may further include a connector 4930. The connector 4930 may connect the control circuit 4920 to an external power supply or to another device. The connector 4930 be connected to the control circuit 4920 via a connection portion 4950.

The structure of the control circuit 4920 may be designed differently depending on the specifications required of the camera module. Particularly, in order to reduce the magnitude of an operating voltage that is applied to the lens assembly 4000, the control circuit 4920 may be realized by a single chip. As a result, the size of a camera device mounted in a portable device may be further reduced.

The lens assembly 4000 may include a liquid lens and/or a solid lens. The liquid lens may include a conductive liquid and a nonconductive liquid, and may include a common terminal and a plurality of individual terminals. The shape of the interface between the conductive liquid and the nonconductive liquid may be changed in response to the drive voltage applied between the common terminal and the individual terminals, whereby the focal length may be changed.

The first lens unit 4100 may be a region which is disposed in front of the lens assembly 4000 and on which light is incident from outside the lens assembly 4000. The first lens unit 4100 may be constituted by at least one lens. Alternatively, two or more lenses may be aligned along the central axis to constitute an optical system. Here, the central axis may be the same as the optical axis of the optical system.

The first lens unit 4100 may include two lenses. However, the disclosure is not limited thereto.

The first lens unit 4100, the second lens unit 4400, and the liquid lens 4300 may be mounted in a through-hole formed in the holder 4500. The first and second lens units 4100 and 4400 may be referred to as first and second solid lens units or first and second optical lens units so as to be distinguished from the liquid lens 4300, and may be made of a glass-based or plastic-based material.

An exposure lens (not shown) may be provided at the front of the first lens unit 4100. A cover glass (not shown) may be disposed in front of the exposure lens. Since the exposure lens protrudes out of the holder 4500 and thus is exposed to the outside, the surface of the lens may be damaged. In the case in which the surface of the lens is damaged, the quality of images taken by the camera module may be deteriorated. In order to inhibit or inhibit damage to the surface of the exposure lens, the cover glass may be disposed, a coating layer may be formed, or the exposure lens may be made of a wear-resistant material for inhibiting damage to the surface of the exposure lens.

The liquid lens 4300 may be disposed under the first lens unit 4100, and the second lens unit 4400 may be disposed under the liquid lens 4300. Light incident on the first lens unit 4100 from the outside may pass through the liquid lens 4300 and may be incident on the second lens unit 4400. The second lens unit 4400 may be disposed so as to be spaced apart from the first lens unit 4100.

The second lens unit 4400 may be constituted by at least one lens. Alternatively, two or more lenses may be aligned along the central axis or the optical axis to constitute an optical system.

The liquid lens 4300 may also be aligned along the central axis in the same manner as the first lens unit 4100 and the second lens unit 4400. The structure of the liquid lens 4300 will be described below with reference to FIGS. 30A and 30B.

First and second contact electrodes 4356 and 4346 (see FIG. 30B) of the liquid lens 4300 may be connected to the terminal 4385 of the connection board 4380 exposed out of the holder 4500. The connection board 4380 may be a flexible printed circuit board, and the terminal 4385 may be a region from which the conductive layer inside the connection board 4380 is exposed as the result of removing the insulation layer outside the connection board 4380.

The circuit board 4800 may be disposed under the base 4700 or the holder 4500, and a terminal 4810 may be exposed from a portion of the circuit board 4800.

In addition, although not shown, a light receiving element, such as an image sensor, may be disposed under the second lens unit 4400. The light receiving element may constitute a sensor board together with the circuit board 4800.

Figure 30A:
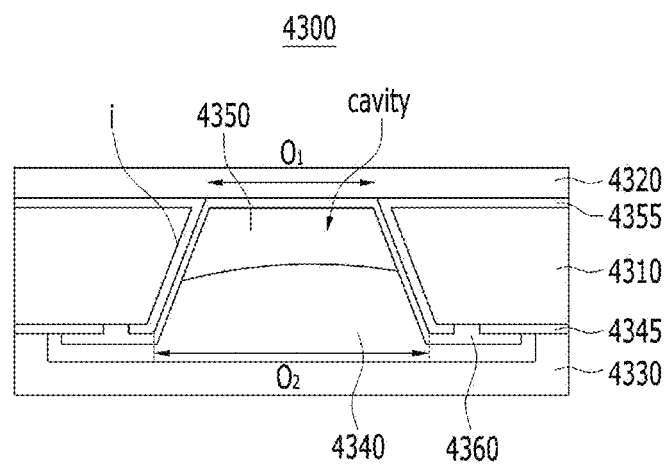
FIGS. 30a and 30b are views showing a liquid lens of the camera module of FIG. 29.
Figure 30B:
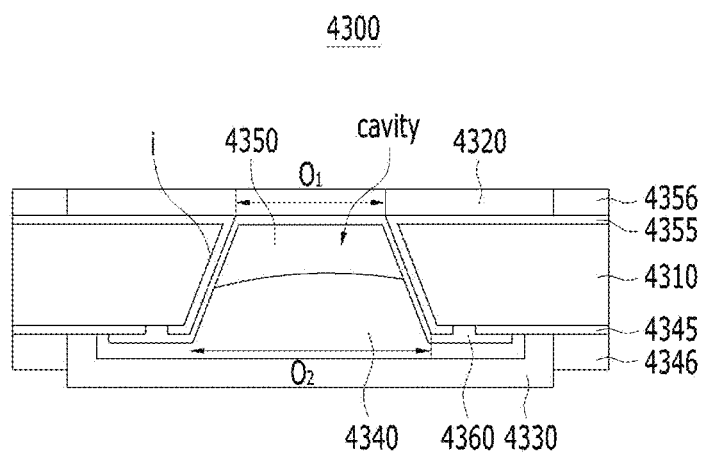

FIGS. 30A and 30B are views showing the liquid lens of the camera module of FIG. 29. The liquid lens 4300 may include a liquid, a first plate, and an electrode. The liquid may include a conductive first liquid 4340 and a nonconductive second liquid 4350. The first plate 4310 may include a cavity, in which the liquid is disposed. The electrode may be disposed above or under the first plate. For example, a first electrode 4345 may be disposed under the first plate, and a second electrode 4355 may be disposed above the first plate. A second plate or a third plate may be disposed above or under the first plate. For example, the third plate may be disposed under the first electrode, the second plate may be disposed above the second electrode, and at least one of the second plate or the third plate may be omitted.

The first plate 4310 may be disposed between the second plate 4320 and the third plate 4330, and may include upper and lower openings having a predetermined inclined surface (e.g. an inclined surface having an angle of about 55 to 65 degrees or 50 to 70 degrees). A region defined by the inclined surface, the first opening contacting the second plate 4320, and the second opening contacting the third plate 4330 may be referred to as a "cavity."

In this embodiment, the size $O_2$ of the second opening may be larger than the size $O_1$ of the first opening. Specifically, $O_2/O_1$ may be greater than 1.1 and less than 1.6. In the case in which $O_2/O_1$ is 1.1 or less, the amount of liquid is insufficient, whereby the OIS driving range may be decreased and the drive voltage may be increased. In the case in which $O_2/O_1$ is 1.6 or more, the thickness of the liquid lens may be increased, whereby the height of the liquid lens module may be increased.

Here, the size of each opening may be the sectional area of each opening in the horizontal direction. Alternatively, in the case in which the section of each opening is circular, the size of each opening may be the diameter of each opening, or in the case in which the section of each opening is square, the size of each opening may be the diagonal length of each opening.

The first plate 4310 is a structure for receiving the first and second liquids 4340 and 4350. The second plate 4320 and the third plate 4330 may include regions through which light passes. Consequently, the second plate and the third plate may be made of a light transmissive material such as glass. For convenience in processing, the second plate 4320 and the third plate 4330 may be made of the same material.

In addition, the first plate 4310 may be made of a transparent material, or may include impurities that make light transmission difficult.

The second plate 4320 is a region on which light from the first lens unit 4100 is incident in order to be guided to the cavity, and the third plate 4330 is a region through which the light having passed through the cavity passes in order to be guided to the second lens unit 4400.

The cavity may be filled with the first liquid 4340 and the second liquid 4350, which exhibit different properties. An interface may be formed between the first liquid 4340 and the second liquid 4350. The curvature and inclination of the interface between the first liquid 4340 and the second liquid 4350 may be changed.

The second liquid 4350 may be oil, such as phenyl-based silicone oil.

The second liquid 4350 may be a mixture of ethylene glycol and sodium bromide (NaBr).

Each of the first liquid 4340 and the second liquid 4350 may include at least one of a disinfectant or an antioxidant. The antioxidant may be a phenyl-based antioxidant or a phosphorus (P)-based antioxidant. The disinfectant may be one of alcohol-based, aldehyde-based, and phenyl-based disinfectants.

The first electrode 4345 may be disposed on a portion of the upper surface of the first plate 4310, and may directly contact the first liquid 4340. The second electrode 4355 may be spaced apart from the first electrode 4345, and may be disposed on the upper surface, the side surface, and the lower surface of the first plate 4310.

The inner surface of the first plate 4310 may constitute a sidewall i of the cavity. An insulation layer 4360 may be disposed between the first liquid 4340 or the second liquid 4350 and the second electrode 4355. A portion of the first liquid may contact a portion of the first electrode 4345. An electrical signal from an external circuit board may be applied to the first electrode 4345 and the second electrode 4355 in order to control the interface between the first liquid 4340 and the second liquid 4350.

Each of the first electrode 4345 and the second electrode 4355 may be made of a conductive material. For example, each of the first electrode and the second electrode may be made of a metal, such as chrome (Cr). Chromium or chrome is a glossy silver rigid transition metal, which is not fragile, does not readily discolor, and has a high melting point.

Since an alloy including chromium exhibits high corrosion resistance and rigidity, chromium may be used in the state of being alloyed with a different metal. In particular, chrome (Cr) exhibits high resistance to the conductive liquid in the cavity, since chrome is not easily corroded or discolored.

The insulation layer 4360 may be disposed so as to cover a portion the lower surface of the second plate 4320 on the upper region of the cavity and a portion of the second electrode 4355 constituting the sidewall of the cavity. In addition, the insulation layer 4360 may be disposed so as to cover a portion of the second electrode 4355 on the lower surface of the first plate 4310, the first plate 4310, and the first electrode 4345. The insulation layer 4360 may be realized by, for example, a parylene C coating agent, and may further include a white dye. The white dye may increase the frequency at which light is reflected by the insulation layer 4360 constituting the sidewall i of the cavity.

As shown, the insulation layer 4360 may be disposed between the second liquid 4350 and the second plate 4320. The first liquid 4340 may directly contact the third plate 4330.

The edge of each of the second plate 4320 and the third plate 4330 may be quadrangular. However, the disclosure is not limited thereto.

The second electrode 4355 may be exposed on at least a portion of the edge of the second plate 4320, and the first electrode 4345 may be exposed on at least a portion of the edge of the third plate 4330.

The second contact electrode 4356 may be disposed on the second electrode 4355 at the outer region of the second plate 4320, and the first contact electrode 4346 may be disposed on the first electrode 4345 at the outer region of the third plate 4330. The first and second contact electrodes 4346 and 4356 may be a portion of the connection board 4380.

Although not shown, conductive epoxy may be disposed between the second electrode 4355 and the second contact electrode 4356, and conductive epoxy may also be disposed between the first electrode 4345 and the first contact electrode 4346. In addition, the second contact electrode 4356 and the first contact electrode 4346 may be formed integrally with the second electrode 4355 and the first electrode 4345, respectively.

FIG. 31 is a view showing the arrangement of the lens assembly in the camera module of FIG. 29. Hereinafter, the arrangement of the lens assembly in the camera module will be described with reference to FIG. 31.

The first lens unit 4100 may include first and second lenses 4110 and 4120, the second lens unit 4400 may include fourth, fifth, and sixth lenses 4410, 4420, and 4430, and the liquid lens 4300 may be a third lens.

In the following description, "object-side surface" means the surface of a lens that faces an object or a subject on the basis of an optical axis, and "upper surface" means the surface of a lens that faces a sensor on which an image is formed on the basis of the optical axis.

In addition, "+ power" of a lens indicates a converging lens that converges parallel light rays, and "− power" of a lens indicates a diverging lens that diverges parallel light rays.

The lens assembly may include a first lens to a sixth lens 4110, 4120, 4300, 4410, 4420, and 4430, which are sequentially arranged in that order from the object side to the image side, and may further include a filter 4450, a cover glass (not shown), and a light receiving element 4480.

The filter 4450 may be a plate-shaped optical member such as an infrared ray cut filter, the cover glass may be an optical member such as a cover glass for protecting an image plane, and the light receiving element 4480 may be an image sensor stacked on a printed circuit board (not shown).

The light receiving element 4480 may be an image sensor, and the horizontal and/or vertical length of a unit pixel of the image sensor may be, for example, 2 micrometers (tam) or less. The above embodiment and the following embodiments may provide an imaging lens applicable to a camera module having a large number of pixels, and the camera module may include an image sensor or a light receiving element having a large number of pixels. In this case, the horizontal and/or vertical length of a unit pixel of the image sensor may be 2 μm or less.

"S4011" may be the object-side surface of the first lens 4110, "S4012" may be the upper surface of the first lens 4110, "S4021" may be the object-side surface of the second lens 4120, "S4022" may be the upper surface of the second lens 4120, "S4031" may be the object-side surface of the third lens 4300, "S4032" may be the upper surface of the third lens 4300, "S4041" may be the object-side surface of the fourth lens 4410, "S4042" may be the upper surface of the fourth lens 4410, "S4051" may be the object-side surface of the fifth lens 4420, "S4052" may be the upper surface of the fifth lens 4420, "S4061" may be the object-side surface of the sixth lens 4430, and "S4062" may be the upper surface of the sixth lens 4430. The third lens 4300 may serve as an iris. Alternatively, a separate iris may be disposed, for example, at the front surface of the first lens 4110 or between the first lens 4110 and the second lens 4120.

A first spacer 4115 may be disposed between the first lens 4110 and the second lens 4120, and a second spacer 4250 may be disposed between the fifth lens 4420 and the sixth lens 4430. In addition, a spacer 4150 may be disposed between the fourth lens 4410 and the fifth lens 4420.

At least one of the spacers disposed between the lenses may serve as an iris. The holder 4500 may be disposed at the edges of the fourth to sixth lenses 4410, 4420, and 4430, and the holder 4500 may be disposed at the edges of the first to third lenses. The holder 4500 may receive all of the first to sixth lenses.

The first lens 4110 may have a positive refractive power, the second lens 4120 may have a negative refractive power, the focal length of the third lens, i.e. the liquid lens 4300, may be changed when voltage is applied thereto, the fourth lens 4410 may have a positive refractive power or a negative refractive power, the first surface S4041 of the fourth lens 4410, which faces the object, may be convex, the fifth lens 4420 may have a positive refractive power, and the sixth lens 4430 may have a negative refractive power.

The lens assembly may satisfy Equation 1 below.

$$0.75 < f1/F < 1.2 \qquad \text{<Equation 1>}$$

Here, f1 may be the effective focal length of the first lens 4110, and F may be the effective focal length of the optical system, i.e. all of the first to sixth lenses. The focal length is the distance between a lens and the position at which an image is formed after parallel light from an object side is incident on an optical system such as the lens.

The lens assembly may satisfy Equation 2 below.

$$1.2 < TTL/F < 1.5 \qquad \text{<Equation 2>}$$

Here, TTL may be the distance between the first surface S4011 of the first lens 4110, which faces the object, and an image.

The lens assembly may satisfy Equation 3 below.

$$N4d < 1.6 \qquad \text{<Equation 3>}$$

Here, N4d may be the refractive index of the fourth lens 4410 at the d-line (587.6 nm).

The lens assembly may satisfy Equation 4 below.

$$20 < v4d < 30 \qquad \text{<Equation 4>}$$

Here, v4d may be the Abbe number of the fourth lens 4410 at the d-line (587.6 nm). The Abbe number at the d-line may be expressed as (nd−1)/(nF−nC). nF is the refractive index of a medium at 486.1 nm, nC is the refractive index of the medium at 656.3 nm, and nd is the refractive index of the medium at 587.6 nm. The medium indicates the material for the fourth lens 4410. Table 1 shows the properties of the lenses constituting the lens assembly 4000.

TABLE 1

|  | Embodiment 1 | Embodiment 2 | Embodiment 3 |
| --- | --- | --- | --- |
| TTL | 4.6 | 4.6 | 4.78 |
| F | 3.33 | 3.78 | 3.95 |
| f1 | 3.49 | 3.12 | 3.17 |
| f2 | −8.77 | −7.04 | −6.38 |
| f4 | 44.8 | 118 | 172 |
| f5 | 6.7 | 2.87 | 3.12 |
| f6 | −5.98 | −2.1 | −2.29 | f1 to f6 may be the focal lengths of the first to sixth lenses 4110 to 4430. The first lens 4110 and the second lens 4120 may be made of glass or plastic, and the fourth to sixth lenses 4310 to 4430 may be made of plastic.

The distance D from the second surface S4022 of the first lens unit 4100, which is the upper surface, to the first surface S4041 of the second lens unit 4400, which is the object-side surface, may be uniform. In addition, the distance D from the second surface S4022 of the first lens unit 4100, which is the upper surface, to the first surface S4041 of the second lens unit 4400, which is the object-side surface, and the thickness T of the liquid lens 4300 may satisfy Equation 5 below. The thickness T of the liquid lens 4300 may be a distance from the front surface of the second plate to the rear surface of the third plate on an optical axis.

$$1.8 < D/T < 2.1 \qquad \text{<Equation 5>}$$

Here, in the case in which D/T is 1.8 or less, the OIS compensation angle required by the optical system may not be satisfied. In the case in which D/T is 2.1 or more, the brightness of the peripheral portion of the optical system is lower than the brightness of the central portion of the optical system, whereby the camera module may not be used as an imaging camera.

Table 2 shows the optical properties of lenses constituting an embodiment of the lens assembly 4000. In Table 2, the interface between the conductive liquid and the nonconductive liquid in the liquid lens is flat. Here, S31 is the object-side surface of the second plate 4320 in the liquid lens, S32 is the object-side surface of the second liquid 4350 in the liquid lens, S33 is the interface between the first liquid 4340 and the second liquid 4350, S34 is the upper surface of the first liquid, and S35 is the upper surface of the third plate 4330.

In this embodiment, the effective focal length (EFL) may be 3.95 mm. f1/F may satisfy the range of Equation 1, and specifically may be greater than 1.04 and less than 1.105. In addition, TTL/F may satisfy the range of Equation 2, and specifically may be greater than 1.38 and less than 1.46.

In Table 2, the thickness of the first lens 4110 is 0.49 mm, the distance between the first lens 4110 and an iris (not shown) is 0.01 mm, the thickness of the iris is 0.01 mm, the thickness of the second lens 4120 is 0.20 mm, the distance between the second lens 4120 and the liquid lens 4300 is 0.24 mm, the thickness of the second plate 4320 in the liquid lens 4300 is 0.1 mm, the thickness of the second liquid 4350 in the optical-axis direction is 0.295 mm, the thickness of the first liquid 4340 in the optical-axis direction is 0.367 mm, the thickness of the third plate 4330 is 0.062 mm, the distance between the liquid lens 4300 and the fourth lens 4410 is 0.062 mm, the thickness of the fourth lens 4410 is 0.344 mm, the distance between the fourth lens 4410 and the fifth lens 4420 is 0.289 mm, the thickness of the fifth lens 4420 is 0.569 mm, the distance between the fifth lens 4420 and the sixth lens 4430 is 0.429 mm, the thickness of the sixth lens 4430 is 0.381 mm, the distance between the sixth lens 4430 and the filter 4450 is 0.3 mm, the thickness of the filter 4450 is 0.21 mm, and the distance between the filter 4450 and the light receiving element 4480 is 0.236 mm.

The radius of curvature of the second surface S4012 of the first lens 4110 may be infinite. That is, the second surface of the first lens may be flat. In practice, however, the second surface of the first lens may have an aspherical shape.

| Surface | | Shape | Radius of curvature (mm) | Thickness/ Distance (mm) |
|---|---|---|---|---|
| First lens | S11 | Aspherical | 3.715 | 0.49 |
| | S12 | Aspherical | Infinite | 0.01 |
| Iris | | Flat | Infinite | 0.01 |
| Second lens | S21 | Aspherical | −1.224 | 0.20 |
| | S22 | Aspherical | −2.559 | 0.24 |
| Liquid lens | S31 | Flat | Infinite | 0.1 |
| | S32 | Flat | Infinite | 0.295 |
| | S33 | Flat | Infinite | 0.367 |
| | S34 | Flat | Infinite | 0.062 |
| | S35 | Flat | Infinite | 0.062 |
| Third lens | S41 | Aspherical | 0.995 | 0.344 |
| | S42 | Aspherical | −1.870 | 0.289 |
| Fourth lens | S51 | Aspherical | 2.874 | 0.569 |
| | S52 | Aspherical | −2.605 | 0.429 |
| Fifth lens | S61 | Aspherical | 3.928 | 0.381 |
| | S62 | Aspherical | 0.295 | 0.3 |
| Filter | S71 | Flat | Infinite | 0.21 |
| | S72 | Flat | Infinite | 0.236 |
| Image sensor | | Flat | Infinite | 0.00 |

In Table 2, the interface between the conductive liquid and the nonconductive liquid in the liquid lens is flat, and in the case in which the interface is convex toward the image sensor, some of the optical properties of the lenses constituting the lens assembly 4000 shown in Table 2 are changed. That is, in Table 2, it is assumed that an object is disposed an infinite distance from the lens assembly 4000, and the following values are values acquired in the case in which the object is disposed a distance of 100 mm from the lens assembly 4000.

For example, the radius of curvature of the interface S33 between the first liquid 4340 and the second liquid 4350 may be −6.9 mm, the distance between S32 and S33 may be 0.355 mm, and the distance between S33 and S34 may be 0.307 mm. At this time, the effective focal length (EFL) may be 3.16 mm, which may be different from the case in which the interface between the first and second liquids is flat. The thickness of the insulation layer 4360 may be about a few mm.

Table 3 shows the optical properties of lenses constituting another embodiment of the lens assembly 4000. In Table 3, the interface between the conductive liquid and the nonconductive liquid in the liquid lens is flat.

In this embodiment, the effective focal length (EFL) may be 3.78 mm. f1/F may satisfy the range of Equation 1, and specifically may be greater than 0.82 and less than 0.89. In addition, TTL/F may satisfy the range of Equation 2, and specifically may be greater than 1.21 and less than 1.30.

TABLE 3

| Surface | | Shape | Radius of curvature (mm) | Thickness/ Distance (mm) |
|---|---|---|---|---|
| First lens | S11 | Aspherical | 1.438 | 0.608 |
| | S12 | Aspherical | 7.837 | 0.04 |
| Iris | | Flat | Infinite | 0.01 |
| Second lens | S21 | Aspherical | 3.641 | 0.21 |
| | S22 | Aspherical | 1.990 | 0.246 |
| Liquid lens | S31 | Flat | Infinite | 0.1 |
| | S32 | Flat | Infinite | 0.295 |
| | S33 | Flat | Infinite | 0.367 |
| | S34 | Flat | Infinite | 0.062 |
| | S35 | Flat | Infinite | 0.062 |

TABLE 3-continued

| Surface | | Shape | Radius of curvature (mm) | Thickness/ Distance (mm) |
|---|---|---|---|---|
| Third lens | S41 | Aspherical | 3.809 | 0.345 |
| | S42 | Aspherical | 3.917 | 0.244 |
| Fourth lens | S51 | Aspherical | 32.768 | 0.516 |
| | S52 | Aspherical | −1.869 | 0.434 |
| Fifth lens | S61 | Aspherical | −2.168 | 0.360 |
| | S62 | Aspherical | 3.677 | 0.061 |
| Filter | S71 | Flat | Infinite | 0.11 |
| | S72 | Flat | Infinite | 0.5 |
| Image sensor | | Flat | Infinite | 0.00 |

In Table 3, the interface between the conductive liquid and the nonconductive liquid in the liquid lens is flat, and in the case in which the interface is convex toward the image sensor, some of the optical properties of the lenses constituting the lens assembly 4000 shown in Table 3 are changed. That is, in Table 3, it is assumed that an object is disposed an infinite distance from the lens assembly 4000, and the following values are values acquired in the case in which the object is disposed at a distance of 100 mm from the lens assembly 4000.

For example, the radius of curvature of the interface S33 between the first liquid 4340 and the second liquid 4350 may be −5.75 mm, the distance between S32 and S33 may be 0.355 mm, and the distance between S33 and S34 may be 0.307 mm. At this time, the effective focal length (EFL) may be 3.54 mm, which may be different from the case in which the interface between the first and second liquids is flat.

Table 4 shows the optical properties of lenses constituting a further embodiment of the lens assembly 4000. In Table 4, the interface between the conductive liquid and the nonconductive liquid in the liquid lens is flat.

In this embodiment, the effective focal length (EFL) may be 3.95 mm. f1/F may satisfy the range of Equation 1, and specifically may be greater than 0.8 and less than 0.86. In addition, TTL/F may satisfy the range of Equation 2, and specifically may be greater than 1.21 and less than 1.30.

TABLE 4

| Surface | | Shape | Radius of curvature (mm) | Thickness/ Distance (mm) |
|---|---|---|---|---|
| First lens | S11 | Aspherical | 1.608 | 0.62 |
| | S12 | Aspherical | 13.75 | 0.03 |
| Iris | | Flat | Infinite | 0.01 |
| Second lens | S21 | Aspherical | 2.76 | 0.22 |
| | S22 | Aspherical | 1.64 | 0.27 |
| Liquid lens | S31 | Flat | Infinite | 0.15 |
| | S32 | Flat | Infinite | 0.165 |
| | S33 | Flat | Infinite | 0.285 |
| | S34 | Flat | Infinite | 0.058 |
| | S35 | Flat | Infinite | 0.10 |
| Third lens | S41 | Aspherical | 4.08 | 0.39 |
| | S42 | Aspherical | 3.95 | 0.24 |
| Fourth lens | S51 | Aspherical | 6.66 | 0.58 |
| | S52 | Aspherical | −2.11 | 0.47 |
| Fifth lens | S61 | Aspherical | −2.10 | 0.36 |
| | S62 | Aspherical | 3.24 | 0.08 |
| Filter | S71 | Flat | Infinite | 0.11 |
| | S72 | Flat | Infinite | 0.49 |
| Image sensor | | Flat | Infinite | 0.00 |

In Table 4, the interface between the conductive liquid and the nonconductive liquid in the liquid lens is flat, and in the case in which the interface is convex toward the image sensor, some of the optical properties of the lenses constituting the lens assembly 4000 shown in Table 4 are changed. That is, in Table 4, it is assumed that an object is disposed an infinite distance from the lens assembly 4000, and the following values are values acquired in the case in which the object is disposed at a distance of 100 mm from the lens assembly 4000.

For example, the radius of curvature of the interface S33 between the first liquid 4340 and the second liquid 4350 may be −6.15 mm, the distance between S32 and S33 may be 0.221 mm, and the distance between S33 and S34 may be 0.229 mm. At this time, the effective focal length (EFL) may be 3.69 mm, which may be different from the case in which the interface between the first and second liquids is flat.

Figure 32:
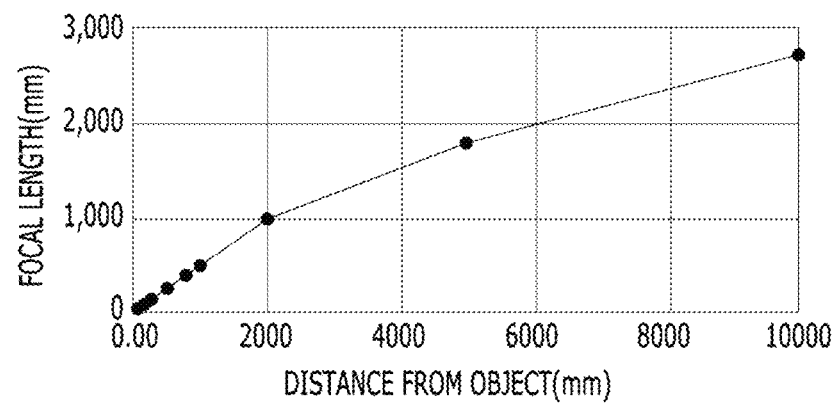
FIG. 32 is a view showing the relationship between the focal length of the camera module of FIG. 29 and the distance from an object.
Figure 33:
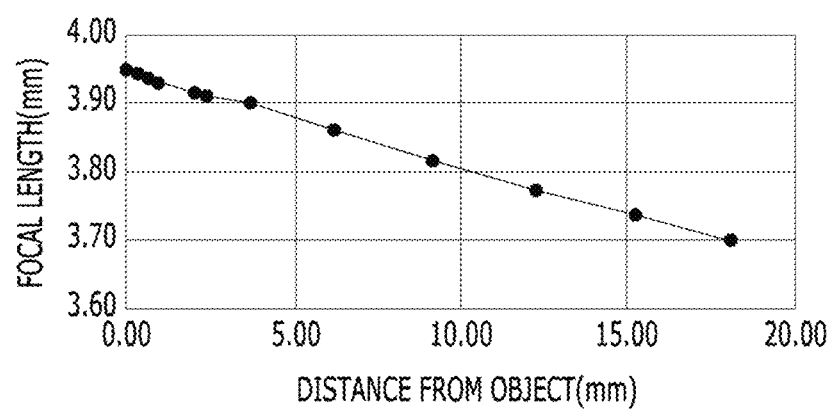
FIG. 33 is a view showing the relationship between the focal length of the liquid lens in the camera module of FIG. 29 and a diopter.

Table 5 shows the change of the focal length depending on the distance between the liquid lens module and an object. FIG. 32 is a view showing the relationship between the focal length of the camera module of FIG. 29 and the distance from an object, and FIG. 33 is a view showing the relationship between the focal length of the liquid lens in the camera module of FIG. 29 and a diopter.

TABLE 5

| Distance from object (mm) | Liquid lens module | | | Focal length of camera module (mm) |
|---|---|---|---|---|
| | Curvature | Diopter | Focal length (mm) | |
| 100000 | Infinite | 0 | Infinite | 3.950 |
| 10000 | −300 | 0.37 | 2702.70 | 3.945 |
| 5000 | −200 | 0.56 | 1785.71 | 3.942 |
| 2000 | −110 | 1.01 | 990.10 | 3.935 |
| 1000 | −55 | 2.1 | 495.05 | 3.920 |
| 800 | −45 | 2.47 | 404.86 | 3.914 |
| 500 | −30 | 3.71 | 269.54 | 3.896 |
| 300 | −18 | 6.18 | 161.81 | 3.860 |
| 200 | −12.2 | 9.11 | 109.77 | 3.819 |
| 150 | −9.1 | 12.22 | 81.83 | 3.776 |
| 120 | −7.35 | 15.13 | 66.09 | 3.737 |
| 100 | −6.15 | 18.08 | 55.31 | 3.698 |

"Distance from object" may be the shortest distance between the front surface S4011 of the first lens and the object, "curvature" may be the curvature of the interface between the first and second liquids in the liquid lens, and "diopter" and "focal length" may be the diopter and the focal length of the liquid lens, respectively.

In the lens assembly including the liquid lens according to the embodiment, the distance between the front surface S4011 of the first lens and the rear surface S4062 of the sixth lens may be fixed, and the focal length and the diopter of the liquid lens in the lens assembly may be variable, whereby AF may be possible without moving the lenses in the lens assembly.

The camera module including the imaging lens may be mounted in various kinds of digital devices, such as digital cameras, smartphones, laptop computers, and tablet PCs, and particularly may be mounted in a mobile device in order to realize a high-performance, ultra-slim zoom lens.

Figure 34:
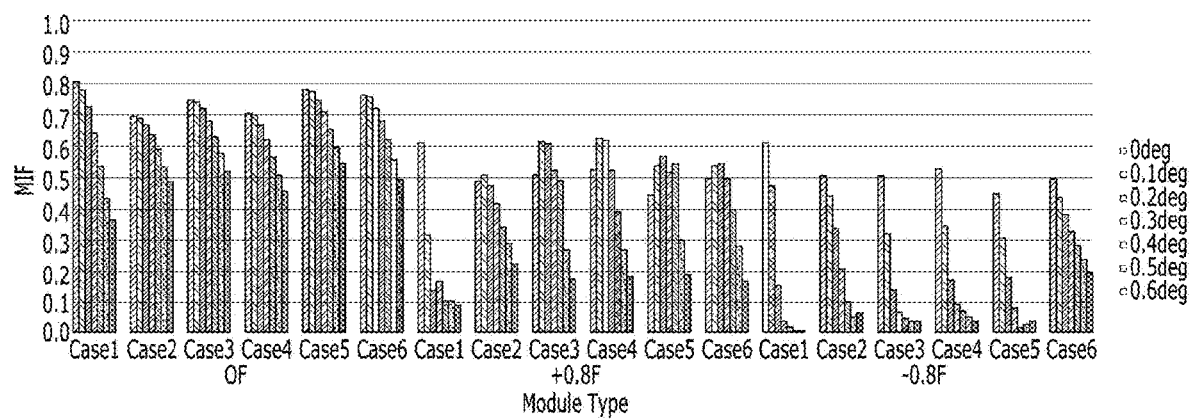
FIG. 34 is a view showing MTFs in the center of the field (0.0 F) and the periphery of the field (0.8 F) in five comparative examples.

FIG. 34 is a view showing MTFs in the center of the field (0.0 F) and the periphery of the field (0.8 F) in five comparative examples, and Table 6 shows the change of a tilting angle and the distribution in power (refractive power) of first and second lens units in the five comparative examples.

TABLE 6

| | Tilting angle (°) | Power distribution | | | Power ratio (Second lens unit/First lens unit) |
| | | First lens unit | Second lens unit | Lens assembly | |
|---|---|---|---|---|---|
| Comparative Example 1 | 7.8 | 5.10 | −52.62 | 3.95 | 10.33 |
| Comparative Example 2 | [[638]]6.38 | 6.27 | 8.78 | 3.46 | 1.40 |
| Comparative Example 3 | 7.15 | 5.61 | 18.24 | 3.60 | 3.25 |
| Comparative Example 4 | 7.05 | 5.69 | 17.63 | 3.60 | 3.10 |
| Comparative Example 5 | 6.95 | 6.08 | 11.12 | 3.54 | 1.83 |

It can be seen from FIG. 34 and Table 6 that, when the power distribution of the first lens unit and the power distribution of the second lens unit are similar, a reduction in the MTF due to the tilting of the interface in the liquid lens may be reduced, and when the power of the second lens unit is increased (i.e. the focal length thereof is shortened), the tilting angle of the interface in the liquid lens may be reduced.

At this time, the focal length of the second lens unit may be greater than 1.4 times the focal length of the first lens unit and less than 3.25 times the focal length of the first lens unit.

Table 7 shows the optical properties of lenses constituting Comparative Example 1 of the lens assembly 4000.

In Table 7, the interface between the conductive liquid and the nonconductive liquid in the liquid lens is flat.

Here, S4031 is the object-side surface of the second plate 4320 in the liquid lens, and S4032 is the upper surface of the third plate 4330 in the liquid lens.

In Table 7, the thickness of the first lens 4110 is 0.62 mm, the distance between the first lens 4110 and an iris (not shown) is 0.03 mm, the thickness of the iris is 0.01 mm, the thickness of the second lens 4120 is 0.22 mm, the distance between the second lens 4120 and the liquid lens 4300 is 0.27 mm, the thickness of the liquid lens 4300 is 0.78 mm, the distance between the liquid lens 4300 and the fourth lens 4410 is 0.10 mm, the thickness of the fourth lens 4410 is 0.39 mm, the distance between the fourth lens 4410 and the fourth lens 4420 is 0.24 mm, the thickness of the fifth lens 4420 is 0.58 mm, the distance between the fifth lens 4420 and the sixth lens 4430 is 0.47 mm, the thickness of the sixth lens 4430 is 0.36 mm, the distance between the sixth lens 4430 and the filter 4450 is 0.08 mm, the thickness of the filter 4450 is 0.11 mm, and the distance between the filter 4450 and the light receiving element 4480 is 0.49 mm.

The radius of curvature of the second surface S4012 of the first lens 4110 may be infinite. That is, the second surface of the first lens may be flat. In practice, however, the second surface of the first lens may have an aspherical shape. In addition, the first, second, fourth to sixth lenses 4110, 4210, 4410 to 4430 may be made of plastic.

TABLE 7

| Surface | Shape | Radius of curvature (mm) | Thickness/Distance (mm) |
|---|---|---|---|
| First lens | S11 | Aspherical | 1.60 | 0.62 |
| | S12 | Aspherical | 13.75 | 0.03 |

TABLE 7-continued

| | Surface | Shape | Radius of curvature (mm) | Thickness/Distance (mm) |
|---|---|---|---|---|
| Iris | | Flat | Infinite | 0.01 |
| Second lens | S21 | Aspherical | 2.76 | 0.22 |
| | S22 | Aspherical | 1.64 | 0.27 |
| Liquid lens | S31 | Flat | Infinite | 0.78 |
| | S32 | Flat | Infinite | 0.10 |
| Third lens | S41 | Aspherical | 4.08 | 0.39 |
| | S42 | Aspherical | 3.95 | 0.24 |
| Fourth lens | S51 | Aspherical | 6.66 | 0.58 |
| | S52 | Aspherical | −2.11 | 0.47 |
| Fifth lens | S61 | Aspherical | −2.10 | 0.36 |
| | S62 | Aspherical | 3.24 | 0.08 |
| Filter | S71 | Flat | Infinite | 0.11 |
| | S72 | Flat | Infinite | 0.49 |
| Image sensor | | Flat | Infinite | 0.00 |

Table 8 shows the optical properties of lenses constituting Comparative Example 2 of the lens assembly 4000. In Table 8, the interface between the conductive liquid and the nonconductive liquid in the liquid lens is flat.

In Table 8, the thickness of the first lens 4110 is 0.47 mm, the distance between the first lens 4110 and an iris (not shown) is 0.01 mm, the thickness of the iris is 0.01 mm, the thickness of the second lens 4120 is 0.22 mm, the distance between the second lens 4120 and the liquid lens 4300 is 0.20 mm, the thickness of the liquid lens 4300 is 0.78 mm, the distance between the liquid lens 4300 and the fourth lens 4410 is 0.09 mm, the thickness of the fourth lens 4410 is 0.49 mm, the distance between the fourth lens 4410 and the fifth lens 4420 is 0.16 mm, the thickness of the fifth lens 4420 is 0.53 mm, the distance between the fifth lens 4420 and the sixth lens 4430 is 0.72 mm, the thickness of the sixth lens 4430 is 0.38 mm, the distance between the sixth lens 4430 and the filter 4450 is 0.08 mm, the thickness of the filter 4450 is 0.11 mm, and the distance between the filter 4450 and the light receiving element 4480 is 0.49 mm.

The radius of curvature of the second surface S4012 of the first lens 4110 may be infinite. That is, the second surface of the first lens may be flat. In practice, however, the second surface of the first lens may have an aspherical shape. In addition, the first, second, fourth to sixth lenses 4110, 4210, 4410 to 4430 may be made of plastic.

TABLE 8

| | Surface | Shape | Radius of curvature (mm) | Thickness/Distance (mm) |
|---|---|---|---|---|
| First lens | S11 | Aspherical | 2.15 | 0.47 |
| | S12 | Aspherical | −8.04 | 0.01 |
| Iris | | Flat | Infinite | 0.01 |
| Second lens | S21 | Aspherical | 2.54 | 0.22 |
| | S22 | Aspherical | 1.41 | 0.20 |
| Liquid lens | S31 | Flat | Infinite | 0.78 |
| | S32 | Flat | Infinite | 0.09 |
| Third lens | S41 | Aspherical | 6.10 | 0.49 |
| | S42 | Aspherical | 4.04 | 0.16 |
| Fourth lens | S51 | Aspherical | 4.41 | 0.53 |
| | S52 | Aspherical | −1.66 | 0.72 |
| Fifth lens | S61 | Aspherical | −1.94 | 0.38 |
| | S62 | Aspherical | 5.8 | 0.08 |
| Filter | S71 | Flat | Infinite | 0.11 |
| | S72 | Flat | Infinite | 0.49 |
| Image sensor | | Flat | Infinite | 0.01 |

Table 9 shows the optical properties of lenses constituting Comparative Example 3 of the lens assembly 4000. In Table 9, the interface between the conductive liquid and the nonconductive liquid in the liquid lens is flat.

In Table 9, the thickness of the first lens 4110 is 0.48 mm, the distance between the first lens 4110 and an iris (not shown) is 0.11 mm, the thickness of the iris is 0.04 mm, the thickness of the second lens 4120 is 0.21 mm, the distance between the second lens 4120 and the liquid lens 4300 is 0.15 mm, the thickness of the liquid lens 4300 is 0.78 mm, the distance between the liquid lens 4300 and the fourth lens 4410 is 0.13 mm, the thickness of the fourth lens 4410 is 0.59 mm, the distance between the fourth lens 4410 and the fifth lens 4420 is 0.17 mm, the thickness of the fifth lens 4420 is 0.52 mm, the distance between the fifth lens 4420 and the sixth lens 4430 is 0.59 mm, the thickness of the sixth lens 4430 is 0.39 mm, the distance between the sixth lens 4430 and the filter 4450 is 0.08 mm, the thickness of the filter 4450 is 0.11 mm, and the distance between the filter 4450 and the light receiving element 4480 is 0.49 mm.

The radius of curvature of the second surface S4012 of the first lens 4110 may be infinite. That is, the second surface of the first lens may be flat. In practice, however, the second surface of the first lens may have an aspherical shape. In addition, the first, second, fourth to sixth lenses 4110, 4210, 4410 to 4430 may be made of plastic.

TABLE 9

| Surface | Shape | Radius of curvature (mm) | Thickness/ Distance (mm) |
|---|---|---|---|
| First lens | S11 | Aspherical | 1.81 | 0.48 |
| | S12 | Aspherical | 7.80 | 0.11 |
| Iris | | Flat | Infinite | 0.04 |
| Second lens | S21 | Aspherical | 3.10 | 0.21 |
| | S22 | Aspherical | 2.01 | 0.15 |
| Liquid lens | S31 | Flat | Infinite | 0.78 |
| | S32 | Flat | Infinite | 0.13 |
| Third lens | S41 | Aspherical | 8.63 | 0.59 |
| | S42 | Aspherical | 5.79 | 0.17 |
| Fourth lens | S51 | Aspherical | 5.58 | 0.52 |
| | S52 | Aspherical | −1.72 | 0.59 |
| Fifth lens | S61 | Aspherical | −1.92 | 0.39 |
| | S62 | Aspherical | 3.54 | 0.08 |
| Filter | S71 | Flat | Infinite | 0.11 |
| | S72 | Flat | Infinite | 0.49 |
| Image sensor | | Flat | Infinite | 0.01 |

In the case in which OIS is realized through the liquid lens 4300 of the lens assembly according to this embodiment, the tilting angle of the interface between the first and second liquids in the liquid lens may be adjusted in order to realize OIS. At this time, the modulation transfer function (MTF) may be reduced in the center of the field and in the periphery of the field, for example, at 0.0 F and 0.8 F, depending on the OIS compensation angle. In realizing the OIS of the liquid lens, it is necessary to use a lens assembly having a relatively low MTF reduction.

The first lens 4110 may have a positive refractive power, the second lens 4120 may have a negative refractive power, the focal length of the liquid lens 4300 may be changed when voltage is applied thereto, the fourth lens 4410 may have a positive refractive power or a negative refractive power, the first surface S4041 of the fourth lens 4410, which faces the object, may be convex, the fifth lens 4420 may have a positive refractive power, and the sixth lens 4430 may have a negative refractive power.

In this embodiment, the tilting angle is 6.48 degrees, the power distribution of the first and second lens units are 7.80 and 5.87, respectively, the power distribution of the lens assembly is 3.34, and the ratio of the power of the second lens unit to the power of the first lens unit is about 0.75.

The lens assembly may satisfy Equation 6 below.

$$0.5 < f1G/F < 0.65 \quad \text{<Equation 6>}$$

Here, f1G may be the effective focal length of the first lens unit, and F may be the effective focal length of the optical system, i.e. the entirety of the lens assembly.

The lens assembly may satisfy Equation 7 below.

$$0.7 < TTL/F < 0.9 \quad \text{<Equation 7>}$$

Here, TTL may be the distance between the first surface of the first lens, which faces the object, and an image.

The lens assembly may satisfy Equation 8 below.

$$0.3 < Ta/f2G < 1.1 \quad \text{<Equation 8>}$$

Here, Ta may be the tilting angle of the interface between the first liquid and the second liquid in the liquid lens, and f1G may be the effective focal length of the second lens unit.

The lens assembly may satisfy Equation 9 below.

$$|f1| < |f5| < |f6| \quad \text{<Equation 9>}$$

Here, |f1| may be the absolute value of the focal length of the first lens, |f5| may be the absolute value of the focal length of the fifth lens, and |f6| may be the absolute value of the focal length of the sixth lens.

In addition, the distance D from the second surface S4022 of the first lens unit 4100, which is the upper surface, to the first surface S4041 of the second lens unit 4400, which is the object-side surface, may be uniform.

Table 10 shows the optical properties of the lenses constituting the lens assembly 4000 according to the embodiment. In Table 10, the interface between the conductive liquid and the nonconductive liquid in the liquid lens is flat.

In Table 10, the thickness of the first lens 4110 is 0.44 mm, the distance between the first lens 4110 and an iris (not shown) is 0.02 mm, the thickness of the iris is 0.01 mm, the thickness of the second lens 4120 is 0.21 mm, the distance between the second lens 4120 and the liquid lens 4300 is 0.17 mm, the thickness of the liquid lens 4300 is 0.78 mm, the distance between the liquid lens 4300 and the fourth lens 4410 is 0.13 mm, the thickness of the fourth lens 4410 is 0.55 mm, the distance between the fourth lens 4410 and the fifth lens 4420 is 0.14 mm, the thickness of the fifth lens 4420 is 0.56 mm, the distance between the fifth lens 4420 and the sixth lens 4430 is 0.75 mm, the thickness of the sixth lens 4430 is 0.36 mm, the distance between the sixth lens 4430 and the filter 4450 is 0.16 mm, the thickness of the filter 4450 is 0.11 mm, and the distance between the filter 4450 and the light receiving element 4480 is 0.46 mm.

The radius of curvature of the second surface S4012 of the first lens 4110 may be infinite. That is, the second surface of the first lens may be flat. In practice, however, the second surface of the first lens may have an aspherical shape. In addition, the first, second, fourth to sixth lenses 4110, 4210, 4410 to 4430 may be made of plastic.

TABLE 10

| Surface | Shape | Radius of curvature (mm) | Thickness/ Distance (mm) |
|---|---|---|---|
| First lens | S11 | Aspherical | 2.63 | 0.44 |
| | S12 | Aspherical | −5.90[[.80]] | 0.02 |
| Iris | | Flat | Infinite | 0.01 |
| Second lens | S21 | Aspherical | 2.78 | 0.22 |
| | S22 | Aspherical | 1.47 | 0.17 |

TABLE 10-continued

| Surface | | Shape | Radius of curvature (mm) | Thickness/ Distance (mm) |
|---|---|---|---|---|
| Liquid lens | S31 | Flat | Infinite | 0.78 |
| | S32 | Flat | Infinite | 0.13 |
| Third lens | S41 | Aspherical | 5.50 | 0.55 |
| | S42 | Aspherical | 3.95 | 0.14 |
| Fourth lens | S51 | Aspherical | 3.50 | 0.56 |
| | S52 | Aspherical | −1.67 | 0.75 |
| Fifth lens | S61 | Aspherical | −3.09 | 0.36 |
| | S62 | Aspherical | 2.65 | 0.16 |
| Filter | S71 | Flat | Infinite | 0.11 |
| | S72 | Flat | Infinite | 0.46 |
| Image sensor | | Flat | Infinite | 0.01 |

Figure 35:
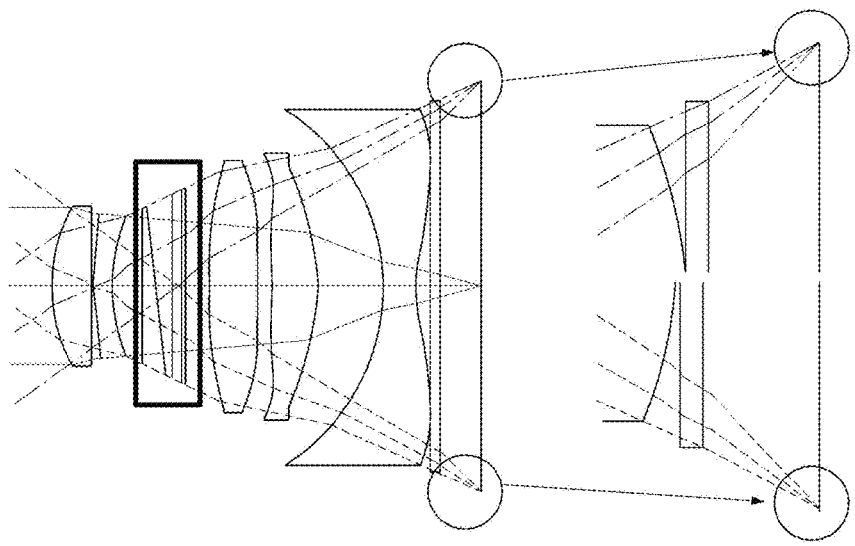
FIG. 35 is a view showing an image formed on a light receiving element in Comparative Example 2.

FIG. 35 is a view showing an image formed on the light receiving element in Comparative Example 2. Light does not converge on the upper and lower portions of the light receiving element. The reason for this is that, when OIS is realized through the liquid lens, resolution is reduced due to the difference in the optical path length between the upper and lower fields as the result of tilting of the interface.

Figure 36:
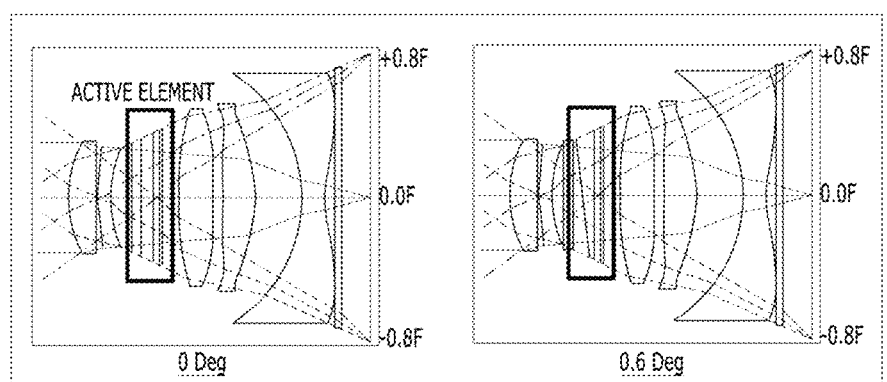
FIG. 36 is a view showing an image formed on a light receiving element in a fifth embodiment of the camera module.

FIG. 36 is a view showing an image formed on the light receiving element in the embodiment. Light is converged on the upper and lower portions of the light receiving element. The reason for this is that the lens assembly according to the embodiment shown in Table 10 is optimally designed in consideration of the upper and lower fields, whereby the power of the second lens unit becomes relatively strong.

Figure 37:
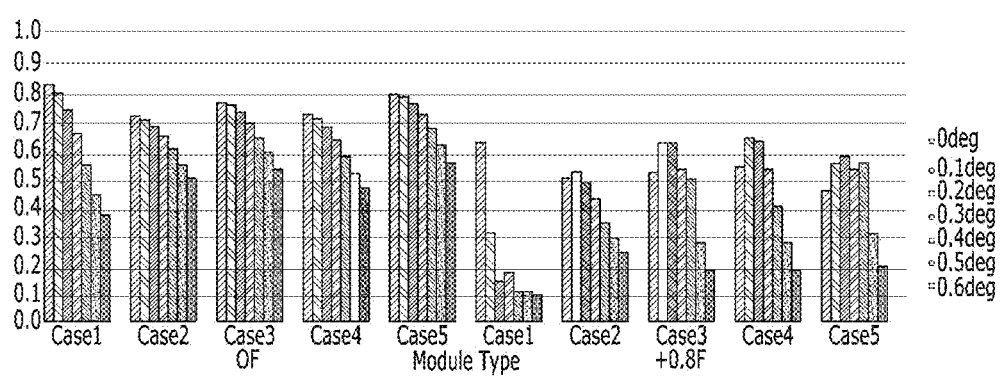
FIG. 37 is a view showing MTFs in the center of the field (0.0 F) and the periphery of the field (+0.8 F, −0.8 F) in the five comparative examples and the fifth embodiment.

FIG. 37 is a view showing MTFs in the center of the field (0.0 F) and the periphery of the field (+0.8 F, −0.8 F) in the five comparative examples and the fifth embodiment. As shown, it can be seen that the difference between the MTF in the center of the field and the MTF in the periphery of the field is slight in the case in which the lens assembly according to the embodiment is used.

In the lens assembly including the liquid lens according to the embodiment, the distance between the front surface S4011 of the first lens and the rear surface S4062 of the sixth lens may be fixed, and the focal length and the diopter of the liquid lens in the lens assembly may be variable, whereby AF may be possible without moving the lenses in the lens assembly.

The camera module including the imaging lens may be mounted in various kinds of digital devices, such as digital cameras, smartphones, laptop computers, and tablet PCs, and particularly may be mounted in a mobile device in order to realize a high-performance, ultra-slim zoom lens.

Although embodiments have been described with reference to a number of illustrative embodiments thereof, it should be understood that numerous other modifications and applications may be devised by those skilled in the art that will fall within the intrinsic aspects of the embodiments. More particularly, various variations and modifications are possible in concrete constituent elements of the embodiments. In addition, it is to be understood that differences relevant to the variations and modifications fall within the spirit and scope of the present disclosure defined in the appended claims.

Mode for Invention

Various embodiments have been described in the best mode for carrying out the invention.

INDUSTRIAL APPLICABILITY

The camera module including the liquid lens according to the embodiments is applicable to optical devices such as smartphones and digital cameras.

The invention claimed is:

1. A liquid lens module, comprising:
a liquid lens having an interface formed by a nonconductive liquid and a conductive liquid;
a spacer surrounding sides of the liquid lens;
a first electrode disposed on the liquid lens;
a second electrode disposed below the liquid lens;
a flexible printed circuit board (FPCB) disposed on the spacer and the first electrode, the FPCB being electrically connected to the first electrode; and
a metal plate disposed below the spacer and the second electrode, the metal plate being electrically connected to the second electrode,
wherein the metal plate comprises a conductive region and an insulating region, and
wherein the spacer includes a guide wall disposed to face at least one of an inner circumferential surface and an outer circumferential surface of the FPCB and the metal plate.

2. The liquid lens module of to claim 1, wherein a portion of the conductive region is disposed facing the second electrode.

3. The liquid lens module of claim 1, wherein the metal plate includes a first surface on which the conductive region and the insulating region are disposed, the conductive region faces the second electrode, and the insulating region does not face the second electrode.

4. The liquid lens module of claim 3, wherein the metal plate comprises a second surface opposite to the first surface, and the second surface is the insulating region.

5. The liquid lens module of claim 1, wherein the metal plate includes a first region facing a lower surface of the liquid lens and a second region bent and extending from the first region.

6. The liquid lens module of claim 1, comprising areas where the spacer is bonded to the FPCB and the metal plate, wherein at least one groove is disposed in at least one of the areas where the spacer is bonded to the FPCB and the metal plate.

7. The liquid lens module of claim 1, wherein a portion of at least one of the FPCB and the metal plate faces upwards and downwards with respect to the spacer, and another portion of the at least one of the FPCB and the metal plate is disposed to face upwards and downwards with respect to a part of the liquid lens.

8. The liquid lens module of claim 1, wherein the guide wall includes an escape portion formed at an outer surface of the guide wall configured for injecting a material to the outer surface of the guide wall.

9. The liquid lens module of claim 1, wherein the liquid lens has a quadrangular planar structure, and the spacer has a closed curved surface structure having a rectangular shape surrounding a central opening area.

10. A liquid lens module comprising:
a liquid lens having an interface formed by a nonconductive liquid and a conductive liquid;
a spacer surrounding sides of the liquid lens;
a first electrode disposed on the liquid lens;
a second electrode disposed below the liquid lens;
a flexible printed circuit board (FPCB) disposed on the spacer and the first electrode, the FPCB being electrically connected to the first electrode;
a metal plate disposed below the spacer and the second electrode, the metal plate being electrically connected to the second electrode; and an insulating layer disposed on an upper surface of the metal plate, the insulating layer being disposed in a region facing the second electrode, wherein the metal plate is electrically connected to the second electrode in a region facing the second electrode, and wherein the spacer includes a guide wall disposed to face at least one of an inner circumferential surface and an outer circumferential surface of the FPCB and the metal plate.

* * * * *